US012737662B2

(12) United States Patent
Seetharam et al.

(10) Patent No.: US 12,737,662 B2
(45) Date of Patent: Sep. 15, 2026

(54) FAULT-TOLERANT POST-SELECTION FOR LOGICAL QUBIT PREPARATION

(71) Applicant: PsiQuantum, Corp., Palo Alto, CA (US)

(72) Inventors: Karthik Seetharam, Mountain View, CA (US); Sam Roberts, Sydney (AU); Hector Bombin Palomo, Kyoto (JP)

(73) Assignee: PsiQuantum, Corp., Palo Alto, CA (US)

( * ) Notice: Subject to any disclaimer, the term of this patent is extended or adjusted under 35 U.S.C. 154(b) by 205 days.

(21) Appl. No.: 18/496,318

(22) Filed: Oct. 27, 2023

(65) Prior Publication Data

US 2025/0165838 A1 May 22, 2025

Related U.S. Application Data

(60) Provisional application No. 63/423,845, filed on Nov. 9, 2022, provisional application No. 63/576,436, filed on Oct. 28, 2022.

(51) Int. Cl.
*G06N 10/70* (2022.01)
*G06N 10/20* (2022.01)

(52) U.S. Cl.
CPC ............. *G06N 10/70* (2022.01); *G06N 10/20* (2022.01)

(58) Field of Classification Search
CPC ............................... G06N 10/70; G06N 10/20
USPC .......................................................... 714/699
See application file for complete search history.

(56) References Cited

U.S. PATENT DOCUMENTS

| | | | | |
|---|---|---|---|---|
| 2020/0401927 | A1* | 12/2020 | Nickerson | G06N 10/40 |
| 2021/0027188 | A1* | 1/2021 | Nickerson | H10D 48/3835 |
| 2021/0042650 | A1* | 2/2021 | Das | G06F 9/30098 |
| 2021/0124640 | A1* | 4/2021 | Nickerson | G06F 11/10 |
| 2021/0232963 | A1* | 7/2021 | Gimeno-Segovia | G06N 10/70 |
| 2021/0304053 | A1* | 9/2021 | Pant | G06N 10/70 |

OTHER PUBLICATIONS

Li, "A magic state's fidelity can be superior to the operations that created it"; Department of Materials, University of Oxford, United Kingdom; Oct. 2014 (Oct. 8, 2018); 5 pgs.

Singh, et al.; "High-Fidelity Magic-State Preparation with a Biased-Noise Architecture"; Department of Applied Physics, Yale University, et al; Sep. 2021; 10 pgs.

(Continued)

*Primary Examiner* — Albert Decady
*Assistant Examiner* — Osman M Alshack
(74) *Attorney, Agent, or Firm* — Kowert, Hood, Munyon, Rankin & Goetzel, P.C.; Jeffrey C. Hood; Luke Langsjoen

(57) ABSTRACT

Systems and methods for performing fault-tolerant post-selection (FTPS) on an encoded logical qubit. An FTPS controller receives syndrome graph data related to an encoded logical qubit. The encoded logical qubit includes a plurality of physical qubits encoded with a quantum error correcting code. The FTPS controller determines a respective magnitude for one or more logical gaps from the syndrome graph data, and determines an error metric based on the magnitudes of the logical gaps. The error metric is compared to a quality threshold, and depending on whether the quality threshold is met, the FTPS controller provides instructions to a quantum computing system to either keep or discard the logical qubit.

20 Claims, 33 Drawing Sheets

(56) References Cited

OTHER PUBLICATIONS

Bartolucci, et al.; "Fusion-based quantum computation"; PsiQuantum, Palo Alto; Jan. 2021; 25 pgs.
Bombin, et al.; "Logical blocks for fault-tolerant topological quantum computation"; PsiQuantum Corp., Palo Alto; Apr. 2023; 39 pgs.
International Search Report & Written Opinion; International Application No. PCT/US2025/035443; mailed Sep. 3, 2025; 11 pgs.
International Search Report & Written Opinion; International Application No. PCT/US2025/042229; mailed Oct. 21, 2025; 16 pgs.

* cited by examiner $$|\psi\rangle = a_1|0\rangle + a_2|1\rangle$$

plaquette:

measure: $X_1X_2X_3X_4$ circuit:

plaquette:

measure: $Z_1Z_2Z_3Z_4$ circuit:

plaquette:

a
1 2
2 1
a measure: $X_1X_2$ circuit:

plaquette:

measure: $Z_1Z_2$ circuit:

Magic State Factory 302
Qubit fusion system 328
Encoded clean magic state buffer 326
Clean encoded magic states 324
Magic state distillation 316
Distillation module (level 2) 322
Control 320
Distillation module (level 1) 318A
Distillation module (level 1) 318N
Flush switch 314
Acceptance switch 312
Buffer 306
Encoded magic states 304
FTPS controller 310
Syndrome graph data 308

: 1st Correction

| 1 | 0 | 0 | 1 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 1 | 0 | 0 | 0 |
| 0 | 0 | 0 | 0 | 0 | 0 | 0 |
| 0 | 0 | 0 | 0 | 1 | 0 | 0 |
| 1 | 0 | 0 | 0 | 0 | 0 | 0 |
| 1 | 0 | 0 | 0 | 0 | 0 | 1 |

FAULT-TOLERANT POST-SELECTION FOR LOGICAL QUBIT PREPARATION

PRIORITY INFORMATION

This application claims priority to U.S. Provisional Patent Application No. 63/576,436, titled "Fault-Tolerant Post-Selection for Logical Qubit Preparation", and filed Oct. 28, 2022 and U.S. Provisional Patent Application No. 63/423,845, titled "Fault-Tolerant Post-Selection for Logical Qubit Preparation", and filed Nov. 9, 2022, which are hereby incorporated by reference in their entirety as though fully and completely set forth herein.

TECHNICAL FIELD

Embodiments herein relate generally to quantum computational algorithms, systems and devices, such as photonic devices (or hybrid electronic/photonic devices), semiconducting or superconducting quantum computing devices, or topological quantum computers for preparing fault-tolerant logical qubits in a quantum computer.

BACKGROUND

Quantum computing can be distinguished from "classical" computing by its reliance on structures referred to as "qubits." At the most general level, a qubit is a quantum system that may exist in one of two orthogonal states (denoted as $|0\rangle$ and $|1\rangle$ in the conventional bra/ket notation) or in a superposition of the two states $$\left(\text{e.g., } \frac{1}{\sqrt{2}}(|0\rangle + |1\rangle)\right).$$

By operating on a system (or ensemble) of qubits, a quantum computer may quickly perform certain categories of computations that would require impractical amounts of time in a classical computer.

Because quantum computing utilizes quantum states as computational units, quantum computing systems are typically very sensitive to environmental noise, degradation and decoherence. Accordingly, there is a robust field of research into developing effective and efficient fault tolerance and error correction into quantum computing systems. In a fault-tolerant quantum computing scheme, multiple physical qubits may be entangled together to represent a single logical qubit, to make the logical qubit less susceptible to error. This process is time and resource intensive, and improvements in the field of fault-tolerant quantum computing are desired to increase the efficiency and fault tolerance of logical qubit preparation.

SUMMARY

Some embodiments described herein include quantum computing devices, systems and methods for performing fault-tolerant post-selection (FTPS) on an encoded logical qubit or logical block.

In some embodiments, an FTPS controller receives syndrome graph data related to an encoded logical qubit. The encoded logical qubit may include a plurality of physical qubits encoded with a quantum error-correcting code.

In some embodiments, the FTPS controller determines a respective magnitude for one or more logical gaps from the syndrome graph data, and determines an error metric based on the magnitudes of the logical gaps. The error metric is compared to a quality threshold, and depending on whether the quality threshold is met, the FTPS controller provides instructions to a quantum computing system to either keep or discard the logical qubit.

The techniques described herein may be implemented in and/or used with a number of different types of devices, including but not limited to photonic, superconductor, or semiconductor quantum computing devices and/or systems, hybrid quantum/classical computing systems, and any of various other quantum computing systems.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

Figure 1A:
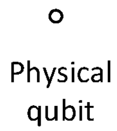
FIGS. 1A-I illustrate the utilization of surface codes to constructed an error-corrected fault-tolerant logical qubit, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Disclosed herein are examples (also referred to as "embodiments") of systems and methods for performing fault-tolerant post-selection using various quantum computing systems.

Although embodiments are described with specific detail to facilitate understanding, those skilled in the art with access to this disclosure will appreciate that the claimed invention may be practiced without these details. Reference will now be made in detail to embodiments, examples of which are illustrated in the accompanying drawings. In other instances, well-known methods, procedures, components, circuits, and networks have not been described in detail so as not to unnecessarily obscure aspects of the embodiments.

Qubits

Quantum computing relies on the dynamics of quantum objects, e.g., photons, electrons, atoms, ions, molecules, nanostructures, and the like, which follow the rules of quantum theory. As used herein, a "qubit" (or quantum bit) is a quantum system with an associated quantum state that may be used to encode information. A quantum state may be used to encode one bit of information if the quantum state space can be modeled as a (complex) two-dimensional vector space, with one dimension in the vector space being mapped to logical value 0 and the other to logical value 1. In contrast to classical bits, a qubit may have a state that is a superposition of logical values 0 and 1. More generally, a "qudit" describes any quantum system having a quantum state space that may be modeled as a (complex) n-dimensional vector space (for any integer n), which may be used to encode n bits of information. For the sake of clarity of description, the term "qubit" is used herein, although in some embodiments the system may also employ quantum information carriers that encode information in a manner that is not necessarily associated with a binary bit, such as a qudit.

Qubits (or qudits) may be implemented in a variety of quantum systems. Examples of qubits include: polarization states of photons; presence of photons in waveguides; or energy states of molecules, atoms, ions, nuclei, or photons. Other examples include other engineered quantum systems such as flux qubits, phase qubits, or charge qubits (e.g., formed from a superconducting Josephson junction); topological qubits (e.g., Majorana fermions); or spin qubits formed from vacancy centers (e.g., nitrogen vacancies in diamond).

As used herein, a distinction is made between a "physical qubit" which is a physical quantum system such as a molecule, atom, photon, etc. that exists in a 2-level quantum state, and a "logical qubit" which includes a plurality of physical qubits encoded (e.g., entangled) together according to a quantum error correcting code (such as a surface code) to encode logical quantum information. These terms are described in greater detail below.

FIGS. 1A-L—Surface Codes and Physical Implementations

Qubits (and operations on qubits) may be implemented using a variety of physical systems. In some examples described herein, qubits are provided in an integrated photonic system employing waveguides, beam splitters, photonic switches, and single photon detectors, and the modes that may be occupied by photons are spatiotemporal modes that correspond to presence of a photon in a waveguide. Modes may be coupled using mode couplers, e.g., optical beam splitters, to implement transformation operations, and measurement operations may be implemented by coupling single-photon detectors to specific waveguides. One of ordinary skill in the art with access to this disclosure will appreciate that modes defined by any appropriate set of degrees of freedom, e.g., polarization modes, temporal modes, and the like, may be used without departing from the scope of the present disclosure. For instance, for modes that only differ in polarization (e.g., horizontal (H) and vertical (V)), a mode coupler may be any optical element that coherently rotates polarization, e.g., a birefringent material such as a waveplate. For other systems such as ion trap systems or neutral atom systems, a mode coupler may be any physical mechanism that couples two modes, e.g., a pulsed electromagnetic field that is tuned to couple two internal states of the atom/ion.

In some embodiments of a photonic quantum computing system using dual-rail encoding, a qubit may be implemented using a pair of waveguides. In some embodiments, a photon in a first waveguide of the pair and no photon in a second waveguide of the pair (also referred to as a vacuum mode) may correspond to the $|0\rangle$ state of a photonic qubit. Alternatively, a state with a photon in the second waveguide and no photon in the first waveguide may correspond to the $|1\rangle$ state of the photonic qubit. To prepare a photonic qubit in a known logical state, a photon source may be coupled to one end of one of the waveguides. The photon source may be operated to emit a single photon into the waveguide to which it is coupled, thereby preparing a photonic qubit in a known state. Photons travel through the waveguides, and by periodically operating the photon source, a quantum system having qubits whose logical states map to different temporal modes of the photonic system may be created in the same pair of waveguides. In addition, by providing multiple pairs of waveguides, a quantum system having qubits whose logical states correspond to different spatiotemporal modes may be created. It should be understood that the waveguides in such a system need not have any particular spatial relationship to each other. For instance, they may be but need not be arranged in parallel.

Some embodiments described below relate to physical implementations of unitary operations that couple modes of a quantum system, which may be understood as transforming the quantum state of the system. For instance, if the initial state of the quantum system (prior to mode coupling) is one in which one mode is occupied with probability 1 and another mode is unoccupied with probability 1 (e.g., a state $|10\rangle$ in the Fock notation), mode coupling may result in a state in which both modes have a nonzero probability of being occupied, e.g., a state $a_1|10\rangle + a_2|01\rangle$, where $|a_1|^2 + |a_2|^2 = 1$. In some embodiments, operations of this kind may be implemented by using beam splitters to couple modes together and variable phase shifters to apply phase shifts to one or more modes. The amplitudes $a_1$ and $a_2$ depend on the reflectivity (or transmissivity) of the beam splitters and on any phase shifts that are introduced.

Figure 1B:
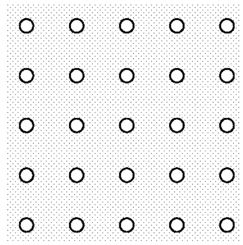

A single physical qubit (e.g., such as the 2-level physical qubit illustrated in FIG. 1A with a quantum state $|\psi\rangle = a_1|0\rangle + a_2|1\rangle$) may in principle be used for quantum computation. However, individual physical qubits are generally highly susceptible to noise and decoherence. Fault-tolerant quantum computing utilizes a plurality of entangled physical qubits to encode a single logical qubit to mitigate the frailty and/or short coherence times of individual physical qubits. In fault-tolerant quantum computing schemes, a plurality of physical qubits such as those illustrated in FIG. 1B are entangled together according to a specific error correcting code to produce a single logical qubit that is less susceptible to noise and decoherence. Encoding qubits in this manner causes the resultant logical qubit to be less sensitive to error and noise, and resultant errors may be fixed via quantum error correction. Encoding a logical qubit may itself be vulnerable to errors. Embodiments herein address these and other issues by implementing fault-tolerant post-selection (FTPS) of fault-tolerant codes and channels to improve the accuracy and fidelity of encoded logical qubits. At a high level, various quality metrics may be employed to assess the fidelity of an encoded logical qubit, or more generally of any type of encoded logical block, to determine whether to discard the logical block or keep it for use in the quantum computation.

In some embodiments, FTPS may utilize information metrics based on visible syndrome and erasure information. In some embodiments, different metrics may be employed for ranking the quality of logical blocks based on their respective configurations of syndromes and erasures. For example, some embodiments utilize a logical gap (and variants thereof) which determines an unsigned weight difference between inequivalent logical corrections as a metric for predicting logical error rates of logical blocks (also known as fault-tolerant channels) based on error-correcting codes. Advantageously, this metric is highly adaptable to various types of noise and decoders. In some embodiments, FTPS may be deployed to prepare low-error surface code magic states with low overheads under an i.i.d. model of Pauli error and erasure error rates. Post-selection strategies based on the logical gap may suppress the encoding error rate of a magic state preparation channel to that of the physical error rate with a relative overhead factor of $\leq 2$, when operating at 60% of the bulk threshold of the corresponding surface code. The FTPS framework may also be utilized for mitigating errors in more general fault-tolerant logical channels.

In some quantum computing methodologies, such as fusion-based quantum computing and circuit-based quantum computing, a logical qubit is encoded from a plurality of physical qubits using a sequence of specific measurements (e.g., stabilizer measurements). The measurement sequence may be constructed where a subset of the physical qubits is measured (e.g., collapsing the quantum state and producing classical information, i.e., the measurement result) in such a way that the remaining unmeasured/un-collapsed degrees of freedom (e.g., a 2-dimensional subspace which has support over all the physical qubits) form the desired encoded logical qubit. Accordingly, the processes of performing stabilizer measurements and/or encoding a fault-tolerant logical qubit may receive a plurality of physical qubits as input and as output may produce both the encoded logical qubit and classical information (e.g., syndrome graph data) resulting from the measurement sequence.

In some quantum computing implementations, the classical information takes the form of syndrome graph data, where the syndrome graph is a geometric representation of the outcomes of the measurement sequence. Because the input physical qubits are prepared in an known initial state and measured according to a predetermined measurement sequence, it may be determined (e.g., using classical computing) how the syndrome should appear in the absence of any errors involving the physical qubits during the measurement sequence (e.g., Pauli or erasure errors). Accordingly, any deviation of the syndrome graph data from the expected result may be indicative of one or more errors within the logical qubit. In general, these deviations may not indicate precisely which measurement(s) had an error, or which type of error has occurred, as there may be more than one type of error or combination of errors that is consistent with a given observed deviation from the anticipated error-free syndrome graph. For example, a syndrome graph may be determined as a grid of parity checks for adjacent nodes of the grid, whereby a parity error may indicate that one or more of the adjacent nodes had an error, but the parity error may not indicate precisely which adjacent node had an error, or which error occurred.

As used herein, the term "syndrome graph data" refers to a set of classical information (e.g., data represented by digital values such as ones and zeros) that specifies the location of one or more syndromes and/or one or more erasure errors within the syndrome graph of a logical block. Said another way, based on the knowledge of the particular geometry of the cluster state/error correcting code, measurement outcomes may be used to determine the syndrome graph data. In some embodiments, the syndrome graph data may further include correction operators for the syndrome graph output by a decoder.

Errors that occur during operations on an encoded logical qubit may have varying degrees of severity. For example, errors in a fault-tolerant logical qubit may cause logical failure if they link up in a way that spans the syndrome graph of the logical qubit. Conversely, localized errors that do not span the syndrome graph may be identifiable and correctable via quantum error correction. Embodiments herein perform FTPS by determining an error metric based on the syndrome graph data, and comparing the error metric to a quality threshold to determine whether to keep or discard a logical qubit. In some embodiments, multiplexing may be employed where multiple copies of each logical qubit are produced and the higher fidelity logical qubits are kept and used in a quantum computation, whereas the lower fidelity logical qubits are discarded, increasing the fidelity of the computation.

Figure 1C:
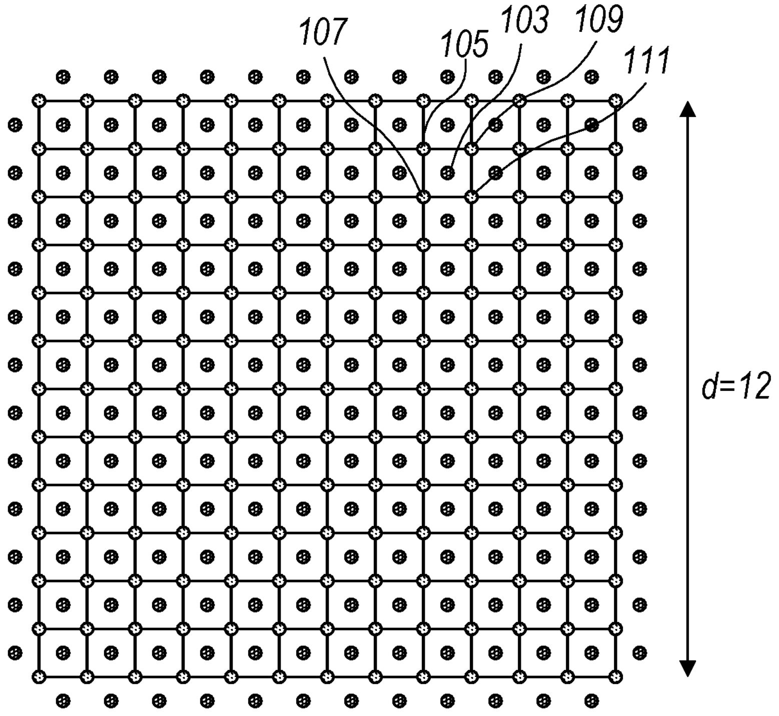

FIG. 1C shows an arrangement of physical qubits that can be used to encode a fault-tolerant logical qubit using a surface code in a circuit-based quantum computing implementation, according to one or more embodiments. While FIG. 1C illustrates a circuit-based implementation, other quantum computing implementations (e.g., fusion-based) may also be used according to embodiments described herein. In FIG. 1C, the solid grid lines are guides to the eye and form an array of squares, also referred to herein as a "surface code", with physical "data qubits" disposed on the four vertices of each square and physical "measure qubits" disposed on the face of each square. As used herein, measure qubits are the physical qubits which are measured to perform measurement checks on adjacent data qubits without directly measuring the data qubits and collapsing the quantum information. In this example the surface code has a length (or more precisely, a code distance) d of 12, but any length can be employed. The surface code arrangement of qubits also includes four lines of boundary measure qubits disposed adjacent to the outermost lines of data qubits. Each square is referred to herein as a plaquette. Within the bulk of the surface code (i.e., the plaquettes which don't form the outer boundary of the code) each data qubit may be coupled, via 4 two-qubit gates, to its 4 nearest neighbor measure qubits (each on four different plaquettes) and likewise, each measure qubit may be coupled, via 4 two-qubit gates to its 4 nearest neighbor data qubits. On the boundaries of the code, each boundary measure qubit may be coupled, via two two-qubit gates to its nearest adjacent data qubits. According to one or more embodiments, the two-qubit gates can be CNOT gates, CZ gates, and the like.

In order to operate the collection of data and measure qubits as a logical qubit that is protected against errors, the following set of measurements may be repetitively performed on the system. For each plaquette within the bulk of the surface code, 4-qubit stabilizers are measured. For example, as shown in FIG. 1E, if the data qubits of a given plaquette are labeled 1, 2, 3, 4 (e.g., data qubits 105-111) and the measure qubit is labeled a (e.g., measure qubit 103), the stabilizer to be measured can be $X_1Z_2Z_3X_4$. The "quantum circuit" (which is a term that refers to the sequence of gates and measurement operations configured to operate on physical qubits) used to implement this stabilizer measurement is also shown in FIG. 1E and includes first initializing the measure qubit a in the |+> state, then performing the following gates: a CNOT gate between the measure qubit a and data qubit 1, respective CZ gates between the measure qubit a and qubit 2 and qubit 3, and a CNOT gate between the measure qubit a and qubit 4; followed by an x-basis measurement $M_x$ of measure qubit a. The resulting measurement outcome (which takes the form of a classical bit, e.g., 0 or 1 or −1 or 1, depending on the choice of conventions) is equal to the outcome of the measurement of the parity check stabilizer $X_1Z_2Z_3X_4$ and becomes part of the syndrome graph. For the plaquettes found at the boundary of the surface code, and shown in FIG. 1F, a two-qubit stabilizer of the form $Z_1X_2$ is measured. The quantum circuit used to implement this two-qubit stabilizer measurement is shown in FIG. 1F and includes first initializing the boundary measure qubit a in the |+> state then performing the following gates: a CZ gate between the measure qubit a and qubit 1 and CNOT gate between the measure qubit and qubit 2; followed by an x-basis measurement $M_x$ of measure qubit a. In the example shown in FIG. 1D, there are two different types of boundaries depending on whether the boundary includes shaded plaquettes or unshaded plaquettes. A boundary surface that includes shaded plaquettes is referred to as a "dual boundary surface" and measurements including measure qubits within the dual boundary surface contribute to the "dual syndrome graph." Similarly, a boundary surface that includes unshaded plaquettes is referred to herein as a "primal boundary surface," and measurements including measure qubits within a primal boundary surface contribute to the "primal syndrome graph."

Figure 1D:
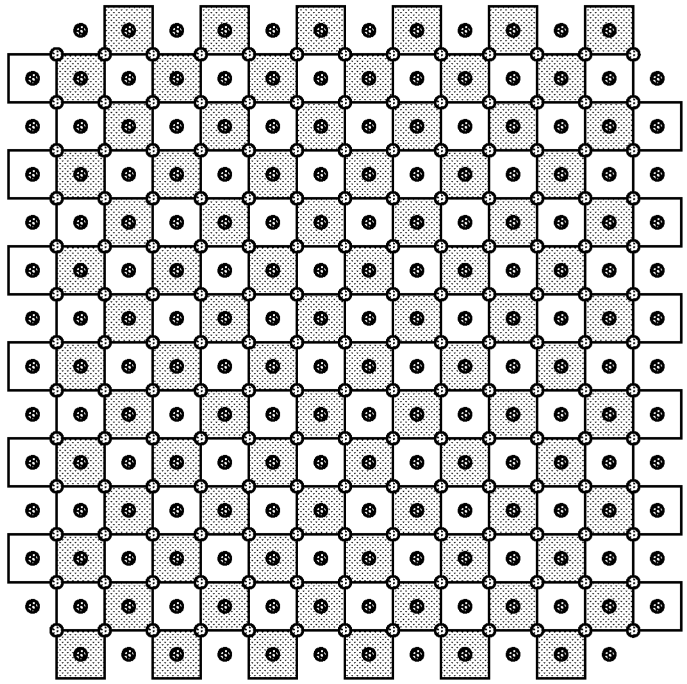
Figure 1E:
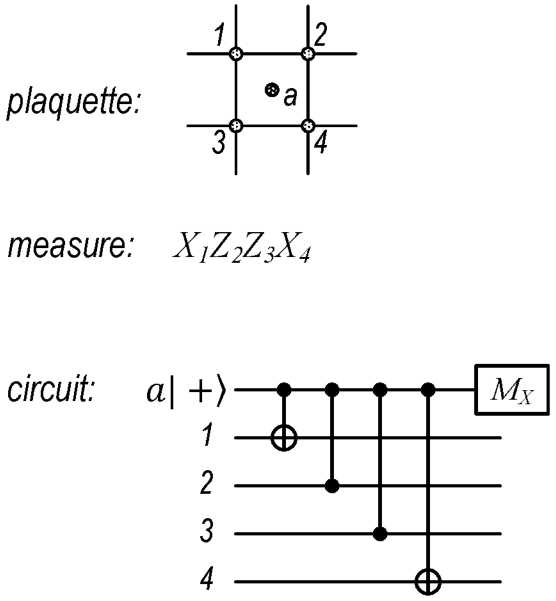
Figure 1F:
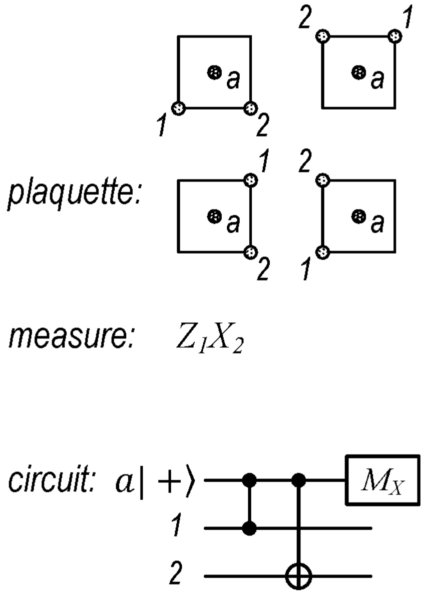
Figure 1G:
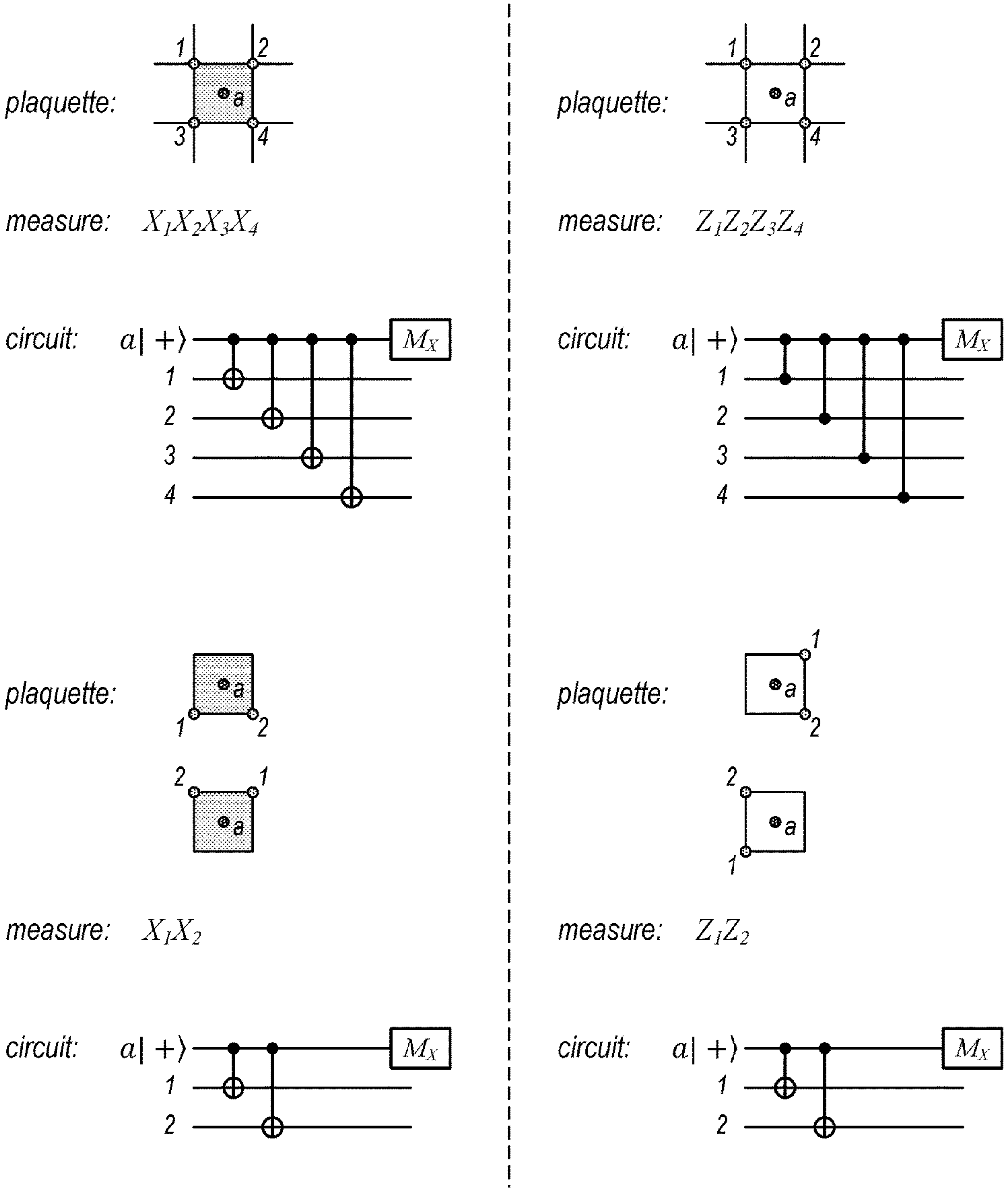

In order to implement the surface code scheme shown in FIG. 1D-F, the plaquette measurements may be broken into two groups of measurements: a first group of measurements that measures the stabilizers associated with the shaded plaquettes during a first duration of time and a second group of measurements that measures the stabilizers with the unshaded plaquettes during a second duration of time. These two sets of measurements are performed in different times to ensure that each qubit only participates in one quantum gate at a time. One of ordinary skill in the art will appreciate that any gates that can commute with one another may be performed in the same time step, or even simultaneously, if desired. The classical data generated by each one of these measurements, referred to herein as "syndrome graph data", is then passed to a decoder for quantum error correction according to known methods, e.g., using union find decoding, minimum weight perfect matching or any other decoding process. Examples of minimum weight perfect matching decoding and other decoding methods are described in U.S. Pat. No. 11,263,076 B2, which is hereby incorporated by reference in its entirety, as if completely set forth herein.

One of ordinary skill will appreciate that the example shown in FIG. 1D is using a particular choice of local basis for the surface code and that other choices for the basis may be employed. For example, in some contexts, taking certain assumptions on the likely form of the errors that may occur on the underlying data and measure qubits, one may apply a single qubit gate to each data qubit to obtain a modified surface code. One may modify the basis for each check to obtain a scheme for the modified code. One example includes the CSS (Calderbank, Shor, Steane) version, where stabilizer measurements are either x-type or z-type. To obtain this version of the surface code, the stabilizers are conjugated by a Hadamard H: X→Z, Z→X on half the data qubits in a bipartition, thereby resulting in the CSS surface code. Note that the measurement schedule described above remains the same, but the new stabilizers are given by that summarized in FIG. 1G.

If the above-described surface code measurement schedule is applied for numerous time steps, the system effectively acts as a fault-tolerant quantum memory for the logical qubit encoded by the underlying surface code or, viewed another way, as a fault-tolerant logical identity gate on the logical qubit that is encoded by the underlying surface code. Viewed yet another way, this process operates as a fault-tolerant logical channel.

Figure 1H:
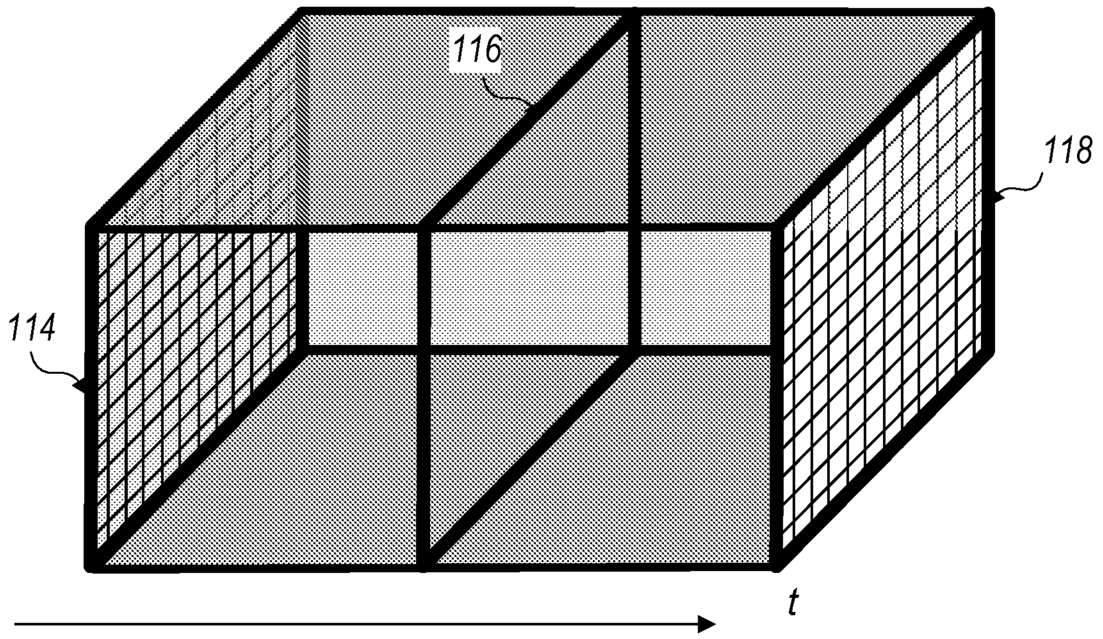
Figure 1I:
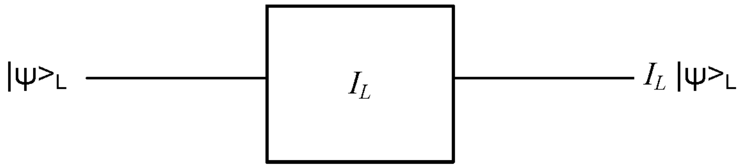

FIG. 1H illustrates a 3-dimensional graphical depiction of such a fault-tolerant logical identity gate. The surface labeled 114 is the input to the gate and includes an arbitrary logical state encoded in a surface code, represented as the input checkerboard surface. Likewise, the surface labeled 118 identifies the output qubits after the identity gate I has been applied to it. The input and output surfaces, which may be associated with either the physical or relational arrangement of qubits, are connected to each other via an intervening volume that represents the set of measurements to be applied over time. Accordingly, in FIG. 1H, time flows from left to right and the lighter shaded (front and back) and darker shaded (top and bottom) sides of the boundaries of the volume depict whether the primal or dual plaquettes are disposed on that boundary as described above in reference to FIG. 1D-E. FIG. 1I represents the same concept but written in a more familiar quantum circuit notation illustrating the analogy between the more familiar quantum circuit. While FIG. 1H shows the logical identity gate, any gate can be depicted in this manner and such a depiction is one example of a "logical block" that specifies a set of instructions to be performed on the underlying surface code qubits to perform a logical operation (the Identity gate in this example) on the logical qubit that is encoded by surface code. Other examples of such gates are the S gate, the Hadamard gate, and the CX gate, among other possibilities.

The protocol for preparing an encoded logical state may contain two parameters, L and $L_d$. Here L is referred to as the "distance" of the scheme, which corresponds to the length and width of the cross section shown in FIG. 1B—it determines the code distance of the surface code state being prepared. In some embodiments, L may be separated into two parameters, $L_x$ and $L_y$ i.e., the code distance may be different in the two spatial directions. This may be desirable, for example, when there is an asymmetery in the noise model or logical error rates in the X and Z directions, and the code distance may be separately tuned in the two spatial directions. $L_d$ is referred to as the "depth" of the scheme—it can be thought of as simulated time, i.e. the number of rounds of stabilizer measurements in CBQC, or the number of layers of resource states in FBQC. $L_d$ may determine the number of stabilizer checks in the protocol from which information may be gathered for post-selection. A minimal depth of $L_d$=2 may be chosen, however, longer depths may also be used (using more overhead) to allow for more information to be collected in order to better predict logical errors on the output state.

The sequence of measurements performed over the flow of time illustrated in FIG. 1H (e.g., in a circuit-based implementation, a sequence of measurements including the circuit measurements shown in FIGS. 1D-E) may include a subset of measurements that incur a logical error (e.g., a Pauli error) or an erasure error. To identify errors in the measurement outcomes, syndrome graph data may be generated from the collection of measurement outcomes resulting from the measurements of the physical qubits. For example, the bit values associated with a plurality of edge qubits may be combined to create a syndrome value associated with an adjacent vertex that results from the intersection of the respective edges, e.g., the result of the measurements shown in FIGS. 1E and 1F. A set of syndrome values (or "syndromes"), also referred to herein as parity checks, may be associated with each vertex of the syndrome graph. The parity check values may be found by computing the parity of the bit values associated with each edge of the syndrome graph incident to the vertex. In some embodiments, a parity computation entails determining whether the sum of the edge values is an even or odd integer, with the parity result being the result of the sum modulo 2. If no errors have occurred in the quantum state or in the qubit measurements, then all syndrome values should be even (or 0). On the contrary, if an error occurs, it may result in some odd (or 1) syndrome values.

In some embodiments, half of the bit values from the qubit measurements are associated with the primal boundary surfaces, and this syndrome graph is referred to herein as the "primal graph". The syndrome graph resulting from measurements on the dual boundary surfaces is referred to as the "dual graph". There is generally an equivalent decoding problem on the syndrome values of the primal and dual graphs.

Syndromes may be identified and appropriately removed via quantum error correction, via a process known as decoding. Decoding produces a recovery that is consistent with the syndrome, attempting to correct for the error. Decoding succeeds when the combined effect of the error and recovery does not give rise to a logical error. However, this process does not always succeed, and certain combinations of error and recovery may result in an error chain that spans the surface code and damages the logical information. As described in greater detail below in reference to FIG. 7, logical gap magnitudes for correcting syndromes may be extracted from syndrome graph data to determine an error metric associated with a logical encoded qubit (i.e., for the output surface code shown in FIG. 1H). This error metric may then be used for fault-tolerant post-selection to determine whether to keep or discard the logical qubit, in some embodiments.

Figure 1J:
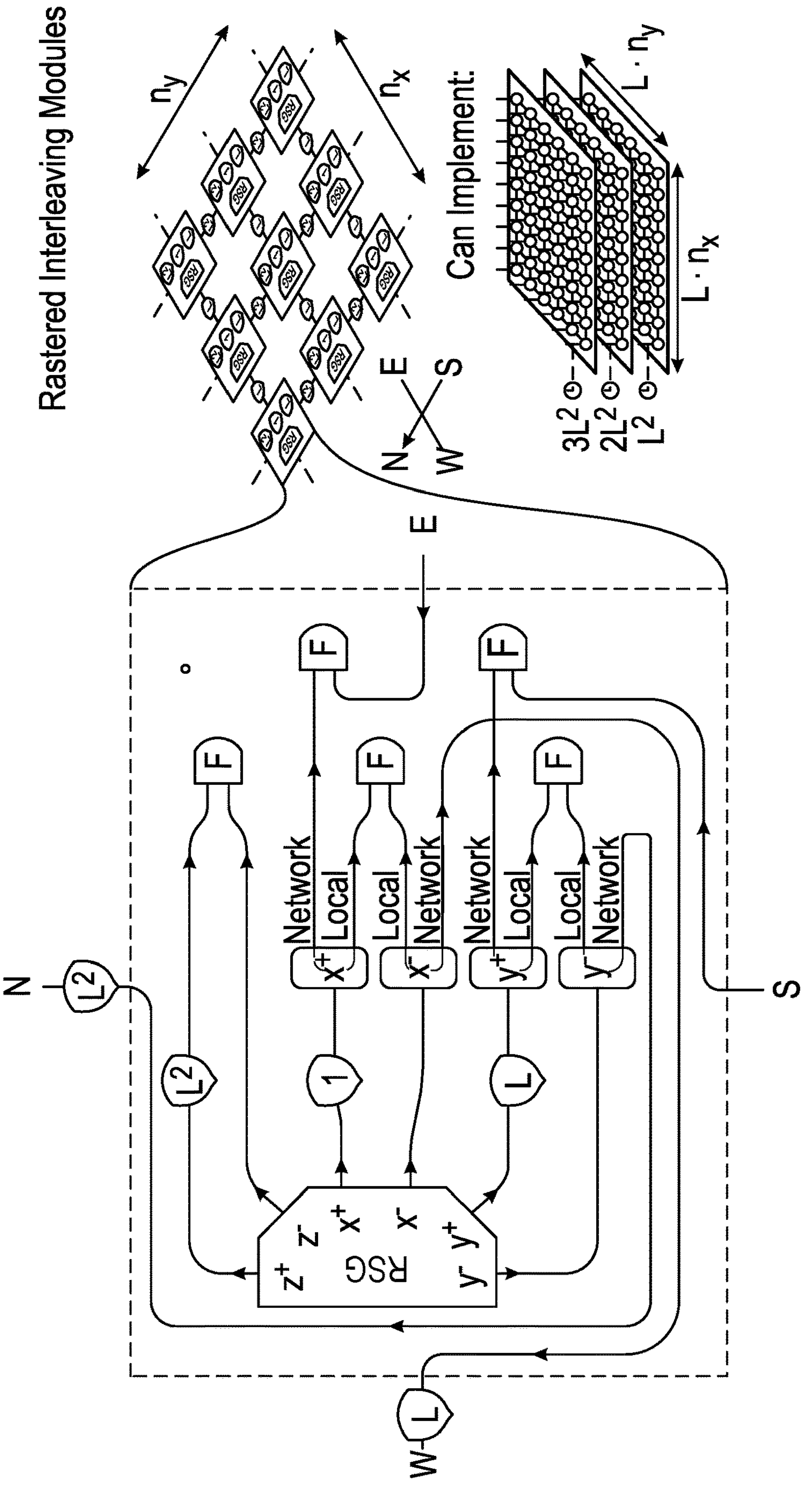
FIG. 1J illustrates how resource state generators may be utilized in a system of interleaving modules, according to some embodiments.

FIG. 1J is a circuit diagram illustrating raster-scanned interleaving modules, according to some embodiments. The interleaving modules may be used to implement the qubits illustrated in the network shown in FIG. 6C-D, as one example.

When the interleaving length l is larger than the code depth d (not illustrated), a sub-brick may include multiple logical qubits and/or portions of logical qubits. Methods described herein for performing fault tolerant may be generally applied to various types of logical blocks, logical qubits, and/or components thereof, in various embodiments.

Figure 1K:
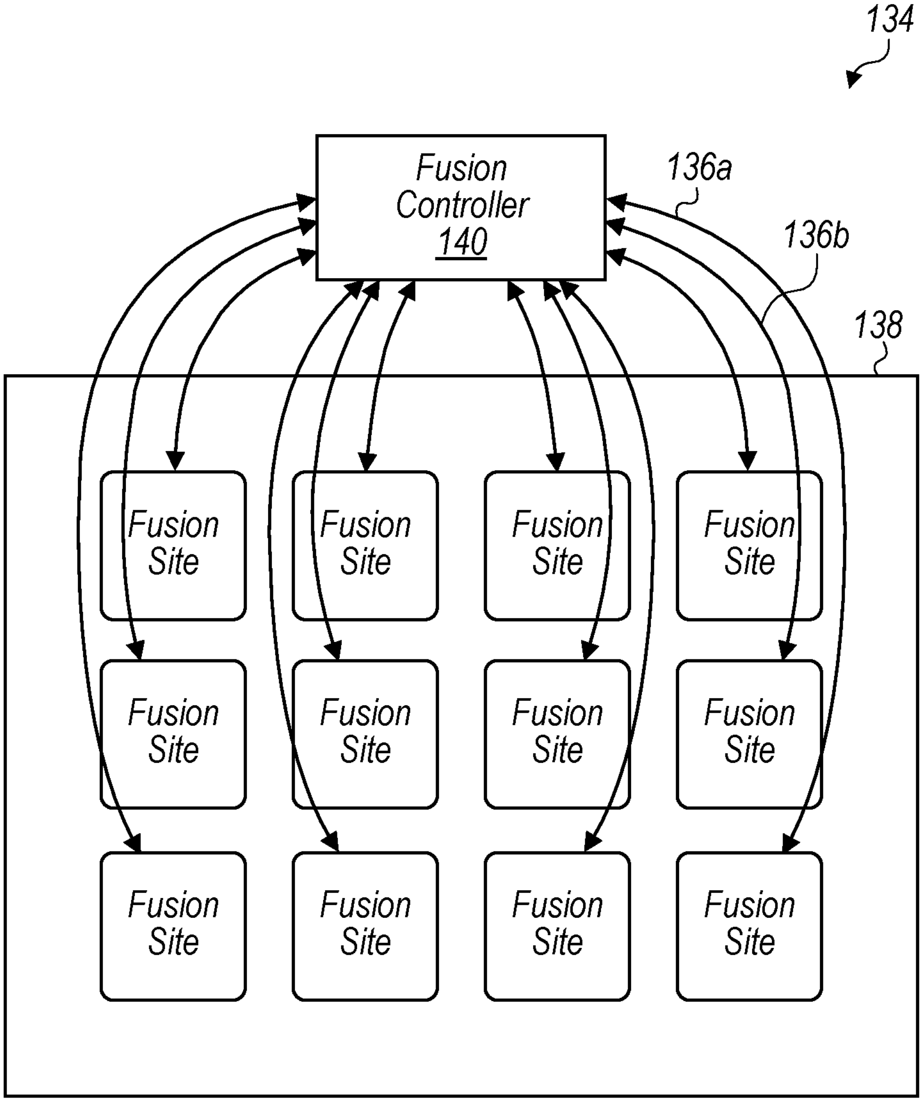
FIG. 1K illustrates an example of a qubit fusion system interfacing with fusion sites, in accordance with some embodiments.

FIG. 1K shows one example of qubit fusion system 134 in accordance with some embodiments. In some embodiments, qubit fusion system 134 may be employed within a larger FBQC system such as the quantum computing system 205 shown in FIG. 2.

Qubit fusion system 134 includes a fusion controller 140 that is coupled to a fusion array 138. Fusion controller 140 is configured to operate as described herein to direct the fusion sites to perform fusion measurements in a particular manner (e.g., in a particular basis). Fusion array 138 includes a collection of fusion sites that each receive two or more qubits from different resource states (not shown) and perform one or more fusion operations (e.g., Type II fusion) on selected qubits from the two or more resource states. The fusion operations performed on the qubits may be controlled by the fusion controller 140 via signals that are sent from the fusion controller 140 to each of the fusion gates via classical control channels 136*a*, 136*b*, etc. Based on the joint measurements performed at each fusion site, classical measurement outcomes in the form of classical data are output and then provided to a decoder system.

Figure 1L:
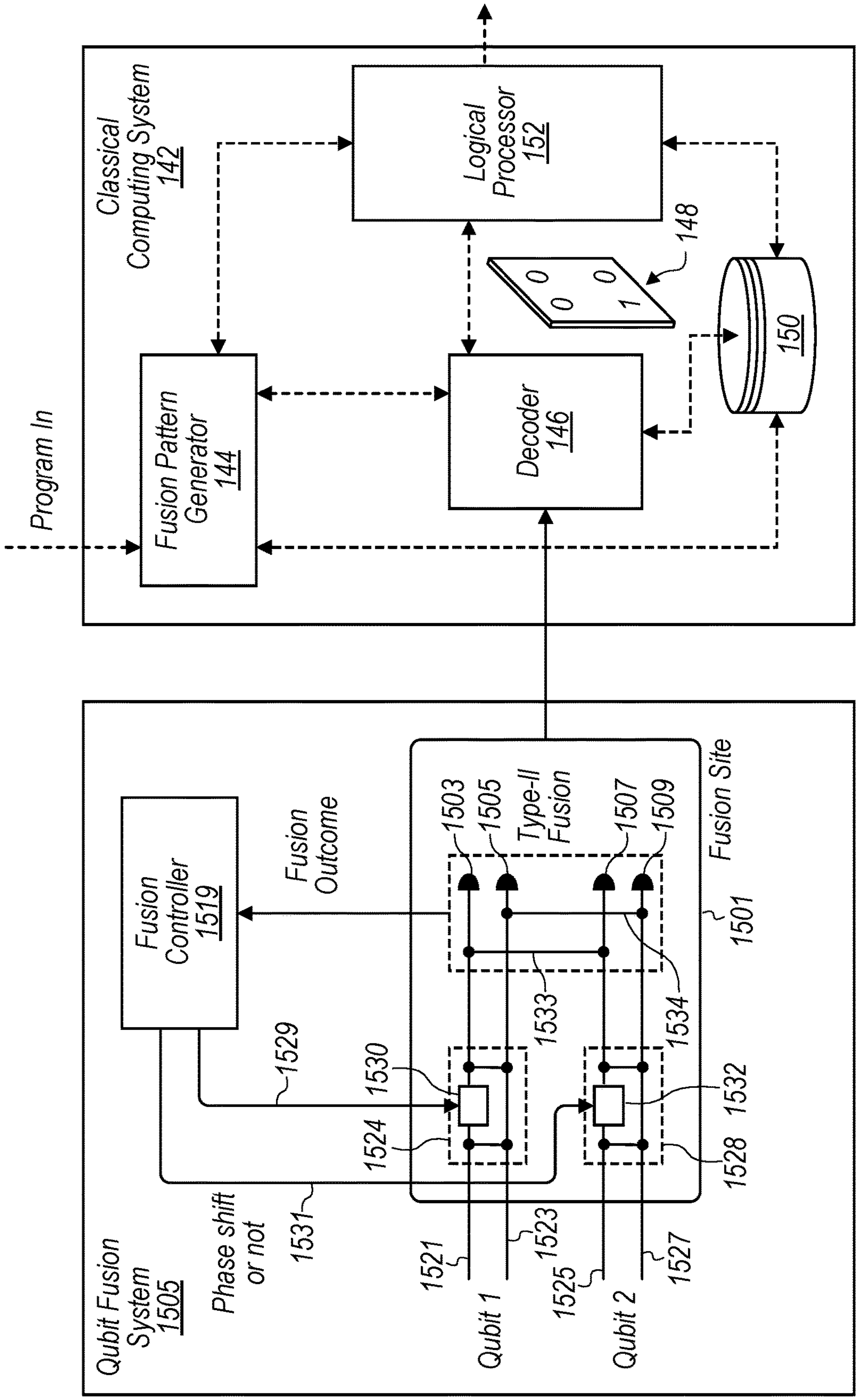
FIG. 1L illustrates a qubit fusion system interfacing with a classical computing system, according to some embodiments.

FIG. 1L shows one possible example of a fusion site 1501 as configured to operate with a fusion controller 140 to provide measurement outcomes to a decoder for fault tolerant quantum computation in accordance with some embodiments. In this example, fusion site 1501 may be an element of fusion array 138 (shown in FIG. 1K), and although only one instance is shown for purposes of illustration, the fusion array 138 may include any number of instances of fusion sites 1501.

The qubit fusion system 1505 may receive two or more qubits (qubit 1 and qubit 2) that are to be fused. Qubit 1 is one qubit that may be entangled with one or more other qubits (not shown) as part of a first resource state and qubit 2 is another qubit that may be entangled with one or more other qubits (not shown) as part of a second resource state. The fusion operations that take place at the fusion sites are fully destructive joint measurements between qubit 1 and qubit 2 such that classical information remains after the measurement is performed representing the measurement outcomes on the detectors, e.g., detectors 1503, 1505, 1507, 1509. Quantum information contained within qubits 1 and/or 2 may be transferred to the remaining (i.e., unmeasured) qubits of their respective resource states. The classical information is decoded by a decoder 146 and may be used in subsequent steps of the described embodiments. For example, the result of the fusion measurement may be used to determine whether the fusion was successful (i.e., whether it resulted in a desired outcome), and/or whether the remaining unmeasured qubits of the resource states associated with qubits 1 and 2 are in a desired configuration, among other possibilities. More broadly, the fusion measurement results may be used to determine a quality metric to be used for fault tolerant post-selection, in some embodiments.

FIG. 1L shows an illustrative example for one way to implement a fusion site as part of a photonic quantum computer architecture, according to some embodiments. In this example, qubit 1 and qubit 2 are dual rail encoded photonic qubits. Accordingly, qubit 1 and qubit 2 are input on waveguides 1521, 1523 and 1525, 1527, respectively. An interferometer 1524, 1528 may be placed in line with each qubit, and within one arm of each interferometer 1524, 1528 a programmable phase shifter 1530, 1532 may be applied to affect the basis in which the fusion operation is applied, e.g., XX, XY, YY, ZZ, etc.). The programmable phase shifters 1530, 1532 may be coupled to the fusion controller 1519 via control line 1529 and 1531 such that signals from the fusion controller 1519 may be used to set the basis in which the fusion operation is applied to the qubits. For example, the programmable phase shifters may be programmable to either apply or not apply a Hadamard gate to their respective qubits, altering the basis (e.g., x vs. z) of the type II fusion measurement. In some embodiments the basis may be hard-coded within the fusion controller 1519, or in some embodiments the basis may be chosen based upon external inputs, e.g., instructions provided by the fusion pattern generator 144. Additional mode couplers, e.g., mode couplers 1533 and 1532 may be applied after the interferometers followed by single photon detectors 1503, 1505, 1507, 1509 to provide a readout mechanism for performing the joint measurement. In the example shown in FIG. 1L, the fusion site implements an un-boosted Type II fusion operation on the incoming qubits. One of ordinary skill will appreciate that any type of fusion operation may be applied (and may be boosted or un-boosted) without departing from the scope of the present disclosure. In some embodiments, the fusion controller 1519 may also provide a control signal to the detectors 1503, 1505, 1507, 1509. A control signal may be used, e.g., for gating the detectors or for otherwise controlling the operation of the detectors. Each of the detectors 1503, 1505, 1507, 1509 provides one bit of information (representing a "photon detected" or "no photon detected" state of the detector), and these four bits may be preprocessed at the fusion site 1501 to determine a measurement outcome (e.g., fusion success or not) or passed directly to the decoder 146 for further processing.

Figure 2:
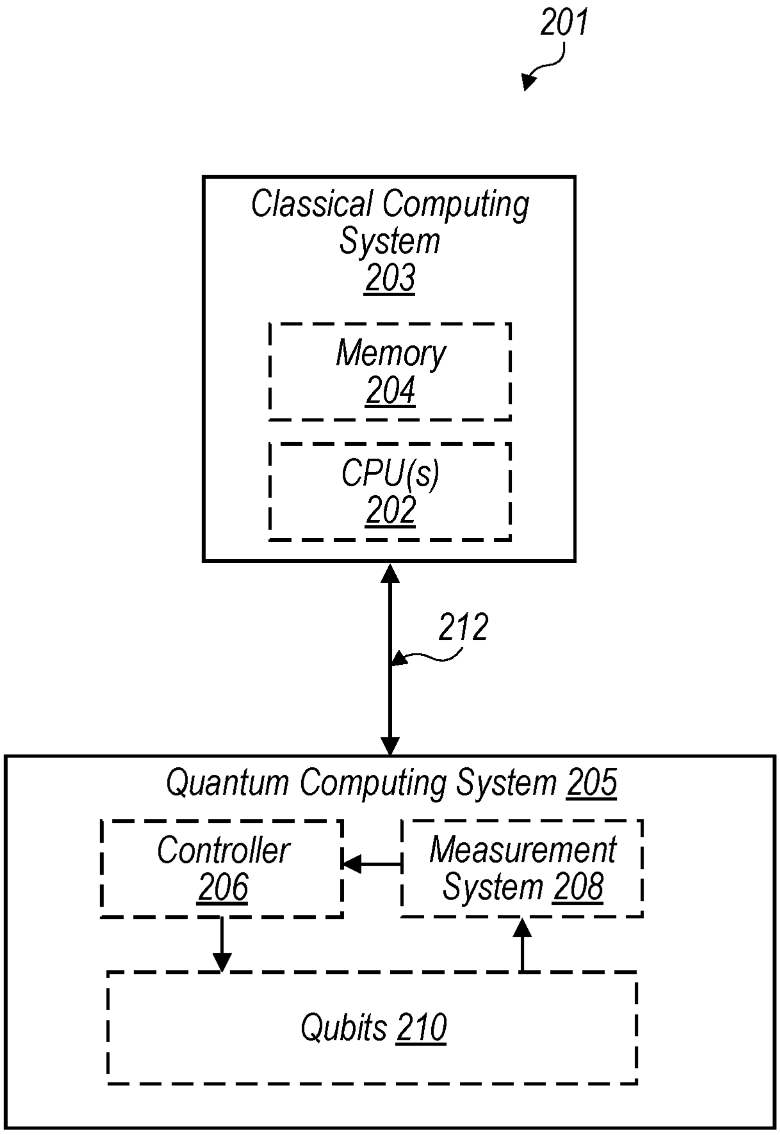
FIG. 2 is a system diagram of a quantum computing system that may be utilized to implement fault-tolerant post-selection of logical encoded qubits, according to some embodiments.

FIG. 2—Quantum Computing System

FIG. 2 illustrates a quantum computing system that may be utilized to implement method steps of embodiments described herein. As illustrated, the system includes a classical computing system 203 coupled to a quantum computing system 205 over a classical channel 212. The classical channel may relay classical information between the classical and quantum computing systems.

In some embodiments, the classical computing system 203 includes one or more non-transitory computer-readable memory media 204, one or more central processing units (CPUs) or processor(s) 202, a power supply, an input/output (I/O) subsystem, and a communication bus or interconnecting these components. The processor(s) 202 may execute modules, programs, and/or instructions stored in memory 204 and thereby perform processing operations. The processor may comprise a dedicated processor, or it may be a field programmable gate arrays (FPGA), an application specific integrated circuit (ASIC), or a "system on a chip" that includes classical processors and memory, among other possibilities. In some embodiments, memory 204 stores one or more programs (e.g., sets of instructions) and/or data structures and is coupled to the processor(s).

In some embodiments, the classical computing system may have installed thereon a dedicated module acting as a fault-tolerant post-selection (FTPS) controller. In some embodiments, the FTPS controller may include its own dedicated memory medium and/or processor(s), which may be a dedicated processor, an FPGA, or an ASIC, among other possibilities. In some embodiments, the FTPS controller may be implemented as software and may share processing resources with other control aspects of the classical computing system.

The classical computing system may be classical in the sense that it operates computer code represented as a plurality of classical bits that may take a value of 1 or 0. Programs may be written in the form of ordered lists of instructions and stored within the classical (e.g., digital) memory 204 and executed by the classical (e.g., digital) processor 202 of the classical computer. The memory 204 is classical in the sense that it stores data and/or program instructions in a storage medium in the form of bits (rather than as qubits containing quantum information), which have a single definite binary state at any point in time. The processor may read instructions from the computer program in the memory 204 and/or write data into memory, and may optionally receive input data from a source external to the computer 203, such as from a user input device such as a mouse, keyboard, or any other input device. The processor 202 may execute program instructions that have been read from the memory 204 to perform computations on data read from the memory 204 and/or input from the quantum computing system, and generate output from those instructions. The processor 202 may store that output back into the memory 204.

The quantum computing system 205 may include a plurality of qubits and a controller 206 configured to interface with the plurality of qubits 210 to control, direct and/or measure the qubits within the quantum circuit. The qubits may be configured to evolve in time under the directed influence of the controller, and a measurement system 208 may at times perform quantum measurements on all or a subset of the qubits to obtain quantum measurement results in the form of classical data bits (e.g., ones and zeros). The classical data from the measurement results may be intermediate results that inform behavior of the classical computing system 203 and/or the quantum controller 206 during a quantum computation, and they may additionally include classical results of the quantum computation. The measurement results may be communicated to the classical computing system and/or the controller 206, and further the classical computing system may provide directions and/or instructions to the controller 206 and the measurement system 208 to guide the behavior of the quantum computing system to perform a quantum computation. For example, the classical computing system 203 may provide classical data signals used for quantum state preparation within the quantum computing system 205, in response to which the controller may prepare the states of the qubits 210 into a desired initial state for a particular quantum computation.

In some embodiments, physical qubits 210 are provided to the measurement system 208 and controller 206, where the measurement system and the controller function as a logical qubit encoder that perform a sequence of measurements on the physical qubits to produce a logical qubit (e.g., a logical qubit prepared in a magic state, or another type of fault-tolerant encoded logical qubit). For example, the measurement system and controller may perform a sequence of measurements on the physical qubits to entangle them in such a way as to produce a logical qubit. Encoding the logical qubit will also produce syndrome graph data for the logical qubit as classical information, which is output to the FTPS controller of the classical computing system 203 via the classical channel 212. The FTPS controller analyzes the syndrome graph data to determine an error metric for the logical qubit. It is then determined whether the error metric satisfies a quality threshold specified by a policy. If the quality threshold is not met, the FTPS controller outputs instructions back to the quantum computing system 205 along the classical channel 212 to discard the logical qubit. Alternatively, in some embodiments when the quality threshold is not met, the logical qubit may be flagged as poor quality and/or rerouted to a different aspect of the quantum computation. If the quality threshold is met, the FTPS controller outputs instructions to the quantum computing system 205 to keep the logical qubit.

Figure 3B:
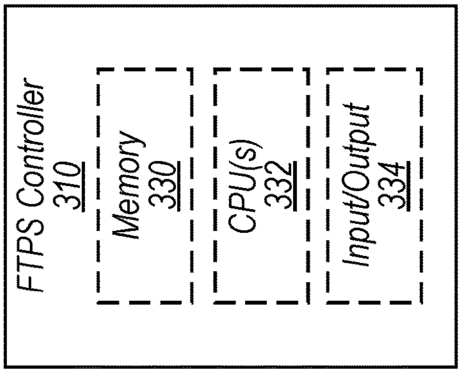
FIG. 3B is a diagram of an FTPS controller, according to some embodiments.
Figure 3A:
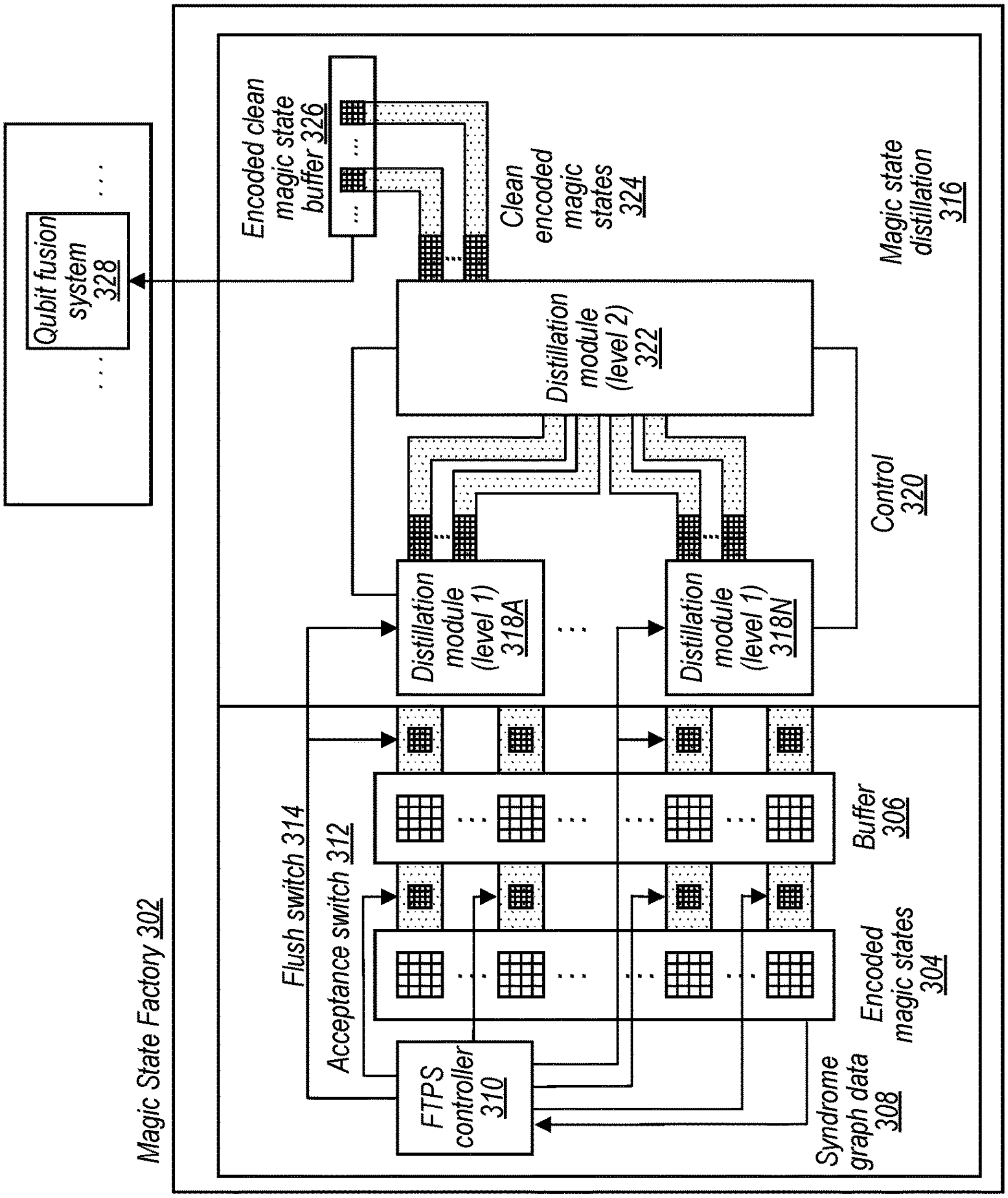
FIG. 3A is a system diagram illustrating how the FTPS controller interfaces with components of a magic state factory, according to some embodiments.

FIGS. 3A-B—Magic State Factory System and FTPS Controller

FIG. 3A illustrates how the FTPS controller interfaces with components of a magic state factory, according to some embodiments. FIG. 3A illustrates a magic state factory that performs two rounds (level 1 and level 2) of magic state distillation, but it is within the scope of the present disclosure to perform more or fewer rounds of distillation (e.g., 1 or 3 levels). The system diagram shown in FIG. 3A is intended to supplement the system diagram shown in FIG. 2, as it illustrates some of the same structural components at a greater level of detail, and furthermore is specific to embodiments where the FTPS controller interfaces with a magic state factory that performs magic state distillation. Note that the magic state factory 302 may be a submodule of the quantum computing system 205 shown in FIG. 2, and further that the FTPS controller may be instantiated within the classical computing system 203, at least in some embodiments.

FIG. 3B is an illustration of components of an FTPS controller, according to some embodiments, and includes a non-transitory computer-readable memory medium 330, one or more processors or central processing units (CPUs) 332, and one or more input/output ports to communicate with elements of the magic state factory 302 and/or magic state distillation unit 316.

In a magic state distillation process, many noisy copies of a magic state are fed into a magic state distillation protocol, producing fewer magic states of significantly higher quality. The output may be utilized in a quantum computation when certain error-detecting measurements in the protocol do not flag the presence of an error.

Figure 4:
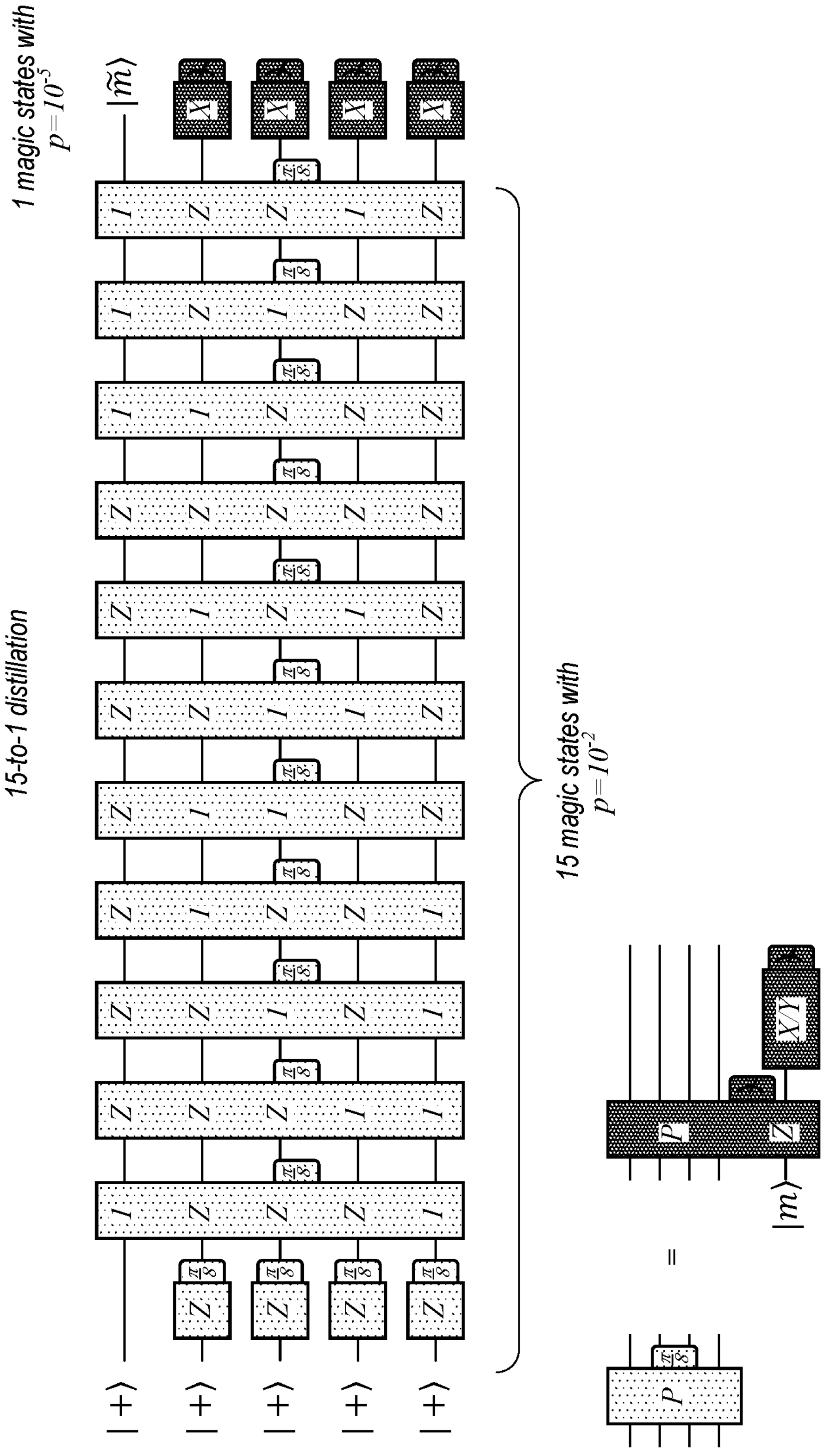
FIG. 4 is a circuit diagram of a 15-to-1 magic state distillation process, according to some embodiments.

For a given protocol, the total overhead of magic state distillation is strongly dependent on the quality of the initial noisy magic states. For example, to first order, a 15-to-1 distillation protocol may take initial magic states with error rate p, and produce fewer magic states with error $35p^3$. An example quantum circuit illustrating this process is shown in FIG. 4. If $p<10^{-3}$, then to reach a target error rate of $10^{-14}$ (or less) as is common in, for example, quantum chemistry applications, this 15-to-1 procedure may be iterated twice (i.e., two rounds of distillation). If the physical error rate is $p=10^{-2}$, an additional round of distillation may be used to obtain the desired target error rate. Hence, the initial magic state quality may severely affect resource overhead, with a large penalty incurred every time an additional round is added.

In practical implementations, both the input magic states and logical operations in the distillation protocol may be imperfect, and they may be encoded in a quantum error-correcting code such as a surface code, e.g., as shown in FIGS. 9-13. These additional sources of noise may reduce the performance of distillation and may be accounted for to determine the overhead and logical error rate(s) of the output magic state(s), in some embodiments. For example, encoding a magic state in a quantum error-correcting code may introduce additional "encoding" errors that may be mitigated (e.g., using post-selection strategies according to embodiments described herein) in accordance with the desired overall error rate for a noisy logical magic state. Hence, when estimating (or optimizing) the overhead for distillation, one may also include the cost for preparing the initial magic states at a desired quality.

As illustrated in FIG. 3A, a plurality of logical qubits is prepared in logical magic states 304. Syndrome graph data 308 associated with encoded logical qubits is provided to the FTPS controller 310 via a classical data channel. As described in greater detail below, for each logical qubit, the FTPS controller may determine whether to keep or discard the logical qubit based on an error metric derived from the syndrome graph data of the respective logical qubit. When it is determined to keep the logical qubit, the FTPS controller provides a keep signal over a classical channel (the "acceptance switch" 312) to the magic state factory, whereupon the logical qubit will be stored in a buffer 306 for subsequent forwarding to the distillation modules 318A-N. In some embodiments, the buffer acts as a quantum memory which can store logical qubits. Logical qubits may be switched in or out of the buffer, as determined and directed by a classical controller (e.g., the FTPS controller 310). Logical qubits in the buffer may also be discarded on demand. A buffer may be implemented in a variety of ways, for example, using a passive qubit memory (such as optical fiber for photonics qubits), or in an active quantum memory such as a patch of qubits implementing surface code quantum error correction, e.g., a sequence of identity gate stabilizer measurements (or a similar method in a fusion network in FBQC).

In some embodiments, if it is determined to discard the logical qubit, a discard signal may be provided over the acceptance switch, whereupon the respective logical qubit will be discarded. In some cases, when the number of kept logical qubits in a given clock cycle is less than the amount utilized for the distillation process (e.g., 15 for a 15-to-1 distillation process), a flush signal may be provided over the flush switch 314 to flush (i.e., discard) all logical qubits kept in the buffer for that cycle, since there are insufficient logical qubits to execute the distillation process. In some embodiments, logical magic states may be flushed individually (e.g., according to their time lapsed, or any other information that may arise, for example, in response to further syndromes arising during active error correction). In some embodiments, logical magic states may be used sequentially for distillation rather than utilizing all 15 at once. In this case, the distillation unit may idle for a period of time while waiting for the subsequent logical magic states.

In some embodiments, the acceptance switch 312 and/or the flush switch 314 are implemented in circuitry as a controllable qubit router that may controllably direct an input logical qubit toward two or more destinations within the quantum computer.

After receiving the logical qubits, the level 1 distillation modules 318A-N perform a distillation process on the logical qubits, such as the process shown in FIG. 4. The higher fidelity logical qubits output from the level 1 distillation modules may be fed into the level 2 distillation module 322 for a second round of distillation. Clean (i.e., high fidelity) logical qubits prepared in the logical magic state 324 may then be routed to the encoded clean magic state buffer 326, for subsequent provision to the qubit fusion system 328 for use in a quantum computation. Note that while FIG. 3A illustrates a magic state factory with two levels of distillation, it is within the scope of the described embodiments to implement magic state factories with fewer (i.e., one) or more levels of distillation.

Bridging Quantum Computations and Hardware Instructions

Quantum computing involves complex processes and architectures with structure, terminology and detail that are manifest at many different length scales. For example, in the specific case of dual-rail photonic quantum computation, the smallest computational length scale involves individual photons propagating along waveguides and interacting with phase shifters. To perform a quantum computation with these photons involves many hierarchical and inter-related layers of complexity and structure, such as seed state generation, resource state construction, interleaving, and constructing logical qubits. These underlying nested layers of structure may be first constructed before quantum circuits and computations are designed and executed, in at least some embodiments. The following paragraphs and FIGS. 5-6 introduce quantum circuit diagrams and explain how these higher-level diagrams may be decomposed into more elementary qubit operations, in some embodiments.

Figure 5A:
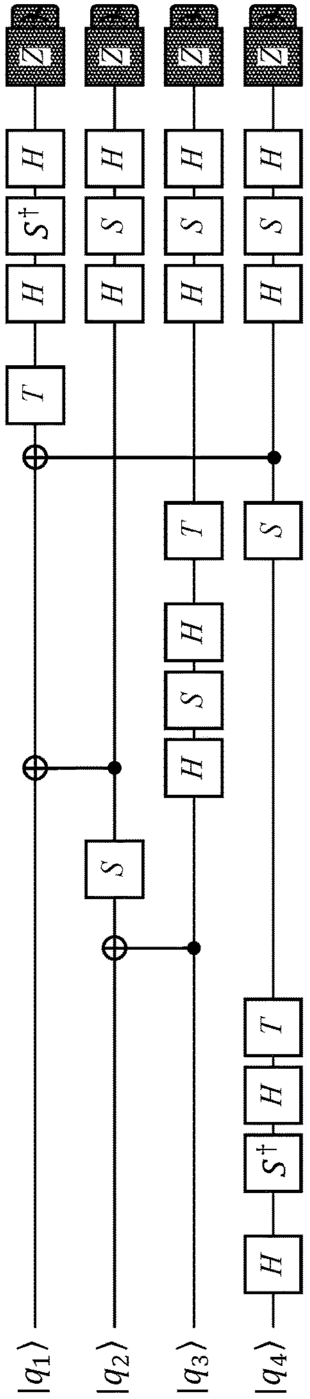
FIGS. 5A-G are circuit diagrams illustrating how to bridge from higher level Clifford and T gates to more elementary Pauli product measurements, according to some embodiments.
Figure 5B:
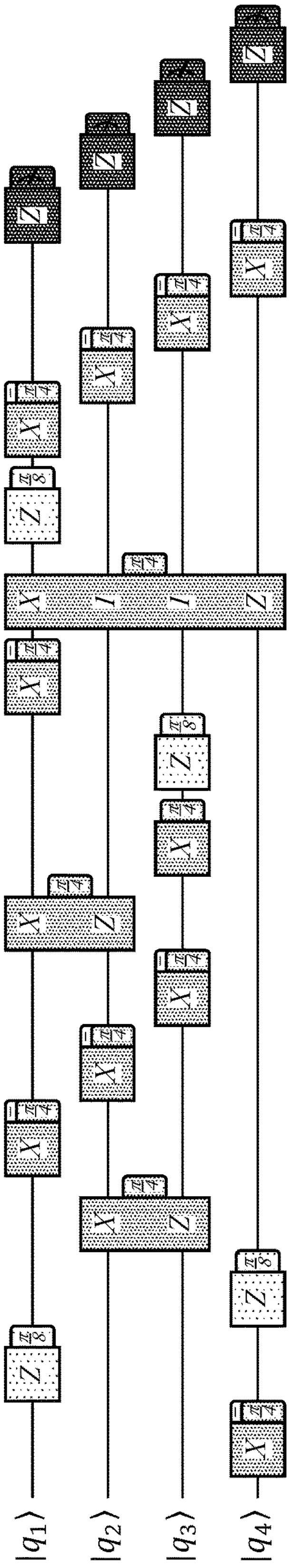
Figure 5C:
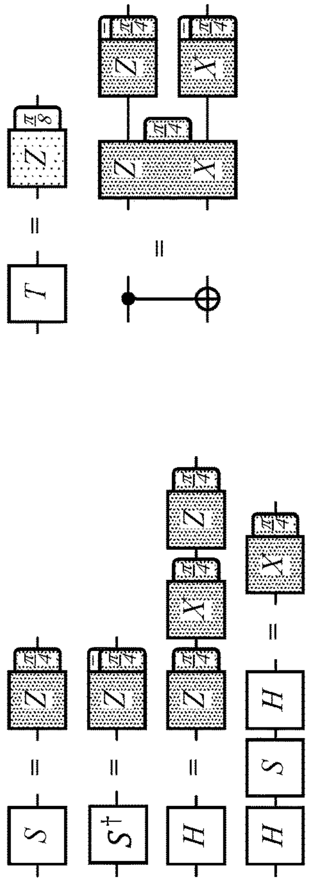
Figure 5D:
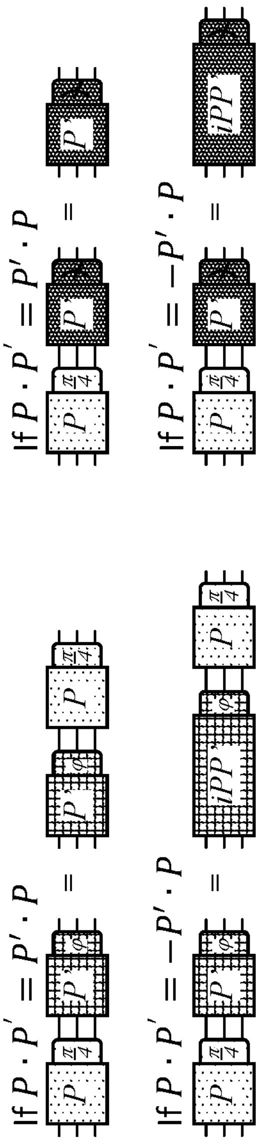

FIG. 5A is a circuit diagram illustrating a sequence of operations including Clifford gates and T gates performed on four logical qubits, $q_1$-$q_4$. FIG. 5B illustrates this same circuit diagram, where the Clifford and T gates have been decomposed into combinations of simpler Pauli product measurements (PPMs, i.e., X and Z measurements) and Pauli product rotations (PPRs, i.e., X and Z measurements with π/4 or π/8 phase rotations), as defined in the legend shown in FIG. 5C. For example, a PPR may be represented mathematically as $PPR=e^{-iP\varphi}$, where P is a Pauli operator. These X and Z measurements with phase rotations may be commuted with each other according to the definitions shown in FIG. 5D. This process is referred to as "Clifford frame tracking", and repeated iterations of the commutation rules shown in FIG. 5D may transform the circuit of FIG. 5C into the one shown in FIG. 5E, which contains only π/8 PPRs and PPMs.

Figure 5E:
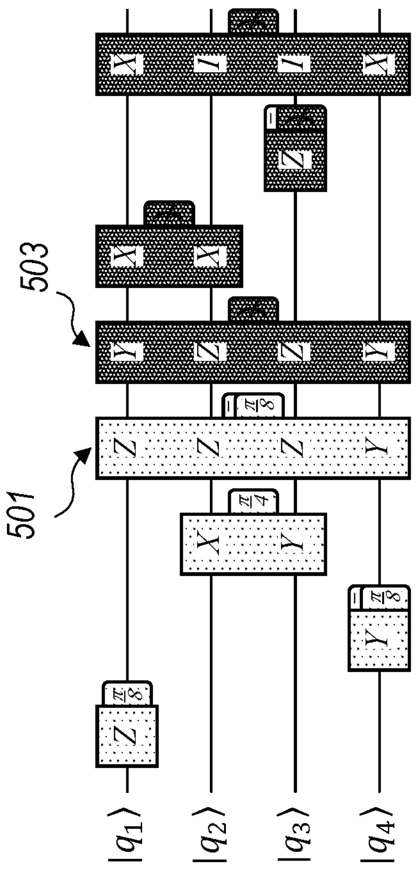
Figure 5F:
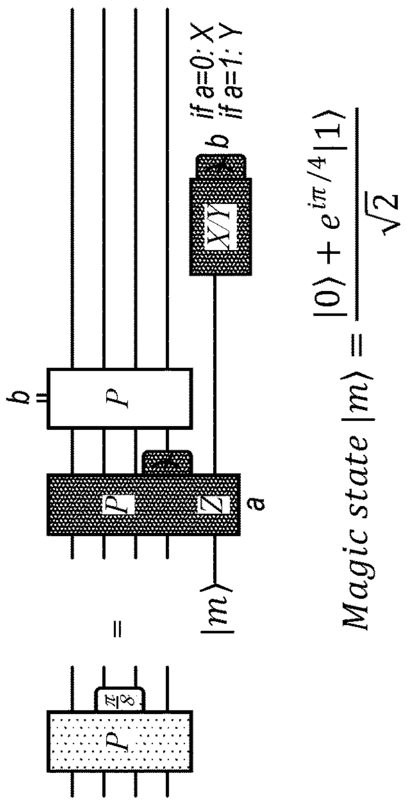

Finally, the circuit identity shown in FIG. 5F may be used to replace each π/8 rotation with a magic state and a PPM. This replacement results in the circuit diagram shown in FIG. 5G, which involves only PPMs and magic states.

Figure 6A:
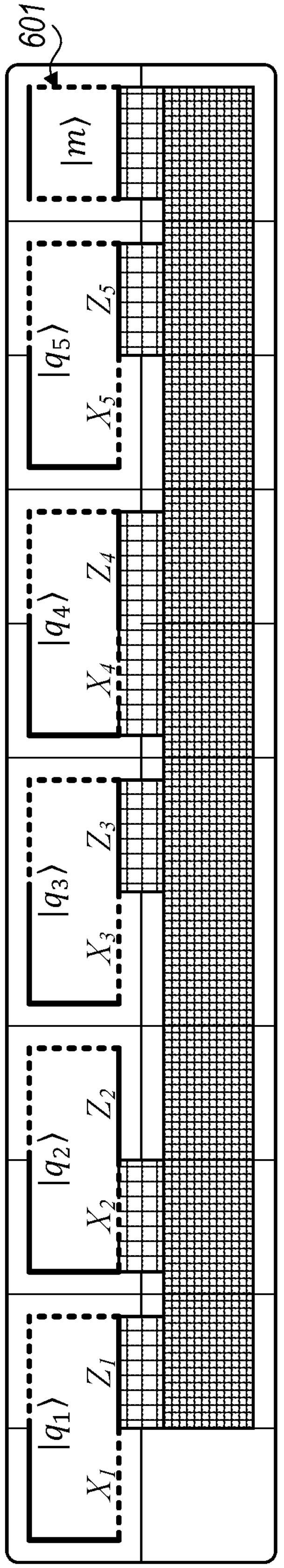
FIGS. 6A-D illustrate a example implementation for performing multi-qubit measurements on logical qubits, according to some embodiments.
Figure 6B:
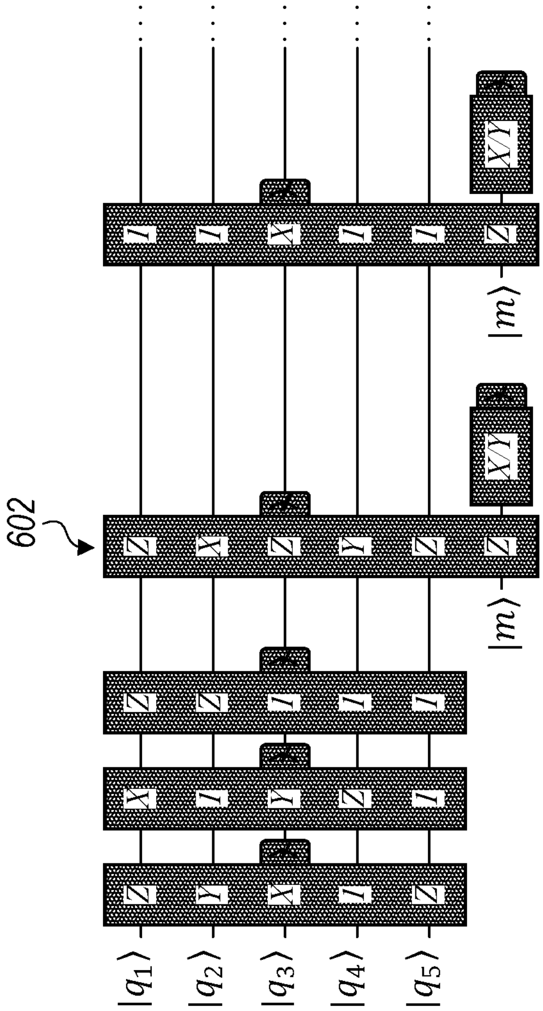

FIG. 6A illustrates at a more detailed level how a particular multi-qubit measurement (indicated by the arrow 602 in FIG. 6B) may be performed on five logical qubits $q_1$-$q_5$ and a logical magic state m. The solid borders of the logical qubits illustrate where coupling to the qubit may result in a Z measurement, and the dotted borders illustrate where coupling may result in an X measurement. Y measurements may be obtained by performing both X and Z measurements. The top row within the FIG. 6A illustrates the location of the physical qubits, and the bottom row represent auxiliary qubits that are used to facilitate qubit measurements. FIG. 6A illustrates a ($Z_1$, $X_2$, $Z_3$, $Y_4$, $Z_5$) measurement with a π/8 rotation (e.g., due to the influence of the magic state).

Figure 6D:
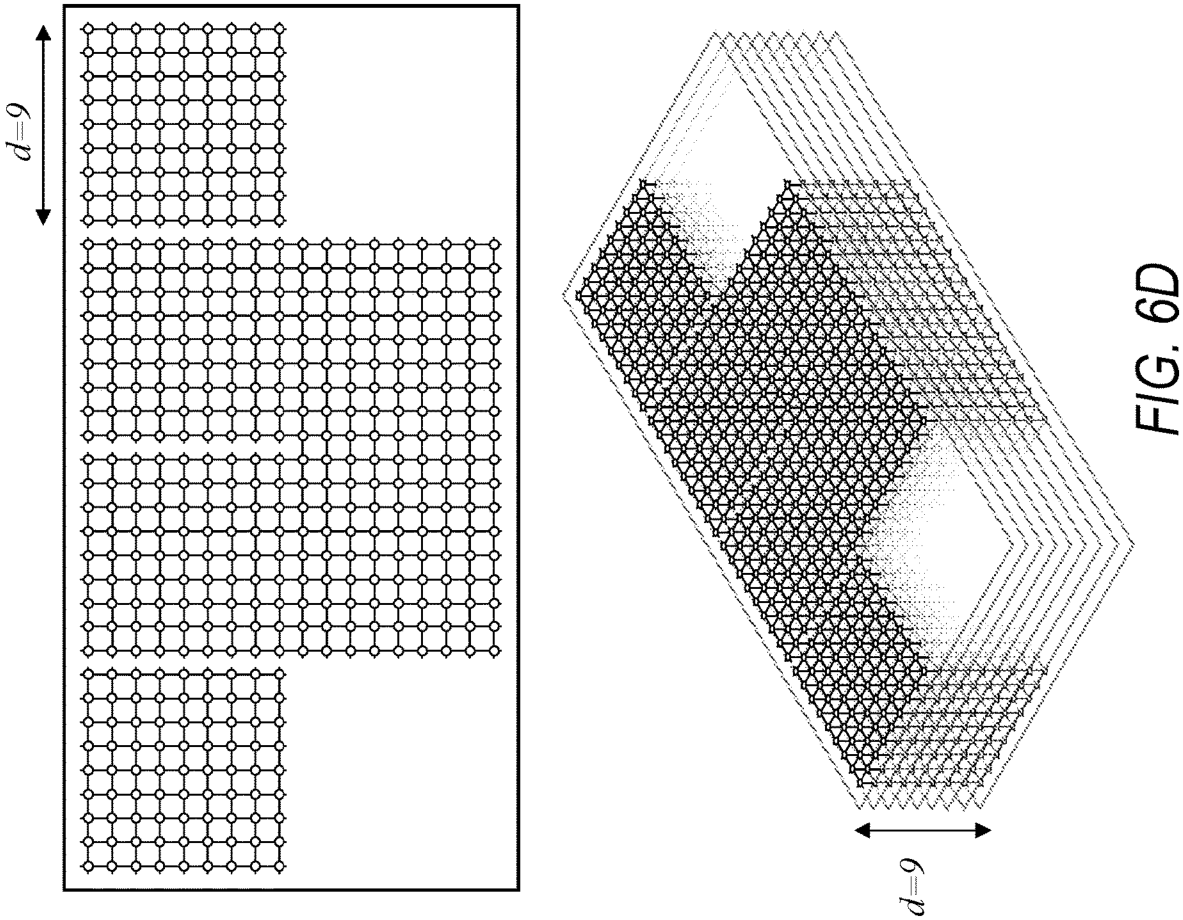
Figure 6C:
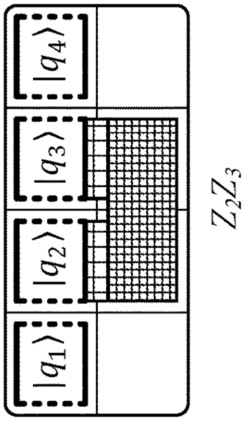

FIGS. 6C-D illustrate in even further detail an arrangement of physical qubits that may be used to perform a ($Z_2$, $Z_3$) measurement on four logical qubits $q_1$-$q_4$. The individual circles shown in the rectangular sheet in the top half of FIG. 6D represent individual physical qubits, and the lines connecting adjacent qubits indicate entanglement. In the stack of layers shown on the lower half of FIG. 6D, the vertical direction represents the depth of the logical qubit, which is a sequence of nine entangling measurements performed on the 9×9 grid of physical qubits representing each of the qubits $q_1$-$q_4$ as well as a portion of the auxiliary qubits.

Figure 6E:
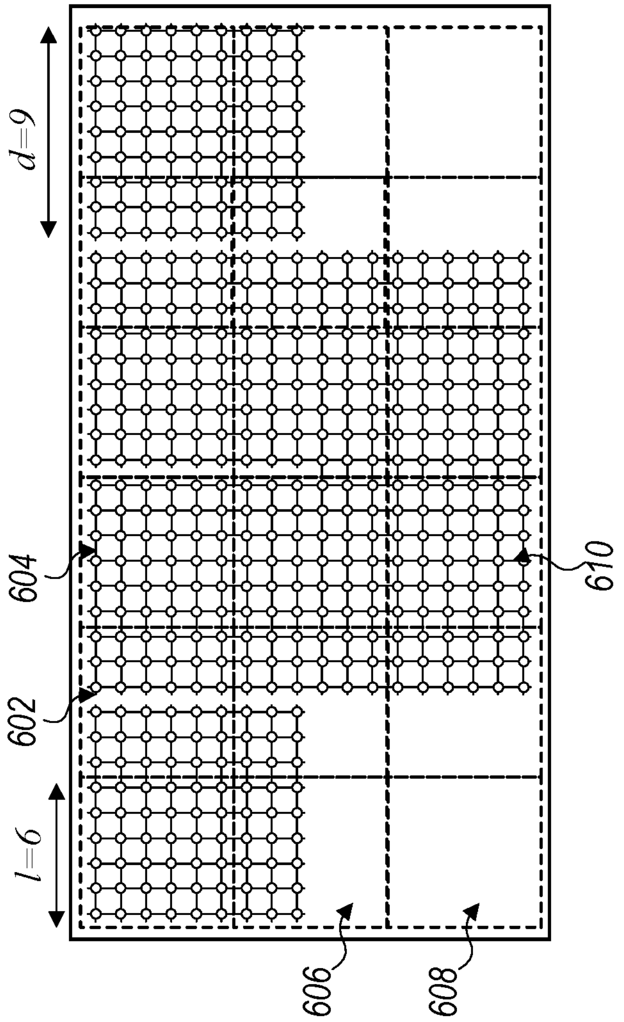
FIG. 6E illustrates allocating a 4 logical qubit code between 18 hardware units, according to some embodiments.

FIG. 6E illustrates how the physical qubits illustrated in FIG. 6D may be encoded using 18 units of physical hardware (e.g., 18 interleaving circuits). As illustrated, each interleaving circuit encodes a set of 36 physical qubits in the illustrated sheet. As one example, the physical qubits may be encoded using a raster scan methodology where the 36 qubits are sequentially produced, mutually entangled, and preserved for 36 time cycles using variable fiber optic cable lengths until all 18 interleaving circuits have completed 36 cycles, whereupon the next sheet of physical qubits may be encoded.

Magic States

Figure 5G:
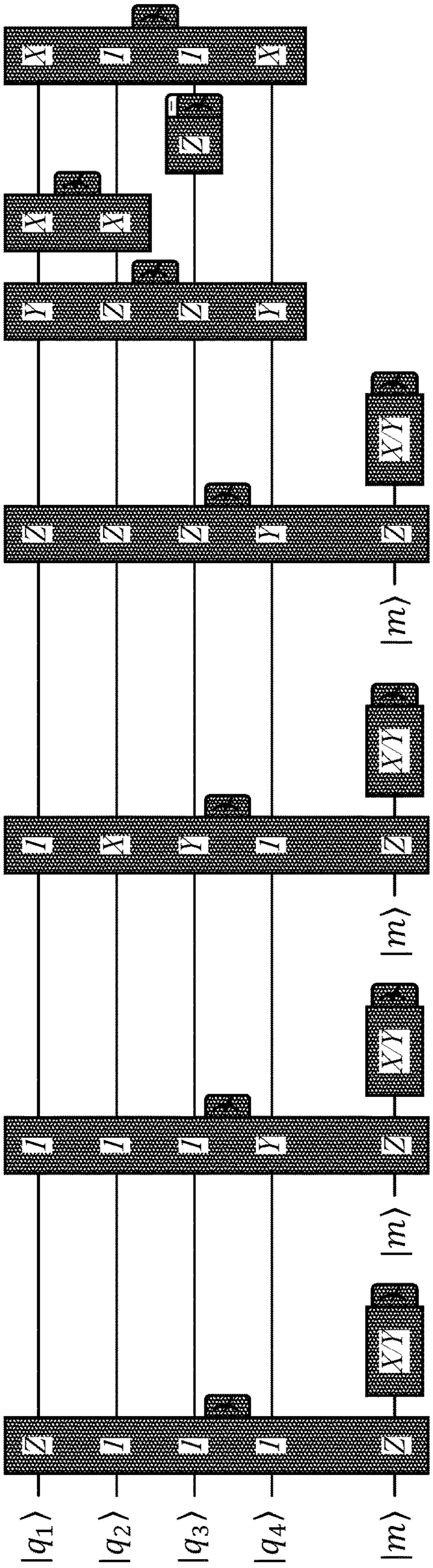

Many quantum computations utilize logical qubits prepared into so-called "magic states" to decompose more complex logical qubit operations into simpler operations. For example, FIG. 5E illustrates an example of a series of circuit operations that may be performed on a system of four physical qubits, $q_1$-$q_4$. FIG. 5E illustrates two types of multi-qubit circuit operations, multi-qubit measurements combined with a π/8 or π/4 phase shift (a "P" operation, shown with lighter shading such as operation 501), and multi-qubit measurements without a phase shift (shown in darker shading, and also referred to as a Pauli product measurement (PPM), such as operation 503). As explained above in reference to FIG. 5F, a PPR operation with a π/8 phase shift may be decomposed into a simpler PPM with the addition of a "magic state", $|m\rangle$. Note that the magic state may be a linear combination of the two logical qubit states $|0\rangle$ and $|1\rangle$ prepared in a specific relative phase arrangement, as illustrated in FIG. 5F. FIG. 5F illustrates a particular example of a magic state, but more generally a magic state may be any of a variety of other states obtained via non-Clifford gates that are in a specific relative phase arrangement. FIG. 5G illustrates the sequence of operations of FIG. 5E decomposed into a sequence of PPMs using auxiliary magic states. Other non-Clifford gates may be similarly performed using magic states. In general, any quantum circuit may be represented as a sequence of PPMs and magic states.

In some embodiments, a large number of magic states may be used in a given quantum computation, and dedicated “magic state factories” may be designed for the dedicated purpose of producing high-fidelity magic states at regular intervals (e.g., at the clock rate of the resource state generators (RSGs) of the quantum computer). In some embodiments, “magic state distillation” may be employed whereby a plurality of lower fidelity magic states are input into magic state distillation unit to output a single higher fidelity magic state, and this process may be iterated one or more times to produce increasingly higher fidelity magic states. As one example, a 15-to-1 distillation process may be used whereby 15 input magic states with an error probability of $10^{-2}$ may be used to produce a single output magic state with error probability of $10^{-5}$. An example circuit of a 15-to-1 distillation process is shown in FIG. 4. Subsequently, fifteen of the output magic states may be run through a second round of distillation to further improve the error probability from $10^{-5}$ to $10^{-14}$.

The process of producing magic states and distilling them to a sufficiently high fidelity may contribute a significant amount to the circuitry, overhead and complexity of a quantum circuit. In particular, it may significantly increase the computational cost of a quantum computation when two layers of magic state distillation are utilized rather than only a single layer. Embodiments herein present methods and systems for performing post-selection of logical qubits prepared into magic states to intelligently select high-fidelity magic states before they are input into the distillation process. Advantageously, a desired threshold level of fidelity for the output magic states may be obtained with a smaller circuitry footprint and/or with fewer layers of magic state distillation. For example, if a particular quantum computer is able to produce logical qubits prepared in magic states with an error rate of $10^{-2}$, two rounds of distillation will reduce the error rate to $10^{-12}$, whereas for magic states with an error rate of $10^{-3}$, two rounds of distillation will reduce the error rate to $10^{-21}$. Accordingly, if the fault-tolerance specifications of a quantum computation target magic states with an error rate of $10^{-14}$, post-selecting the higher fidelity magic states to decrease their error rate to $10^{-3}$ may enable the $10^{-14}$ threshold to be obtained with two rounds of 15-to-1 distillation (rather than three rounds of distillation), significantly reducing the computational burden of the magic state factory.

Figure 7:
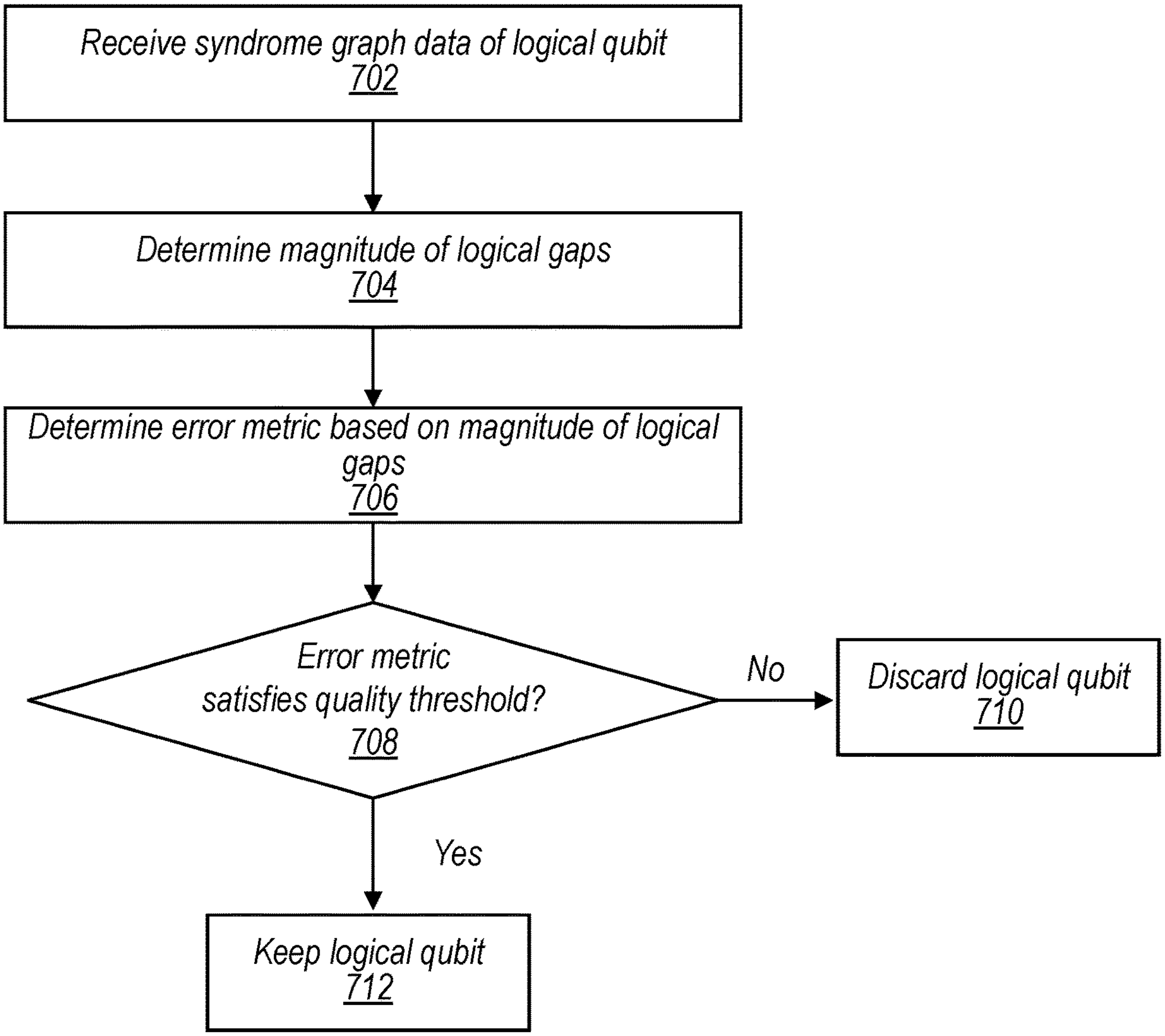
FIG. 7 is a flowchart illustrating a method for performing fault-tolerant post-selection of logical qubits, according to some embodiments.

FIG. 7—Flowchart for Fault-Tolerant Post-Selection of Logical Qubits

FIG. 7 is a flowchart that illustrates a method for performing fault-tolerant post-selection of logical qubits, according to some embodiments. The method shown in FIG. 7 may be used in conjunction with any of the computer systems or devices shown in the above Figures, among other devices. For example, the method shown in FIG. 7 may be performed by a quantum computing device or system as illustrated in FIGS. 2 and 3. The quantum computing system may further include a fault-tolerant post-selection controller (e.g., the FTPS controller 310 illustrated in FIG. 3) to direct the described method steps, and may be included in (or be coupled to) a classical computing system for processing classical information and directing operations of the quantum computing system. For example, the FTPS controller may include one or more processors configured to execute program instructions stored on a non-transitory computer-readable memory medium. In some embodiments the methods described in FIG. 7 may be utilized in a quantum communication network, quantum internet, or more generally in any application where it is desired to encode high fidelity qubits. It is to be understood that this method may be used by any quantum computing architecture, and these other architectures should be considered within the scope of the embodiments described herein. As illustrated, the method shown in FIG. 7 may proceed as follows.

At 702, syndrome graph data of a logical qubit is received. The logical qubit may be an encoded qubit that includes a plurality of physical qubits, where the syndrome graph data includes classical information describing outcomes of the encoding process of the logical qubit. The syndrome graph data may specify the locations of one or more syndromes (i.e., parity errors) and/or one or more erasure errors in the syndrome graph of the logical qubit. The syndrome graph data may also specify a respective set of corrected edges produced by a decoder for each of a first and second correction of the syndromes and/or erasure errors, as described in greater detail below.

In some embodiments, the logical qubit is prepared into a logical magic state, where the logical qubit includes a first physical qubit prepared in a magic state and a plurality of second physical qubits encoded with the first physical qubit. Note that the first physical qubit may be prepared in a magic state, for example as $|m\rangle=(|0\rangle+e^{i\pi/4}|1\rangle)/\sqrt{2}$, whereas the logical qubit is prepared in a logical magic state that includes the first physical qubit encoded with the plurality of second physical qubits. The logical magic state of the logical qubit differs from the magic state of the first physical qubit in that the logical magic state includes a plurality of physical qubits and is fault-tolerant. More generally, the logical qubit may be any combination of physical qubits encoded in a logical quantum state using a quantum error-correcting code.

Figure 10:
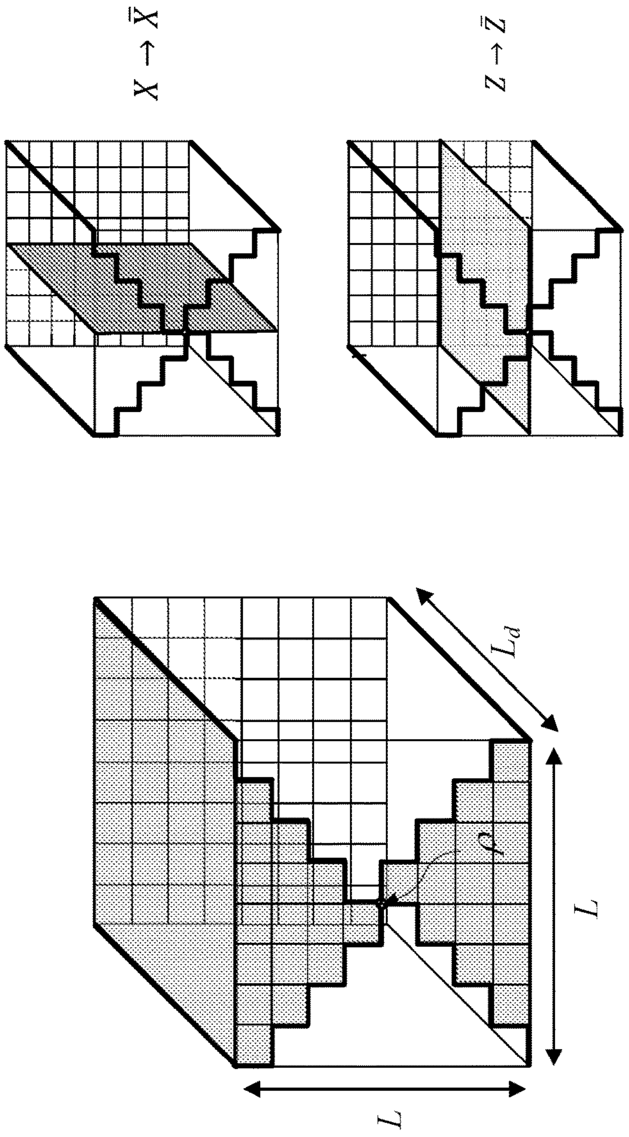
FIG. 10 is a space-time diagram for the location of boundaries within a fault-tolerant code, where the bold jagged lines denote boundaries between X and Z domains, according to some embodiments.

In some embodiments, the method described in FIG. 7 utilizes a FBQC approach, where the logical qubit is encoded using a fusion-based quantum computing protocol which performs a sequence of fusion measurements on the first resource state prepared in a magic state and the plurality of second resource states. FIG. 10 illustrates an example of how a logical qubit may be encoded using a fusion-based implementation. In FIG. 10, the direction that runs into the page represents time (e.g., along the $L_d$ direction), where each layer represents a subsequent set of fusion measurements and the logical qubit is output as the last sheet that is set deepest into the page.

In an FBQC implementation, the physical qubits are multi-qubit resource states, where each resource state includes a plurality of qubits prepared in a specific entangled state. For example, in some embodiments a 6-qubit resource state is employed, so that the center physical qubit of the logical block ρ is a 6-qubit resource state which includes a magic state, and the plurality of surrounding physical qubits are additional respective resource states prepared in particular entangled states (cf. FIG. 10), as prescribed by the error-correcting code and desired logical operation. At each time step, a subset of the qubits of each resource state are fused with respective qubits of other resource states, and a remaining subset of the qubits of each resource state are propagated to a subsequent time step to carry the entangled quantum information until the end of the computation, whereupon all remaining resource state qubits are measured. The logical block then includes the resource states that are input into the block (e.g., the input surface 114 from FIG. 1H), the classical information that results from the fusion measurements, and the qubits that are output at the back end of the block (e.g., the output surface 118 from FIG. 1H).

In some embodiments, the logical qubit is encoded using circuit-based quantum computing. In this case, the plurality of physical qubits may include a plurality of measure qubits that are measured and a plurality of data qubits that maintain the entangled quantum information. An example of a circuit-based implementation for encoding a logical qubit into a logical magic state is shown in FIGS. 12A-D. As illustrated in FIGS. 12A-D, the initial configuration of qubits for a circuit-based implementation with a planar array of qubits is measured according to surface code stabilizers to result in the desired encoding.

The method described in FIG. 7 is in reference to fault-tolerant post-selection of logical qubits. In some embodiments, fault-tolerant post-selection may be performed more broadly on other types of logical blocks. As used herein, a "logical block" refers to any plurality of physical qubits that are encoded together in a quantum error-correcting code where an operation (for example, a quantum gate acting on a logical qubit) is performed on encoded logical information. A logical block may consist of an entire logical qubit, multiple logical qubits, or one or more logical gates. In some embodiments, a logical block may include one or more input ports and one or more output ports.

In some embodiments, FTPS may be performed on a portion of one or more logical blocks or logical qubits, which is referred to herein as a "subblock." FIG. 6E shows multiple subblocks stitched together into a single logical block. As illustrated in FIG. 6E, a given hardware block such as an interleaving circuit may be configured to be encoded as multiple subblocks that each include only a portion of one or more logical qubits. Each dashed box in FIG. 6E delineates (potentially together with corresponding boxes in subsequent sheets) a respective subblock. For example, as can be seen by comparison of FIG. 6E with FIGS. 6C and 6D, the subblock 604 encodes a portion of the logical qubit $q_2$, the subblock 602 encodes portions of both $q_1$ and $q_2$, the subblock 606 encodes a portion of $q_1$ and is partially dormant, the subblock 608 is entirely dormant for the illustrated set of clock cycles, and the subblock 610 encodes a portion of a block of logical ancillary qubits. The subblocks in FIG. 6E as illustrated are stitched together (e.g., through fusion measurements in FBQC) to form the entire logical block that describes the $Z_2Z_3$ two-qubit measurement. In performing FTPS on subblocks, the subblocks may be first created separately (i.e., not stitched together), FTPS may be performed to select high-quality subblocks, and the selected subblocks may be then entangled to produce the desired logical operation.

When the interleaving length l is larger than the code depth d (not illustrated), a subblock may include multiple logical qubits and/or portions of logical qubits. Methods described herein for performing FTPS may be generally applied to various types of logical blocks, logical qubits, or subblocks, in various embodiments.

Figure 8A:
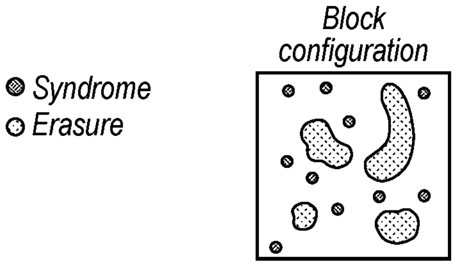
FIG. 8A is an illustration of syndromes and erasure errors within a syndrome graph, according to some embodiments.

The syndrome graph data may include one or more syndromes, which represent one or more Pauli errors in the syndrome graph. A Pauli error refers to, as one example, a qubit flip error where a qubit has flipped its value (e.g., in the case of a dual-rail encoded photonic qubit, the photon may have inadvertently moved to the other waveguide), and is contrasted with an erasure error where the qubit has escaped the circuit (e.g., a photon may have tunneled out of and escaped the waveguide). The syndrome graph data may further contain one or more erasure errors, which represent locations where a physical qubit is missing (e.g., where a photon escaped). An illustration of syndromes and erasure errors within a syndrome graph is shown in FIG. 8A.

At 704, at least one logical gap magnitude is determined from the syndrome graph data. The logical gap magnitude is a magnitude of the difference in weights between first and second correction operators belonging to distinct classes of correction. In some embodiments, the logical gap is computed from the syndrome graph data, and the first and second corrections correct for syndromes indicated by the syndrome graph data. In some embodiments, the weight of a correction operator is computed as a real-valued monotonic function of the number of syndrome graph edges that it corrects (i.e., the number of non-identity single-qubit Pauli operators in the correction).

In some embodiments, weight contributions are computed for each single-qubit Pauli operator for a respective correction on the code or fusion network (on the syndrome graph, this corresponds to assigning a weight contribution to each corrected edge of the syndrome graph), and the overall weight of the correction is obtained by combining the weight contributions for each corrected edge of the correction. In some embodiments, the weight contributions may be computed as the log-likelihood ratios of the error rate that each qubit or fusion outcome is subject to. Edges may have weight zero, as could be the case, for instance, if an erasure error is detected on that qubit/fusion outcome. In the event that one considers a correlated error model, one can compute the weight of the correction in terms of new weights assigned to multi-qubit Pauli operators (in the syndrome graph, this corresponds to adding additional edges with appropriate weight contributions).

In some embodiments, the first and second corrections may be determined by a decoder, and may correspond to two potential corrections to the syndrome graph that either preserve or flip the overall logical state of the logical qubit, in some embodiments. For example, the syndrome graph data may be provided to a decoder, and the decoder may determine the first correction as the most likely correction that does not alter the overall logical state of the logical qubit. To obtain the second correction, the syndrome graph may be provided to the decoder with the constraint that it is to return a correction that flips the value of the logical qubit, and the decoder may determine the most likely correction satisfying this constraint.

Said another way, if we denote C as the correction and E as the true error that occurred (which the decoder does not know), without the constraint (i.e., for the first correction) the decoder will determine the correction that has the highest probability of giving C+E=I, where I denotes a logical identity. In other words, it tries to find the first correction C that fixes what it thinks is the true error such that nothing happens to the logical state of the block. For the second correction, the decoder is constrained to determine a C with the highest probability of giving C+E=Flip, where Flip denotes a flip of the state of the logical qubit. In other words, the correction plus the error should flip the logical sector.

The decoder may add information related to the first and second corrections to the syndrome graph data, and this supplemented syndrome graph data may then be provided to the FTPS controller. In some embodiments, the decoder may be comprised within the FTPS controller, or alternatively it may be instantiated as separate circuitry (e.g., as a dedicated classical processor and memory coupled to the FTPS controller, which may be contained within the classical computing system 203). The information related to the first and second corrections specifies the modifications to the syndrome graph that are entailed by the respective corrections (i.e., the location and/or number of the edges that are flipped by the correction). These first and second corrections are then the two alternative corrections for which two respective weights are determined by the FTPS controller from the syndrome graph data received from the decoder, and the magnitude of the difference between the two weights is the magnitude of the logical gap. A simple example of two alternative corrections to a 2D syndrome graph is shown in FIGS. 19C-D.

In some embodiments, the overall weight of each correction may be determined as a weighted summation over the weight contributions of each corrected edge of the respective correction. In some embodiments, the summation is weighted based on log-likelihood ratio (LLR) weights of the respective corrected edges, as shown in the expression $w_e = \ln 1 - p_e/p_e$, where $p_e$ is the (marginal) probability of a Pauli error on that edge. In these embodiments, a corrected edge with a smaller error probability $p_e$ will have a larger weight than if the corrected edge had a larger error probability. In this manner, edges that are relatively more likely to have experienced an error will be granted a smaller weight. Accordingly, corrected edges that are more likely to have experienced an error will have a smaller weight contribution (as else being equal), where a smaller overall weight corresponds to a correction that is more likely to not result in a logical error. Said another way, edges with a large $p_e$ are relatively more likely to require correction, and the LLR weights promote these corrections. For some logical blocks, each edge may have the same error probability $p_e$ such that $w_e$ has a single value that is constant throughout the block. However, in some cases, different edges may have different error probabilities and $p_e$ may vary between different edges in the logical block.

For a pair of parity errors that is identified as a pair of syndromes to be corrected in the syndrome graph, there may be many different combinations of Pauli errors that may be used to attempt to correct the parity error (e.g., any sequence of flipped edges on the syndrome graph that share endpoints with the pair of parity errors). The decoder may provide two specific alternative corrections, as shown in FIGS. 19C and 19D. The weight of each correction may be generally understood to be an increasing function of the number of flipped edges in the correction, whereby (all else being equal, e.g., without accounting for any potential weighting of the flipped edges based on their log-likelihood ratios and/or their location in the syndrome graph) corrections that flip a larger number of edges will have a larger weight than corrections that flip fewer edges. In some embodiments, the set of corrected edges connects each pair of syndromes in the syndrome graph in a particular way according to a geometry determined by the decoder.

In some embodiments, the summation of weight contributions for corrected edges may be weighted based at least in part on graph distances of nodes of the respective corrected edges from the first (center) physical qubit, wherein shorter graph distances are granted a larger weight than longer graph distances. In other words, corrected edges that are located closer to the first physical qubit (i.e., the center physical qubit prepared in the magic state) of the syndrome graph may be weighted to contribute more to the overall weight than corrected edges that are farther from the center. In some embodiments, weight contributions for corrected edges may be weighted such that shorter graph distances are granted smaller weights than longer graph distances. As described below, this radial distance weighting may select for higher quality logical qubits.

Figure 11A:
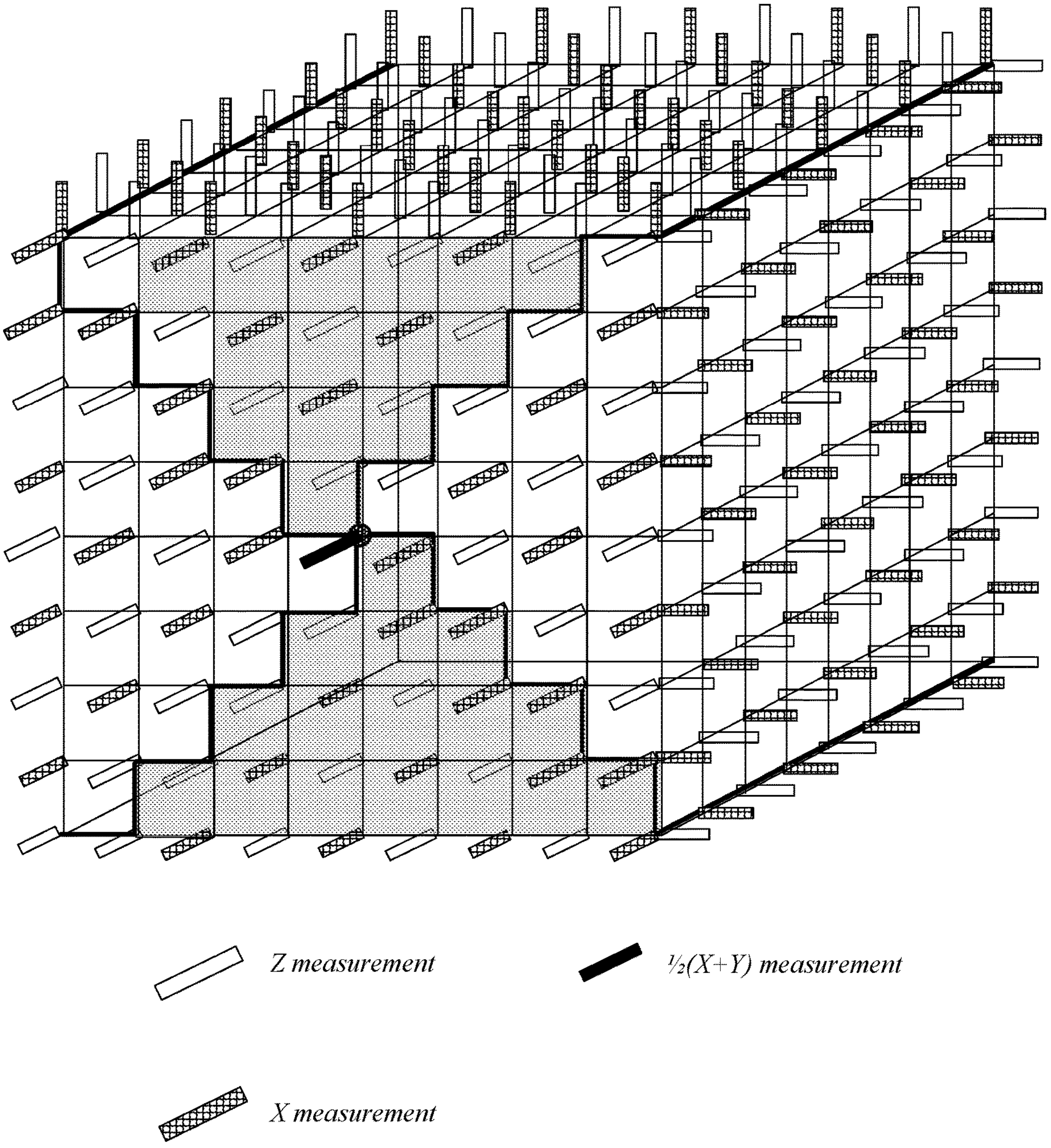
FIGS. 11A-C illustrate a measurement pattern for implementing fusion-based quantum computing (FBQC) using a 6-ring fusion network, according to some embodiments.
Figure 11B:
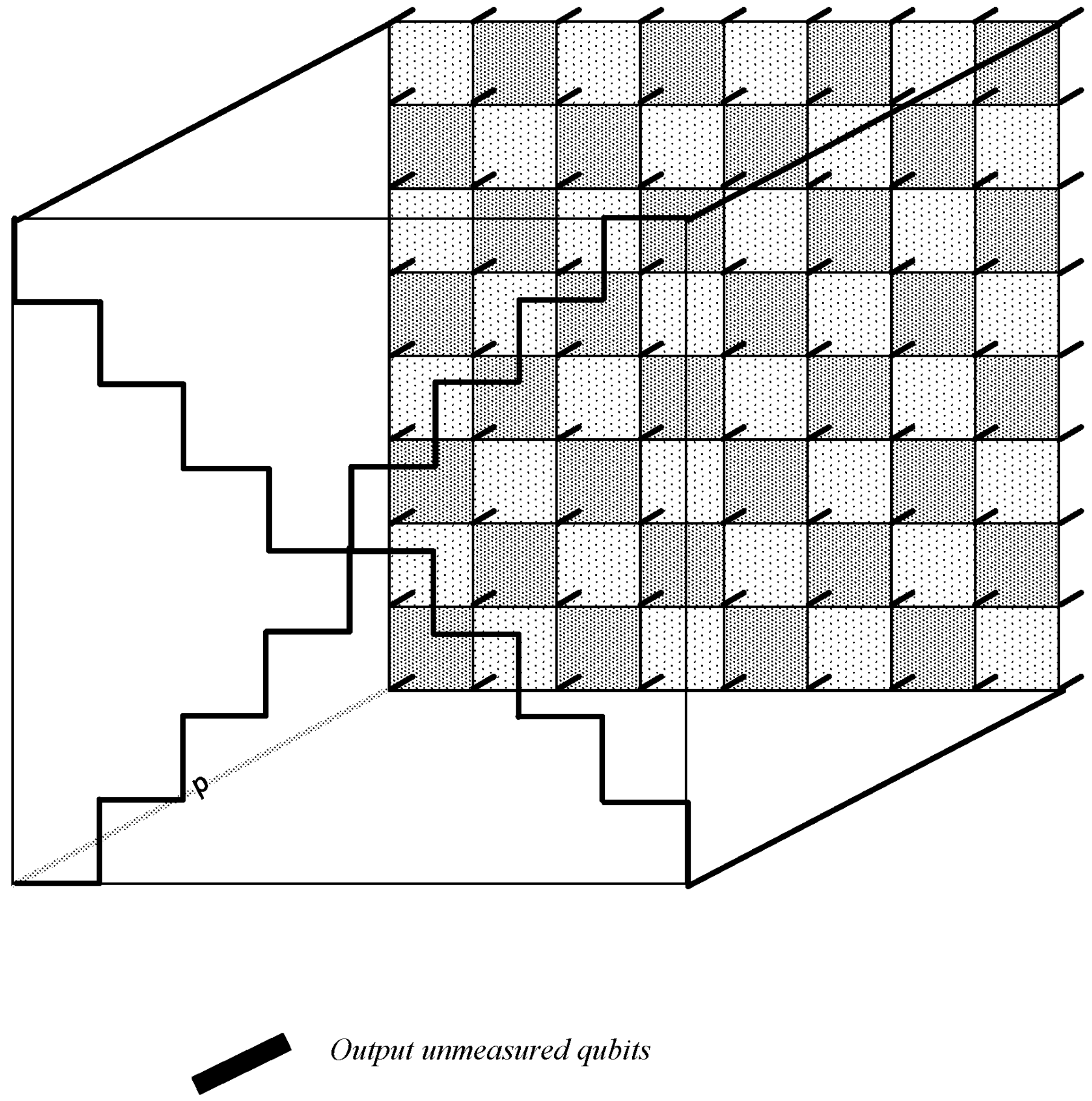
Figure 11C:
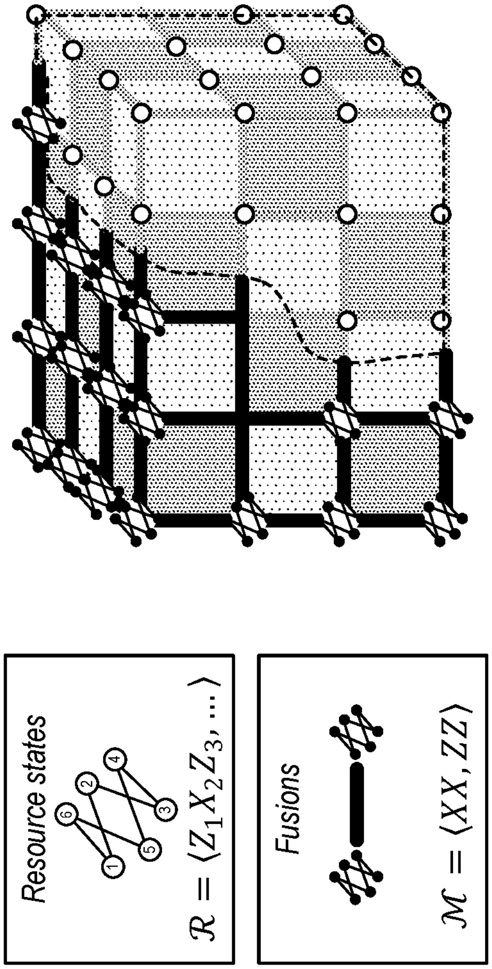
Figure 12A:
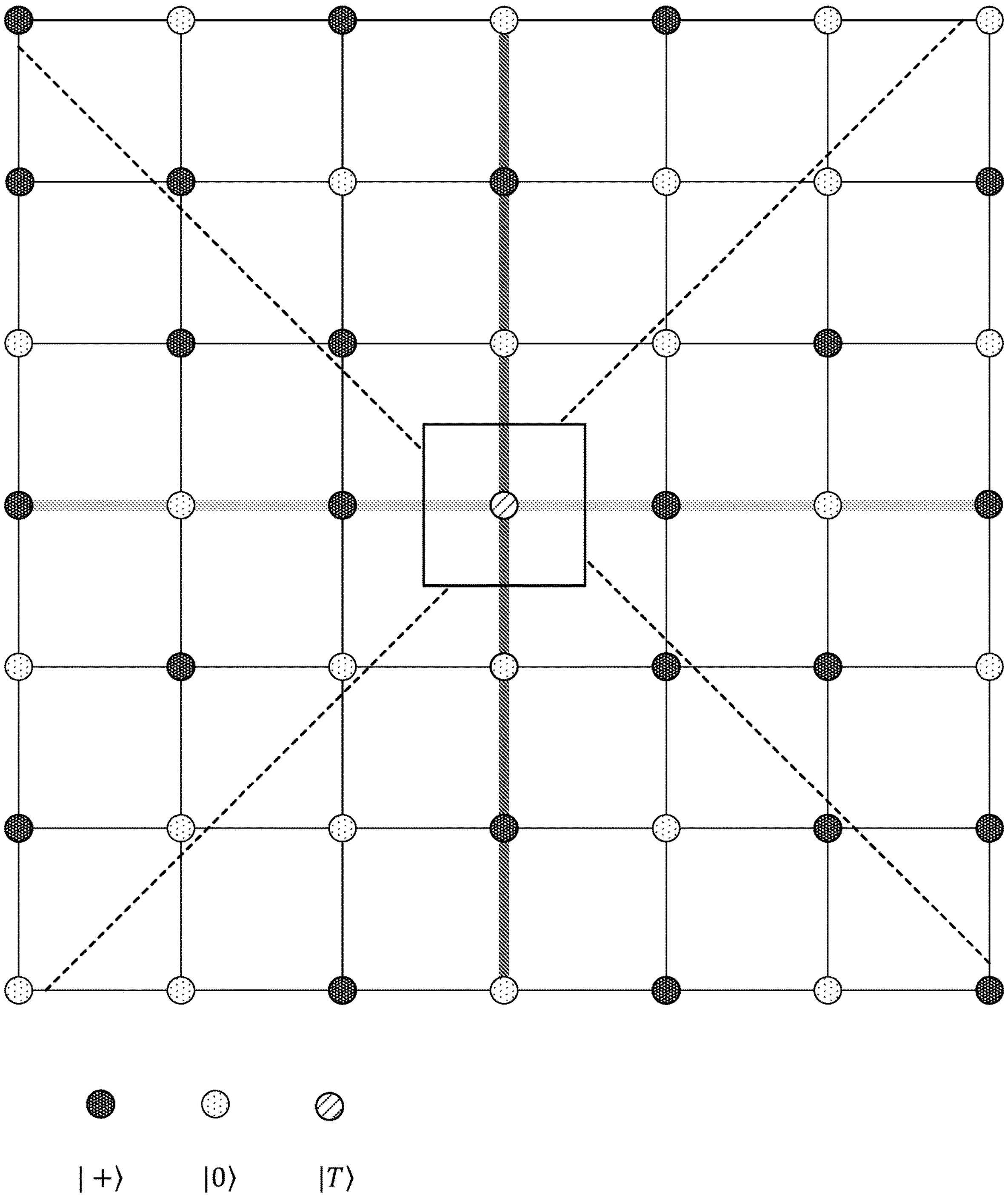
FIGS. 12A-D illustrate an example code structure for a circuit-based quantum computing fault-tolerant code, according to some embodiments.
Figure 12B:
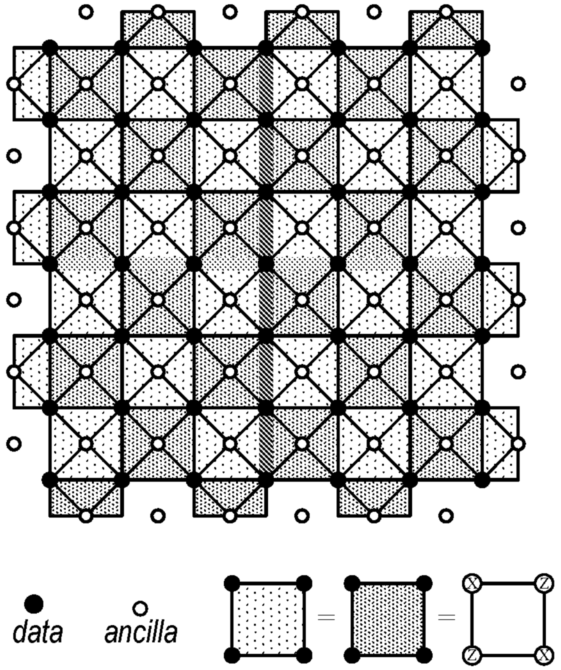
Figure 12C:
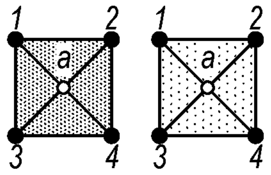
Figure 12D:
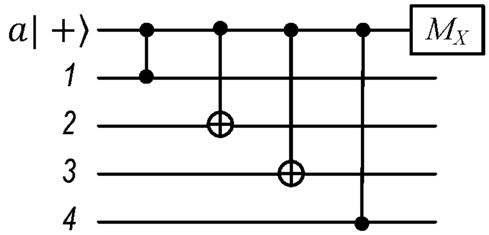

As used herein, the term "graph distance" refers to the separation between two nodes on a syndrome graph. For example, two adjacent nodes (i.e., parity checks) connected by a fusion measurement (i.e., and edge) in the fusion-based encoding scheme illustrated in FIG. 11C have a graph distance of one. Two parity checks with one intervening parity check have a graph distance of two, etc. Weighting the weight contributions based on a graph distance from the first physical qubit (i.e., the center qubit prepared in the magic state) may improve the effectiveness of a quality metric, as described below, in identifying high-fidelity logical states. For example, FIGS. 10 and 11 illustrate an example error-correcting code for a logical qubit, where the first physical qubit p is in the center of the exposed face of the encoded block. In FIG. 10, logical domains of the encoded logical qubit are delineated by the boldfaced stepwise "X". A set of errors that spans across two domains (i.e., that crosses the stepwise X) will be uncorrectable via quantum error correction, whereas a set of errors that lies within a domain may be correctable via quantum error correction. Accordingly, errors that are located farther from the first physical qubit in the center of the code may be less likely to cross between two domains, since the distance between domains grows with increasing graph distance from the center of the X. By weighting the weight contributions of a corrected edge based on its graph distance from the center of the error-correcting code, domain spanning errors that damage the logical information are more likely to be flagged as having a worse quality metric and potentially be discarded.

In some embodiments, a minimum truncated weight is used for the weighted summation of the weight contributions for graph distances greater than a predetermined fraction of a total logical length of the logical qubit (e.g., $L_d$ in FIG. 10). For example, a radial cutoff of ¾ of the logical length of the encoded qubit may be used, or another fraction. Truncating the weighting by the graph distance may ensure that for large depth blocks where the depth of the code is greater than the lateral extent, there is no tail region at large radius where syndrome corrections are counted with almost no weight, i.e. there will be some minimum penalty for having syndromes or erasures.

Weighting the summation of weight contributions of corrected edges based on the respective graph distances may include weighting each weight contribution with a factor comprising the respective graph distance raised to a power of a tunable parameter, a (e.g., as shown in Equation 10). The tunable parameter a may be empirically adjusted to improve the effectiveness of the quality metric.

The logical gap magnitude may be determined by taking the magnitude of the difference of the overall weights of the two alternate corrections of the syndrome graph.

Because the parity error may not uniquely identify the specific set of Pauli errors that occurred (e.g., the observed parity error may be consistent with two or more potential sets of Pauli errors), it may not be known a priori which correction will correct the error. However, corrections with larger weights are generally less likely to be correct. All else being equal, the weight of a correction increases for corrections that involve flipping a larger number of edges, and errors of this type are relatively less common than simpler errors that involve flipping fewer edges.

Accordingly, a large magnitude of the logical gap (i.e., a large magnitude in the difference between the two weights of the two alternative corrections) may indicate that one correction is much more likely to be correct than the other one (e.g., the correction with a small weight may be more likely to be correct). In this case, the error is likely correctable since it may be determined with a high probability that one of the two alternate corrections is the correct one, and the error may be likely fixable using a decoder. Conversely, when the magnitude of the logical gap is small, both of the two corrections may be comparably likely to be correct so it may be less likely for the decoder to implement the proper correction (e.g., the decoder may have close to a 50/50 chance of implementing the proper correction). Accordingly, the magnitude of the logical gap may serve as an effective quality metric to quantify how likely the errors indicated by the syndrome graph data are to be correctable by the decoder, where syndrome graph data with a larger magnitude logical gap are identified as corresponding to higher fidelity logical qubits. As shown in the simulations in FIG. 14, this quality metric is effective at selecting logical qubits that are of high fidelity.

In some embodiments, a respective logical gap magnitude of the syndrome graph data is determined for each class of logical error (e.g., for each logical error sector) of the syndrome graph data. For example, a syndrome graph may include a primal graph and a dual graph, each of the primal and dual graphs may have their own respective class of logical errors, and a respective logical gap magnitude may be determined for each of the primal and dual graphs. In some embodiments, the primal and/or the dual graph may themselves contain multiple classes of logical error, and a respective logical gap magnitude may be determined for each class of error. The logical gap magnitudes for each class of error may be combined in any of a variety of ways (e.g., summed) to obtain an overall error metric based on the logical gap magnitudes.

At 706, an error metric of the logical qubit is determined based at least in part on the syndrome graph data. For example, the syndrome graph data may include information related to one or more syndromes and one or more erasures of a syndrome graph of the logical qubit or logical block, and the error metric is determined based at least in part on the one or more syndromes and the one or more erasures. In some embodiments, the error metric is determined based on the magnitude of the logical gap(s). In some embodiments, the error metric is a summation over the set of distinct logical error classes of a decaying exponential function of the respective magnitudes of the respective logical gaps (e.g., as shown in Equations 7 and 11). More generally, any monotonically decreasing function of the logical gap magnitudes may be used for the error metric, and the specific form of function may be determined empirically to improve performance metrics of the fault-tolerant post-selection procedure.

At 708, it is determined by the FTPS controller whether the error metric satisfies a quality threshold. The error metric may be said to satisfy the quality threshold when it is smaller than the quality threshold, as larger error metrics are a proxy for lower fidelity logical qubits. In other words, a lower magnitude quality threshold corresponds to a stricter quality metric, which will exclude a larger percentage of logical qubits. The quality threshold may be predetermined to obtain a desired balance between an increase in fidelity of the pre-selected logical qubits and a decrease in the quantity of the pre-selected logical qubits. For example, a given quality threshold may, on average, be satisfied by a consistent proportion of the produced logical qubits. Lowering the quality threshold to a stricter threshold will then exclude a higher percentage of the logical qubits, but the logical qubits that satisfy the stricter threshold will be of higher fidelity, on average.

In some embodiments, a nested logical gap is employed wherein a second error metric is determined based at least in part on a weighted summation over syndrome error densities that is weighted based on graph distances of respective syndrome errors from the center physical qubit (e.g., as shown in Equations 8-9). In this case, a joint quality metric may be utilized that includes both the first error metric based on the logical gap and a second error metric which is compared to a second quality threshold. In these embodiments, the logical qubit may be kept if either quality threshold is satisfied.

At 710, if the error metric fails to satisfy the quality threshold at 708, instructions are provided to discard the logical qubit. For example, the FTPS controller may provide instructions over a classical channel to the quantum computing system to discard the logical qubit. In some embodiments, the logical qubit may be rerouted in the quantum circuit, and kept for use in some other aspect of the quantum computation.

At 712, if the error metric satisfies the quality threshold at 708, instructions are provided to keep the logical qubit. For example, instructions may be provided over a classical channel to the quantum computing system to buffer the logical qubit, provide the logical qubit to a subsequent step of the quantum computation, and/or to input the logical qubit into a magic state distillation process.

Figure 8B:
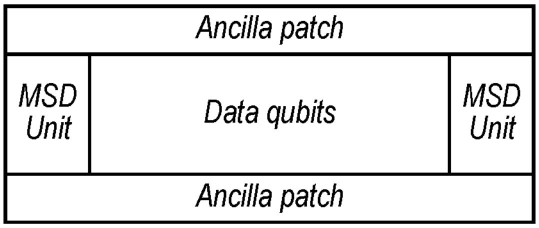
FIG. 8B is an example physical layout for logical data qubits, logical ancilla qubits, and two magic state distillation units, according to some embodiments.

In some embodiments, the logical qubit may be used in a physical qubit layout similar to that shown in 6A, where the magic state 601 is located on the right side of a series of 5 logical data qubits $q_1$-$q_5$. In some embodiments, the logical qubit may be used within one of the two magic state distillation units shown in the physical qubit layout shown in FIG. 8B, where the logical data qubits are flanked on each side by respective magic state distillation (MSD) units, and are flanked on top and bottom by respective patches of logical ancilla qubits. The logical qubit prepared in the logical magic state may then be utilized to perform multi-qubit measurements, as explained above.

3. Additional Technical Detail

The following numbered paragraphs provide additional technical detail and description regarding embodiments herein.

Magic State Preparation

Figure 9:
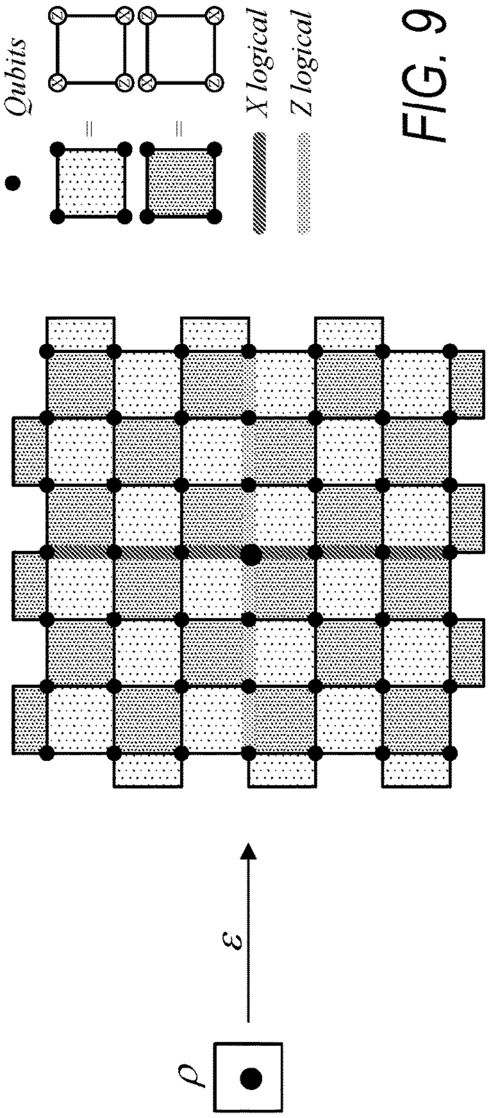
FIG. 9 illustrates an encoding E of a distance-1 unencoded physical qubit p into a distance-L encoded state, according to some embodiments.

In some embodiments, to perform a distillation protocol with fault-tolerant gates, the input (noisy) magic states are first encoded in a fault-tolerant code such as a surface-code. A surface code is a stabilizer code, meaning it is defined by an abelian subgroup $\mathcal{S}$ of the Pauli group $\mathcal{P}_n$ (on n-qubits), not containing −I. It is defined by placing a qubit on the vertices of a square lattice, with one stabilizer generator per plaquette, formed as a product of Pauli XZZX on the four qubits in its support. By introducing boundaries of the code, as depicted in FIG. 9, the code defines one logical qubit, with logical operators $\overline{X}$ and $\overline{Z}$ formed as strings of Pauli operators spanning opposite boundaries (also depicted in FIG. 9). Noisy magic state preparation can be regarded as an channel taking a distance-1 code state (i.e., an unencoded state), to a distance-L code state. While FIG. 9 illustrates one example of a code to define a logical qubit, a complementary code may also be used wherein all single qubit X measurements are replaced by single qubit Z measurements, and vice versa (e.g., replacing the Pauli product XZZX with ZXXZ, etc.)

The preparation of these noisy magic states may be phrased as an encoding problem. Namely, letting Q be the state space of the noisy initial magic state qubit, and X and Z the single qubit Pauli operators acting on it. In some embodiments, a protocol may implement the following encoding isometry:

$$\varepsilon\colon Q \rightarrow Q^{\otimes d^2}, \text{ such that } X \mapsto \overline{X}, Z \mapsto \overline{Z}. \tag{1}$$

where $\overline{X}$ and $\overline{Z}$ are the logical operators of the surface code. Embodiments herein may utilize either fusion-based quantum computation (FBQC) with a fusion network (e.g., a 6-ring fusion network such as that shown in FIGS. 13A-B, or another geometry of a surface code), or circuit-based quantum computation (CBQC) with a planar array of qubits.

Preparation Protocols

Circuit-based protocol. In CBQC, the preparation protocol is described in FIGS. 10 and 12. The central qubit in a 2D L×L array of qubits is prepared as (a noisy version of) the initial magic state T, while the remaining qubits are prepared in an eigenstate of Pauli-X or Z, as shown in FIG. 10. Upon this initial configuration, $L_d$ repeated rounds of surface-code stabilizer measurements are performed. The resultant state after these measurements is an encoded version of the initial magic state qubit. The space-time diagram illustrates the location of boundaries between X and Z domains. The noisy initial magic state supported on the central qubit on the front is encoded in a surface code on the rear. The membrane showing how the X (Z) operator of the initial magic state is mapped to logical $\overline{X}$ ($\overline{Z}$) operator on the surface code is shown in dark shading (light shading).

Fusion-based protocol. In FBQC, the bulk of the preparation block consists of 6-ring resource states that are fused along a cubic lattice of size $L \times L \times L_d$ (or $L_x \times L_y \times L_d$), with each pair of qubits from adjacent resource states in each of the three orthogonal directions undergoing a two-way fusion, i.e. a Bell measurement (e.g. XX and ZZ measurements). Boundaries are formed by single qubit measurements in an alternating X and Z pattern, with the distinction between primal and dual boundaries given by a translation of the alternating pattern by one site (or alternatively, flipping the X and Z measurements) as in FIG. 11A. FIGS. 11A-C illustrate the measurement pattern for implementation in FBQC using a 6-ring fusion network. Individual qubits belonging to resource states on the boundary are measured in the X (Z) basis as accordingly depicted by edges of the indicated hashing. To prepare an encoded $$T = \frac{1}{\sqrt{2}}\left(0 \pm e^{\frac{i\pi}{4}} 1\right)$$

on the output, the qubit belonging to the central resource state is measured in the $$\frac{1}{2}(X + Y)$$

basis; the ± sign is determined by the measurement outcomes.

There is redundancy among the measurement outcomes; certain measurements may be multiplied together to form a check operator, whose outcome may be used to detect errors. More precisely, check operators are elements of both the (joint) stabilizer group of the resource states as well as the measurement group (which includes fusions and boundary measurements). One may multiply the measurement outcomes comprising a check to construct the syndrome—in the absence of error, these syndrome measurements should have even parity, and as such, an odd parity signals the presence one or more errors.

To complete the protocol, a single qubit in the resource state at the preparation point on the input port is measured in the magic state basis $$\frac{1}{2}(X + Y).$$

This yields an initial magic state T±qubit that is entangled with the rest of the block via the bulk two-way fusions (where ± is the ± eigenstate of X, and is determined by the measurement outcome of the $$\frac{1}{2}(X + Y)$$

measurement). The output of this channel is an encoded (noisy) T state on the surface code supported on the remaining unmeasured qubits, up to a Pauli operator depending on fusion and measurement outcomes.

Space-time diagram. An abstract space-time diagram of this channel used to achieve ε is depicted in FIG. 10. In particular, time runs into the page with the noisy initial magic state situated in the center of the input port (initial time slice), which is called the preparation point, and the logical magic state is supported on the output port (final time slice). The operator X (Z) on the input port is mapped to $\overline{X}$ ($\overline{Z}$) on the output port via the logical membrane. Here, a logical membrane is the world-sheet of a logical operator, which specifies how the input and output logical operators are correlated.

Graph Distance and Logical Errors

Figure 13A:
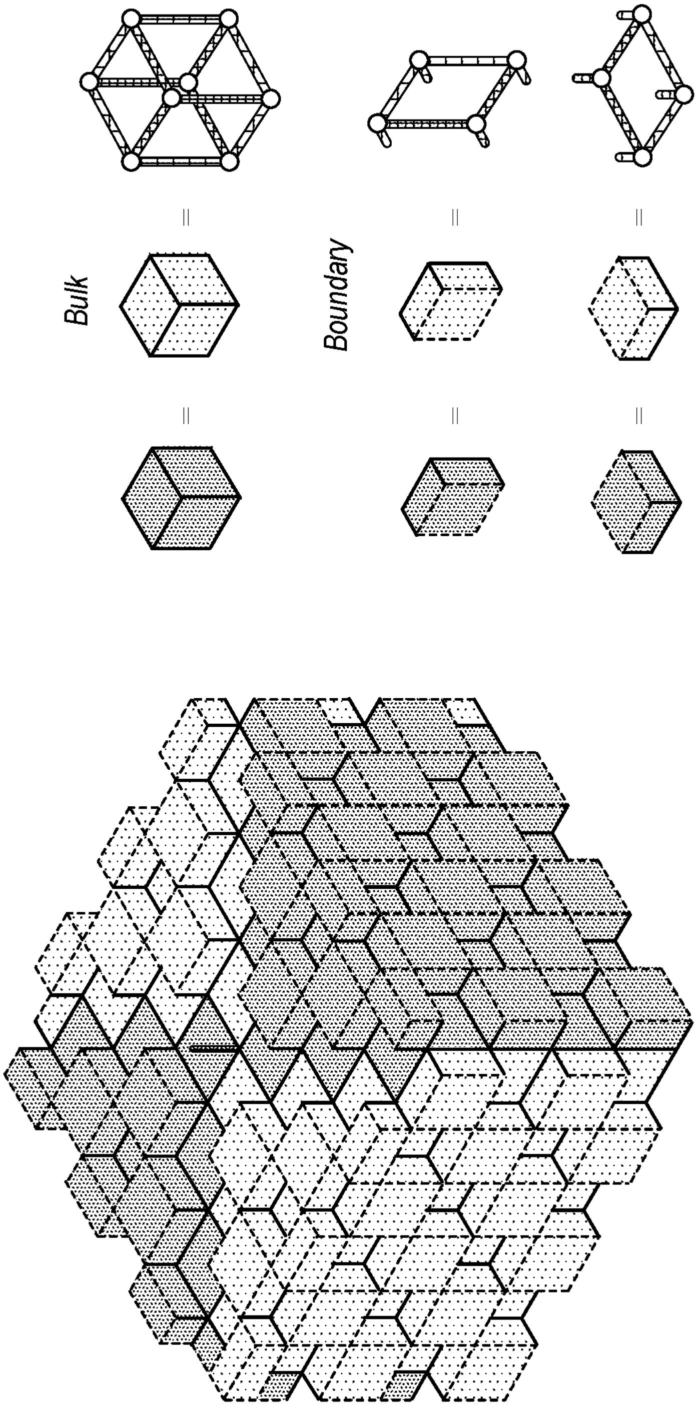
FIGS. 13A-B illustrates an example structure of check operators in a 6-ring fusion network, according to some embodiments.
Figure 13B:
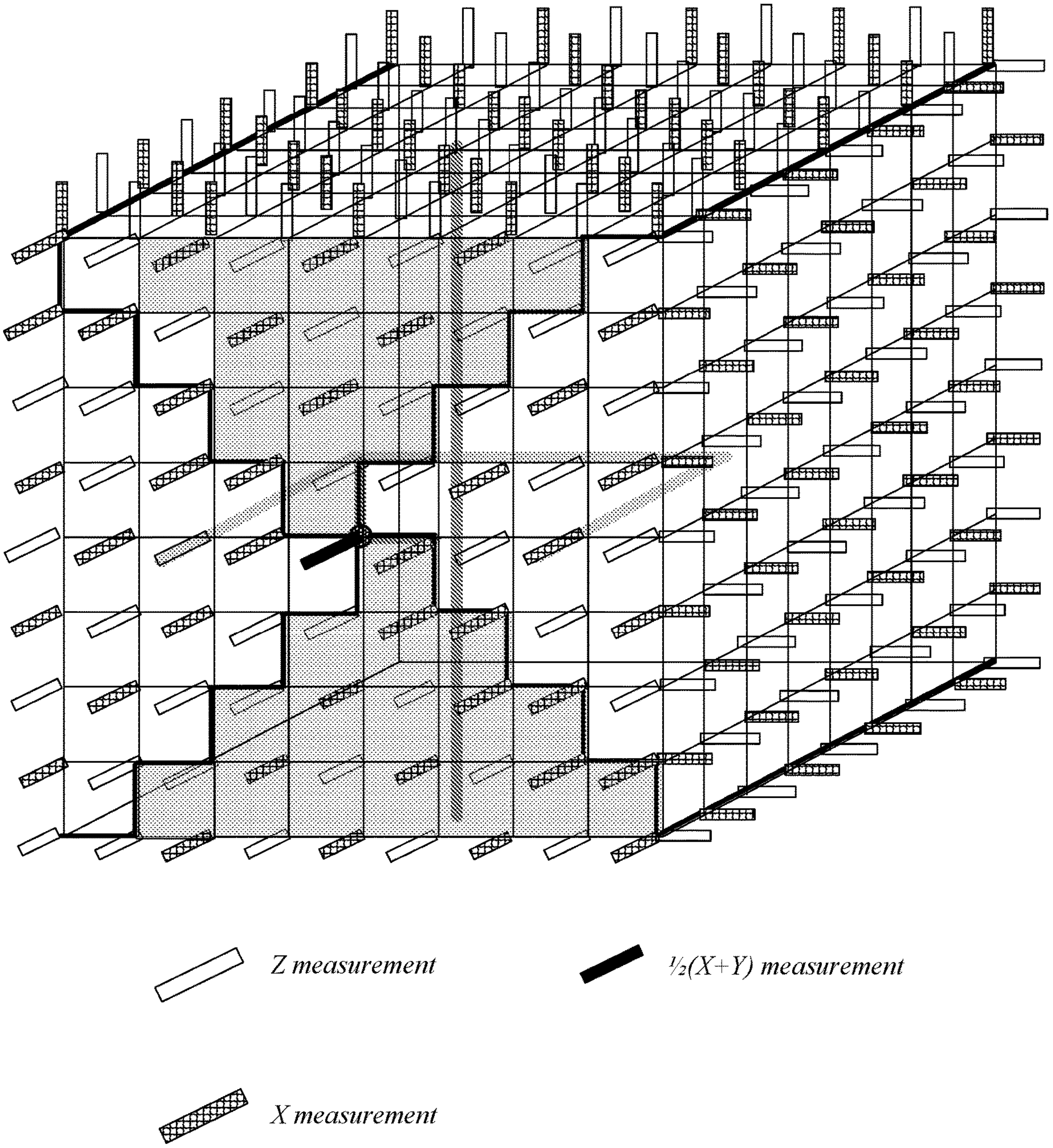

The fault-distance of the presented protocols is constant, as there is a space-time volume around the preparation point where low-weight errors can give rise to logical errors. In particular, for the FBQC protocol, barring the initial magic state measurement itself, the fault distance is 2; minimally, two fusion outcomes neighbouring the initial magic state measurement may be flipped in an undetectable way, yielding a logical error. Such a minimal error is shown in FIG. 13B in addition to other representative non-trivial logical errors. In CBQC (or measurement-based quantum computation—MBQC), the corresponding protocol has a fault distance of 3, meaning 3 single qubit Pauli errors can introduce a logical error. In principle, a depth of 2 is sufficient to produce a logical magic state. In practice, however, choosing a larger depth provides more syndrome information to more reliably detect and correct such errors. FIG. 13A illustrates the check operator structure of the preparation protocol in the 6-ring fusion network. There is a check operator for each cube of the fusion network (suitably truncated for boundaries). The block is oriented such that "time" flows from top to bottom. The block on in FIG. 13B illustrates examples of logical errors for the preparation protocol. Chains of flipped fusion outcomes between distinct boundaries lead to logical errors. In particular, there are weight-2 logical errors supported near the central magic-state.

Error Models

It is helpful to separate the overall preparation error into the error on the initial magic state and the error on the remainder of the channel. Assuming both of these errors occur independently, the overall error of the magic state preparation block becomes $$p_{prep} = p_{init}(1 - p_{enc}) + (1 - p_{init})p_{enc} \quad (2)$$

where $p_{init}$ is the error rate on the initial magic state (measurement) and $p_{enc}$ is the error rate on the remainder of lattice that encodes the magic state in a surface code on the output port; the latter is referred to as the encoding error rate (EER). To leading order in the low error regime, $p_{prep} \approx p_{init} + p_{enc}$. Some embodiments herein consider the situation where $p_{init}$ is fixed, typically by physical hardware and hard-to-change design choices in the architecture, and focus on reducing $p_{enc}$ via post-selection. Therefore, in the following, we ignore $p_{init}$ and consider only $p_{enc}$ as the logical error rate on the encoding lattice arising from i.i.d. erasure and Pauli errors on every edge of the lattice. In FBQC, this error model corresponds to each measurement in a fusion suffering an erasure with probability $p_{erasure}$ or suffering a Pauli error with probability $p_{error}$ conditioned on not being erased. In CBQC, this error model corresponds to an erasure error on each qubit (or measurement), e.g. arising from a leakage error, or a Pauli error on each qubit (or measurement) conditioned on not being erased. Various embodiments may consider only Pauli errors, or mixed erasure and Pauli errors. Similarly, by Eq. 2, decreasing $p_{init}$ by improving the quality of the initial magic states, while not mitigating $p_{enc}$ may lead to diminishing returns when $p_{init} << p_{enc}$. Hence, it may be desirable to mitigate both sources of error. In the following paragraphs it is discussed how to systematically suppress the EER $p_{enc}$, given a fixed $p_{init}$, in some embodiments.

Framework for Fault-Tolerant Post-Selection

In this section, we introduce the general framework of fault-tolerant post-selection and define a set of post-selection rules for encoding magic states in surface codes. For a given logical block B (in any model of computation, CBQC, MBQC, FBQC), we define a block configuration E as a set of Pauli errors $\epsilon$ and erasure errors $\varepsilon$ on B. Given the check operators of the logical block (e.g., those of the 6-ring implementation shown in FIG. 13A), we may deduce the syndrome graph $\sigma$. The combined information of the syndrome graph and the erasure information is collectively called the visible information $v_E = (\sigma, \varepsilon)$, where $\sigma$ is a syndrome and $\varepsilon$ represents erasure errors, which is provided as syndrome graph data to be used to determine an error metric for a logical qubit. We let the space of all visible information for a given block be denoted $V_B$. In some embodiments, the logical block is the magic state preparation block, which has the parameters $(L, L_d)$.

A post-selection rule R observes the visible information $v_E$ and decides whether to accept or reject the block with configuration E using a information function Q followed by a policy P:

1. An information function $Q: V_B \rightarrow \mathbb{R}^q$ maps the visible information $v_E \in V_B$ to a vector of information data $q_E \in \mathbb{R}^q$. This step distills useful and actionable information about B based on E.

2. A policy $P: \mathbb{R}^q \rightarrow \{0,1\}$ digests the information $q_E$ and produces a decision on whether to accept (1) or reject (0) the block B based on the configuration E. In general, the policy may be any function of choice. In some embodiments, this is achieved by a scoring function $S: \mathbb{R}^q \rightarrow \mathbb{R}^+$ that maps $q_E$ to a numerical score for the block, from which the binary decision is achieved by thresholding the score, i.e. $P = \Theta(s^* - S(q_E))$, where $\Theta$ is the Heaviside function, and $s^*$ is a cutoff score such that all configurations with $S(q_E) \leq s^*$ are kept.

If, on average, $\kappa$ fraction of blocks are kept, then the post-selection rule has an average resource overhead of $$O\frac{1}{\kappa}$$

times the overhead of creating a single block. In some embodiments, a rule is constructed such that the logical error rate (determined via decoding) on the subset of the $\kappa$ accepted blocks is significantly less, on average, than that on all blocks. This occurs when R strongly correlates the policy output (e.g., achieved through the score S(Q)) with the likelihood of logical error, thereby facilitating easy selection of less-error-prone blocks. Furthermore, a high-performing rule in practice would also have low overhead.

Rules for FTPS

The following paragraphs define several rules for performing FTPS, which are referred to herein as annular syndrome, surviving distance, logical gap, nested logical gap, and radial logical gap. For clarity, the following description is tailored toward magic state preparation, although more broadly the described rules may be applied to other types of encoded logical qubits, blocks and configurations. Furthermore, while the following description focuses on FBQC with the 6-ring network, the techniques may generalize to other models and schemes. At a high level, the described rules analyze syndrome graph data associated with a logical qubit to determine an error metric, and compare the error metric to a quality threshold to determine whether to keep or discard the logical qubit.

As used herein, a syndrome graph is defined by placing a vertex for each check operator (bulk cubes and boundary checks) of the fusion network. Two vertices are connected with an edge whenever the corresponding check operators utilize a common measurement outcome. For the 6-ring fusion network, there are two distinct syndrome graphs termed the primal/dual syndrome graphs, analogous to the planar surface code, with the two shading densities in FIG. 9 indicating checks belonging to the two independent syndrome graphs, i.e. neighbouring vertices associated with darker (lighter) checks are connected with an edge, forming the primal (dual) syndrome graph. The dual syndrome graphs may be collectively represented as syndrome graph that may be used to determine an error metric for a logical qubit. Furthermore, the illustrated magic state preparation block in FIG. 9 has only 2 distinct logical error classes, one supported on the edges of each syndrome graph.

For more general logical blocks encoding channels from m to n qubits, there are m+n independent logical error classes that generate all possible logical correlations from input to output. The set of distinct logical sectors is denoted herein by C.

Annular Syndrome

Some embodiments employ an annular syndrome rule $R_S = (Q_S, P_S)$, which utilizes syndrome information. The annular syndrome rule computes the weighted sum of the −1

("lit up") syndromes. The weights are chosen according to a power-law decay from the preparation point. As such, the information function maps to a vector of length 2 with the components $$Q_{S,i}(v_E;\alpha) = \sum_{r=1}^{L_d} \frac{\sigma_i(r)}{\bar{\sigma}_i(r)\min(r, \lceil 3L/4 \rceil)^{\alpha}},\ i = \text{primal, dual} \tag{3}$$

where $\sigma_i(r)$ is defined as the total number of −1 syndrome outcomes at a graph distance of r from the initial magic state, termed an "annulus" with radius r, $\bar{\sigma}_i(r)$ is the total number of syndrome measurements (independent of outcome) in the same annulus of radius r, and a is a tunable parameter. In various embodiments, different metrics may be chosen to define the radius. Some embodiments employ the $L_\infty$ metric (also known as the supremum metric) on the fusion network. In some embodiments, a radial cutoff such as $$\left\lceil \frac{3L}{4} \right\rceil$$

or another fraction of L may be applied so that for large depth blocks where $L_d>L$, there is no tail region at large radius where syndromes are counted with almost no weight. In other words, the radial cutoff may ensure there will be some minimum penalty for having syndromes. Note that for more general 2d codes one may not have a split primal and dual syndrome graph structure, and one may simply sum over all syndromes in a radius around the preparation point.

The policy is implemented by thresholding a score $$S_S(Q_S) = \sum_{i=primal,dual} a_i Q_{S,i} \tag{4}$$

$$P_S(Q_S; s_S^*) = \Theta(s_S^* - S_S(Q_S))$$

where $a_i$ are tunable linear weights to construct a combined score from the primal and dual graph annular syndromes. This may result in a post-selection procedure where syndromes near the preparation point (i.e., the input physical qubit prepared in the magic state) are considered more significant in predicting a logical error than those further in the bulk.

Logical Gap

The logical gap rule $R_G=(Q_G,P_G)$ uses a metric that utilizes the fact that, above an error correction threshold, logical errors are not suppressed due to a loss of distinguishability between distinct logical sectors. In other words, above the threshold, the decoder can no longer reliably differentiate which logical sector of the code space to recover to (as the code distance increases). In this spirit, one may define the logical gap as the difference between the correction weights that return the system to different logical sectors.

For example, consider a simple case of a single logical $\bar{Z}$ operator in a surface code memory block (e.g. only the primal syndrome graph), with a configuration E and possible corrections $\bar{I}_{wrong}$, $\bar{I}_{correct}$ such that composing the correction and error yields a logical operator on the code space—namely $\bar{I}$ and $\bar{Z}$ respectively. The signed logical gap is defined as $$\Delta_{\bar{Z}}(E) = w_{\bar{Z}}(\bar{I}_{wrong}) - w_{\bar{Z}}(\bar{I}_{correct}) \tag{5}$$

where $w_{\bar{Z}}(\bar{I})$ denotes the log-likelihood weight of the correction $\bar{I}$ for the $\bar{Z}$ sector given by a choice of decoder, defined as follows: an edge e has weight $$w_e = \ln\frac{1-p_e}{p_e}$$

where $p_e$ is the (marginal) probability of Pauli error on that edge, edges $e \in \varepsilon$ supporting erasures have weight $w_e=0$, and the total weight of a correction $\bar{I}$ is $w_{\bar{Z}}(\bar{I})=\Sigma_{e\in\bar{I}} w_e$. Other types of weights may also be used. The error $\epsilon$ as part of E may be unknown and therefore which correction is correct is unknown; hence only the unsigned logical gap (i.e., the magnitude of the logical gap) may be known in this circumstance, which is denoted herein as $|\Delta_{\bar{Z}}(E)|$ (below $w_e$ will drop the dependence on E for brevity).

In general, any decoder may be used to compute an unsigned logical gap and biased noise may be accommodated by modifying the weights appropriately. If one chooses a minimum-weight perfect-matching (MWPM) decoder, then the decoder may always choose the minimum weight correction. If $\Delta_{\bar{Z}}<0$, the decoder will fail and a logical error will be introduced. If $\Delta_{\bar{Z}}>0$, the decoder will succeed in correcting the error and if $\Delta_{\bar{Z}}=0$, the decoder will succeed/fail half of the time. Therefore, the EER for the block becomes $$p_{enc} = \sum_{i\in\{\bar{Z},\bar{X}\}} \int_{-\infty}^{0} P(\Delta_i)\, d\Delta_i,$$

where $P(\Delta_i)$ is the distribution of logical gaps of logical error classes i for a fixed block size and error rate. In more complex logical blocks (i.e., surface code protocols/channels), there may be many logical error classes and so one may compute a vector of logical gaps as the information of interest.

$$Q_{G,i}(v_E) = |\Delta_i|,\ i \in C, \tag{6}$$

where recall, C is the set of distinct logical error classes. A combined score may be created for the block to be thresholded by the policy as $$S_G(Q_G) = \sum_{i\in C} a_i e^{-Q_{G,i}} \tag{7}$$

$$P_G(Q_G; s_G^*) = \Theta(s_G^* - S_G(Q_G))$$

where $a_i$ represent tunable linear weights to weight the addition of the scores for all logical error classes.

Nested Logical Gap

The nested logical gap rule $R_N=(Q_N,P_N)$ is a derivative of the logical gap which combines information of the annular syndrome as the information of interest.

$$Q_N(v_E;\alpha) = (Q_G(v_E), Q_S(v_E;\alpha)). \tag{8}$$

The policy is given by conditional thresholding expressed as $$P_N(Q_N; s_G^*, s_S^*) = \begin{cases} 1 & \text{if } S_G(Q_G) = s_G^* \text{ and} \\ & S_S(Q_S) \le s_S^*, \text{ or} \\ & S_G(Q_G) < s_G^* \\ 0 & \text{otherwise} \end{cases} \quad (9)$$

If one were to imagine a scenario of choosing M out of N configurations, then this policy amounts to sorting all N configurations first by the logical gap and then by annular syndromes, choosing the best M configurations in order. The intuition is that the preparation block has constant distance of 2 to flip logical sectors and so up to normalization, the gap, for a single graph (primal or dual), is bounded to $|\Delta| \le 2$, thus leading to a large degeneracy. The annular syndrome rule may be used to break this degeneracy. Said another way, based on a determination that the error metric based on the unsigned logical gap does not satisfy the quality threshold, a second error metric based on the annular syndrome rule (i.e., based on a weighted summation over syndrome error densities that is weighted based on graph distances of respective syndromes from the center physical qubit) may be compared to a second quality threshold to determine whether to keep or discard the logical qubit (e.g., whether to provide it to a magic state distillation process).

Radial Logical Gap

The radial logical gap rule $R_{RG}=(Q_{RG},P_{RG})$ is a derivative of the logical gap rule that caters specifically to the structure of the preparation block. The radial logical gap rule computes the logical gap but with a radial power-law (similar to the annular syndrome rule) reweighting of the edge weights such that $$\tilde{w}_i = \frac{w_i}{\min\left(r, \left\lceil \frac{3L_d}{4} \right\rceil\right)^{\alpha}}.$$

This yields $$\tilde{\Delta}_i = \tilde{w}_i(\vec{l}_{wrong}) - \tilde{w}_i(\vec{l}_{correct}) \text{ and} \quad (10)$$
$$Q_{RG,i}(v_E) = |\tilde{\Delta}_i|, \; i \in C.$$

We can create a combined score for the block to be thresholded by the policy as $$S_{RG}(Q_{RG}) = \sum_{i \in C} a_i e^{-Q_{RG,i}} \quad (11)$$
$$P_{RG}(Q_{RG}; s_{RG}^*) = \Theta(s_{RG}^* - S_{RG}(Q_{RG})).$$

The aforementioned degeneracy of the logical gap in the preparation block may be broken by biasing the decoder to compute corrections away from the preparation point (and into the bulk) so that some entropic contributions are, in a heuristic manner, included.

Mixed Pauli and Erasure Errors

In some embodiments, both erasure and Pauli errors are present in the syndrome graph of a logical qubit. For this error model, fusion outcomes are erased with probability $p_{erasure}$, and non-erased outcomes are further subject to a bitflip outcome with rate $p_{error}$. In a simulation of two representative cases with $(p_{erasure}, p_{perror})=(x,x)$ and $$(p_{erasure}, p_{perror}) = \left(x, \frac{x}{9}\right),$$

where $x/x^* \in [0,1]$ and $x^*$ is the bulk threshold along the error ray parametrized by x, the threshold may be determined empirically in both cases with MWPM decoding as $x^*_{1:1}=9.71\times10^{-3}$ and $$x^*_{1:\frac{1}{9}} = 4.99 \times 10^{-2},$$

respectively. In both cases, the qualitative behavior is similar to that of the pure Pauli error case, demonstrating that the gap-based post-selection rules yield significant improvement in the presence of erasures as well.

Results and Discussion

The following paragraphs present and discuss experimental data based on simulations that analyze performs of different fault-tolerant post-selection rules, according to various embodiments.

The following simulation results consider i.i.d bitflip and erasure errors with strength $p_{error}$ and $p_{erasure}$ on the XX and ZZ fusion outcomes, as well as single qubit X and Z measurement outcomes. A Monte-Carlo sample with $n_{trials}=10^5$ trials of preparation block configurations is prepared, each rule is applied to all samples, and the best K fraction of them are selectively kept. The encoding error rate $p_{enc}$ of each rule is assessed as a function of κ. On a real quantum computer, any desired κ may be achieved, on average, by running the policy in real-time with an appropriate choice of score cutoffs. Unless otherwise stated, all linear weights $\{a_i\}$ for all rules are set to unity in the spirit of being fully agnostic between primal and dual graphs. For logical gap and distance computations, each boundary is attached to an additional pseudosyndrome vertex, with pairs of pseudosyndromes associated to like boundaries (e.g. primal-primal) lit up to change/flip the sector for logical correction on that respective graph.

It is assumed on the output port that all surface code stabilizers are measured noiselessly, allowing for a logical readout in each basis. In other words, while the output qubits themselves are subject to noise, it is assumed there is no measurement noise on the stabilizer measurements.

Rule Performance

Figure 14:
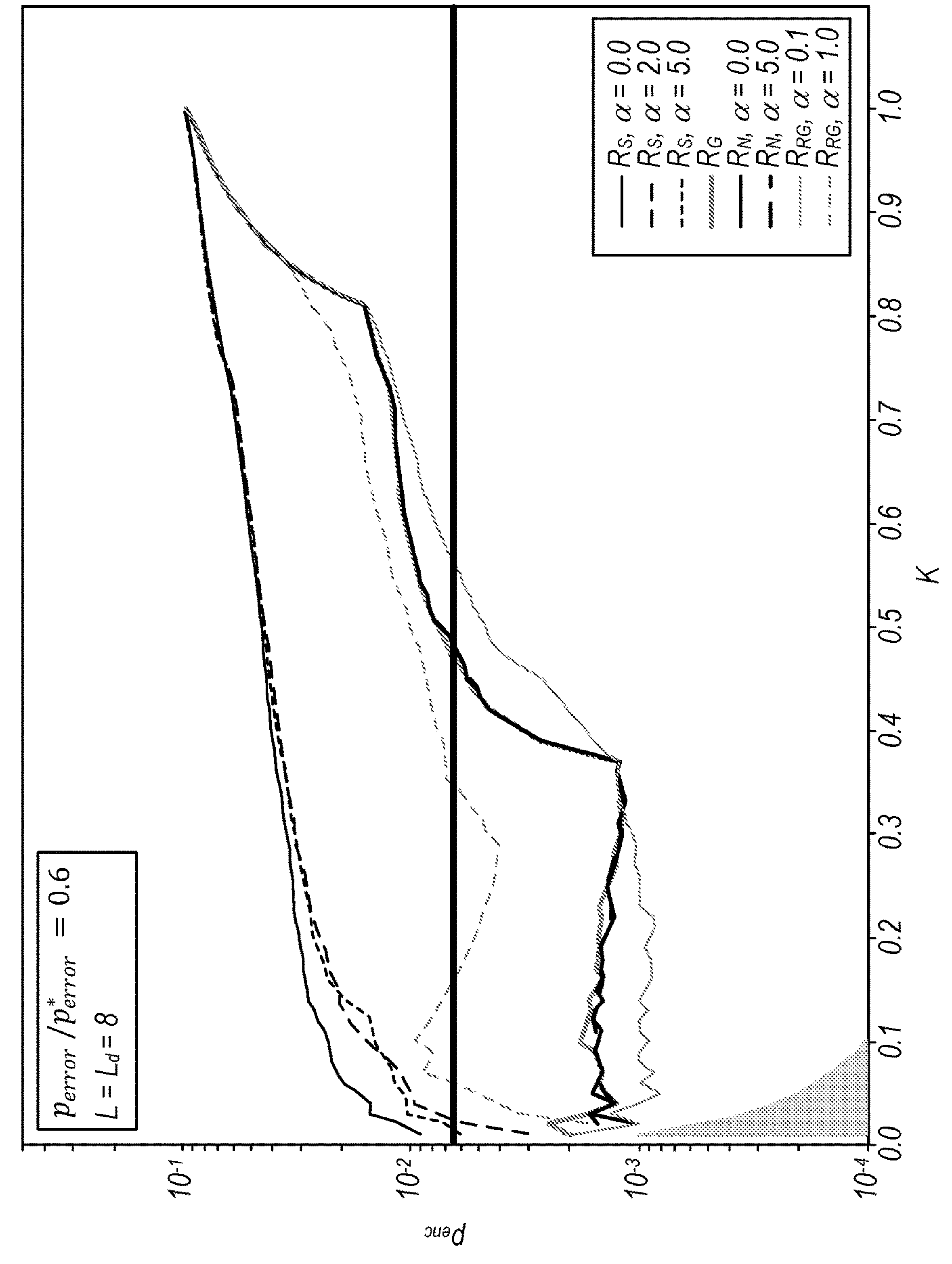
FIG. 14 is a plot of simulation data showing an encoding error rate (EER) for cubic magic state preparation block for various magic state post-selection rules, according to some embodiments.

FIG. 14 illustrates the performance of different fault-tolerant post-selection rules in terms of the Encoding Error Rate (EER) of a L=L_d=8 cubic magic state preparation block, according to various embodiments, as a function of the keep fraction K for pure Pauli error $p_{error}=0.6p^*_{error}$ and $p_{erasure}=0$, where $p^*_{error}=0.0108$ is the bulk threshold of the closely-related memory block. In other words, it is shown that $$p_{enc}^R(\kappa; p_{error} = 0.6p_{error}^*, p_{erasure} = 0) \text{ for } R \in \{R_S, R_G, R_N, R_{RG}\},$$

where $R_S$ is the annular syndrome rule, $R_G$ is the logical gap rule, $R_{NG}$ is the nested logical gap rule, and $R_{RG}$ is the radial logical gap rule. At κ=1, there is no post-selection and hence all rules have the same EER. As κ decreases and fewer blocks are accepted, all rules suppress the EER, albeit at different rates. The overhead O for postselection is equal to $1/\kappa$. If the same error rate is assumed on the initial magic state such that $p_{init}=p_{error}$, then the intersection of the EER of each rule with the bold horizontal line in FIG. 14 indicates the "breakeven" keep value $\kappa^*(R)$ (or overhead $O^*=1/\kappa^*$) at which the EER is the equal to the initial magic state error. As described above in Eq. (2) post-selection yields diminishing returns for $\kappa<\kappa^*(R)$ as the overall error rate $p_{prep}$ becomes dominated by $p_{init}$ in this regime. The logical-gap-based rules give rapid suppression (step-like due to the discrete logical gap sectors seen in FIG. 15B) in the EER as compared the annular syndrome rule, with the radial gap rule at low power $\alpha=0.1$ performing the best. The shaded gray region, where $$p_{enc} \leq \frac{1}{n_{trials}\kappa},$$

indicates the limits of sampling in the simulation.

For $p_{error}<p^*_{error}$ as in FIG. 14, the EER suppression is super exponential (in K) for the gap rule and its variants, with an overhead of $O^*\leq 2$, below which there are diminishing returns, as the initial magic state error $p_{init}$ will be the dominant source of error in this regime. When the differential overhead cost is low, i.e.

$$\frac{d\ln p^R_{enc}}{d\kappa} \gg 0$$

in the regime around $\kappa^*$, it may be desirable to use extra overhead to suppress the EER further below the initial magic state error. In contrast, in the same regime, the annular syndrome rule $R_S$ has poor suppression of the EER and requires an overhead of $O^*\approx 40$ since syndrome configurations are highly degenerate and so the syndrome fraction is only loosely correlated with the EER. As L increases, the annular syndrome rule performs increasingly poorly since statistical fluctuations of obtaining finite size samples with few syndromes are exponentially suppressed (cf. FIG. 15A). However, for larger L, the gap rules all still perform well as the gap is effectively utilizing a decoder rather than being reliant on statistical fluctuations at finite size. For $p_{error}\approx p^*_{error}$, the same qualitative behavior holds but quantitatively the EER suppression rate is reduced as expected when the system is inherently more noisy.

Figure 15A:
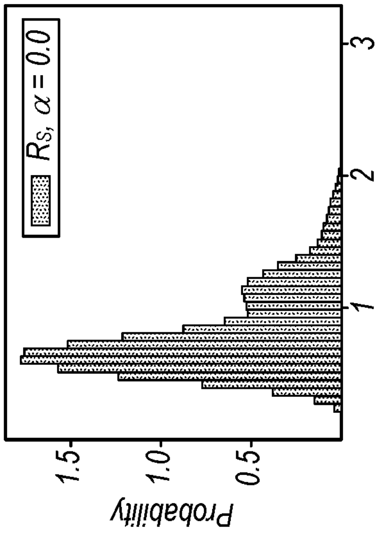
FIGS. 15A-F illustrate distributions of performance for the annular syndrome, logical gap, and radial logical gap rules, respectively, according to various embodiments.
Figure 15B:
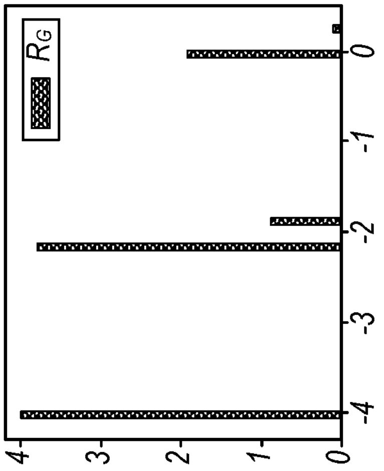
Figure 15C:
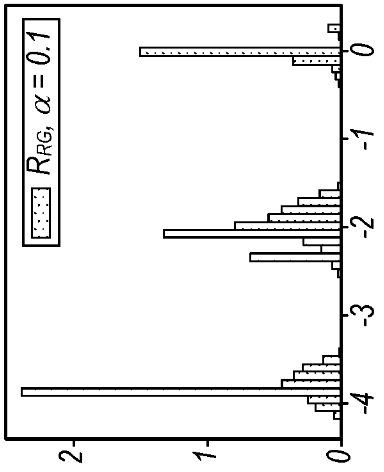

FIGS. 15A-C illustrate distributions of scores for the annular syndrome ($S_S$), logical gap ($S_G$), and radial logical gap ($S_{RG}$) rules, respectively. Annular syndrome scores have a continuous distribution whereas the logical gap sectors are discrete. The radial logical gap score at $\alpha=0.1$ weakly breaks the degeneracy of the logical gap scores.

Figure 15D:
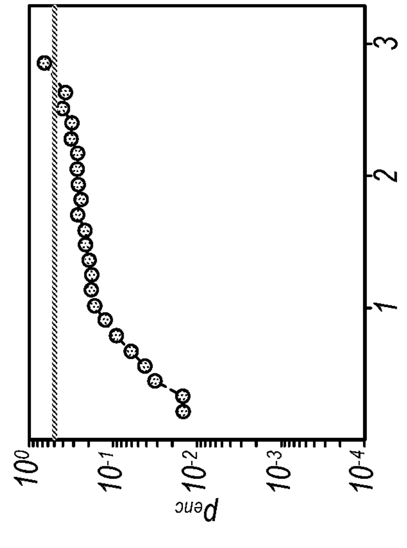
Figure 15E:
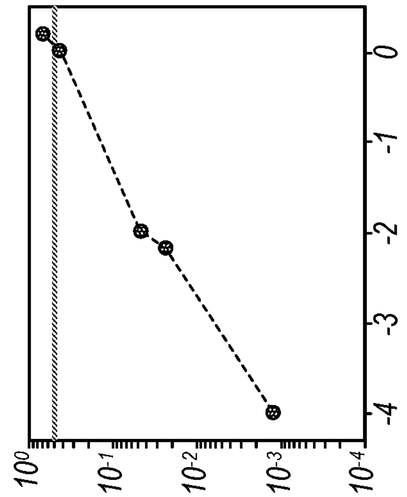
Figure 15F:
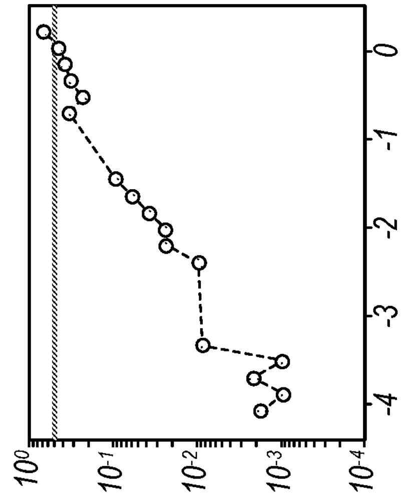

FIGS. 15D-F illustrate the correlation of EER and score for the annular syndrome, logical gap, and radial logical gap rules, respectively. The horizontal line is at $p_{enc}=0.5$ indicating the absence of correlation (uniform probability of either logical sector). The annular syndrome score has a poor correlation with EER while the logical gap and radial gap rules have a strong exponential correlation with EER thereby endowing predictive power to the logical gap. The radial logical gap rule, at $\alpha=0.1$, has a more continuous distribution/smoother correlation with the EER, thus improving upon the logical gap rule by smoothing out the "step-like" features in FIG. 15A.

To understand the performance differences between the various gap rules, it is instructive to analyze the distributions of scores and the correlations of the scores with their respective EER. From FIG. 15B, the distribution of gap rule scores $S_G(Q_G)$ is highly discrete/degenerate due to the fact the gap for each primal/dual graph is bounded by the constant fault distance of the preparation block ($|\Delta_{primal}|$, $|\Delta_{dual}|\in\{0,1,2\}$) and hence the combined score can only take on five distinct values, $S_G(Q_G)\in\{0,1,2,3,4\}$, $\forall E$, up to normalization. As $p_{error}$ increases, the distribution of gaps for concentrates around $\Delta=0$. This results in an overall shift of the gap score distribution towards higher values indicating the configurations are typically more error-prone (due to decreased distinguishability between logical sectors). From FIG. 15E, a decreasing gap score has an exponentially smaller EER and this strong correlation of the score and EER demonstrates the predictive power of the gap rule. Furthermore, the fact that the gap rule does not have an exponentially vanishing number of configurations at low scores is what also makes it practical with low overhead.

To improve upon the gap rule by breaking the degeneracy of the gap sectors to yield a more fine-grained score, in some embodiments, the annular syndrome score is nested inside each of the discrete gap sectors to obtain a nested rule $R_N$. This provides improvements over certain ranges of $\kappa$ as compared to the gap rule (cf., FIGS. 14 and 18A-E). In some embodiments, modifying the gap by adding an inverse radial weighting in $R_{RG}$ breaks the degeneracy of the gap scores (cf. FIG. 15C) by favoring corrections—that determine the gap—away from the initial magic state (where the fault distance is constant). For low power $\alpha=0.1$, the radial gap score $S_{RG}(Q_{RG})$ weakly breaks the degeneracy of the gap score while still preserving the gap sectors. This heuristically incorporates more entropic effects in the bulk, providing a smoother graded correlation of the radial gap score and the EER (cf. FIG. 15F), thus leading to improved predictive power of $R_{RG}$ over $R_G$. In other words, $R_{RG}$ is at least as good if not better than $R_G$ for all $\kappa$. At higher $\alpha$, e.g. $\alpha=1.0$ as in FIG. 14, the radial gap rule performance degrades due to the now strong power-law which mixes gap sectors thus obtaining a poor, non-monotonic, correlation with the EER and hence losing the original predictive power of the gap.

Figure 16:
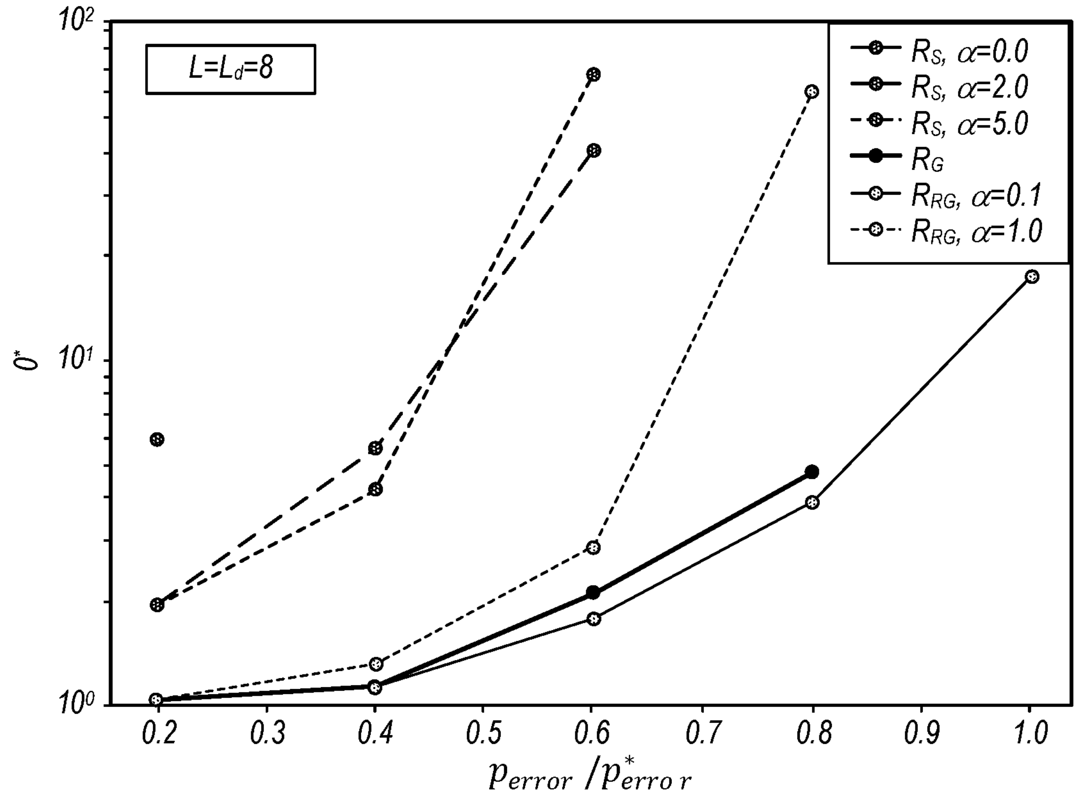
FIG. 16 is a plot of breakeven overhead as a function of the fraction of the bulk threshold for different post-selection rules, according to some embodiments.

To compare the performance of the rules over a range of Pauli error rates, in FIG. 16 the breakeven overhead $$O^* = \frac{1}{\kappa^*}$$

is shown as a function of the fraction of the bulk threshold $p_{error}/p^*_{error}$ at L=L_d=8 for different post-selection rules. Over this entire range, the radial gap rule at low $\alpha=0.1$ has the lowest overhead required to reach the breakeven point $p_{enc}=p_{init}=p_{error}$, everywhere performing better than the gap and nested gap. In contrast, the annular syndrome rule performs less well on this metric. At an error rate of $p_{error}=0.6p^*_{error}$, the radial gap rule has relative overhead of only 1.78, which is ~23 times lower than the best annular syndrome rule and 1.17 times lower than the gap rule. As the error rate increases, the annular syndrome breakeven overhead increases exponentially due to its reliance on statistical fluctuations (e.g. configurations with zero syndromes are desirable but are exponentially rare) and quickly surpasses tractable simulation, hence the absence of breakeven points at higher errors in FIG. 16. This is similarly seen, even for the gap rule with an absence of a breakeven point in the current simulation at $p_{error}=p^*_{error}$. On the flip side, however, even at such a high error rate, the radial gap rule can still achieve the breakeven condition at a reasonable overhead of ~17. It is important to note that for a given rule, there may not always be a breakeven point, even with infinite simulation capacity, since above the optimal decoding threshold (in the thermodynamic limit) the visible information may not be used to reliably distinguish logical sectors. These qualitative results hold true even in the presence of nonzero erasure.

Figure 17:
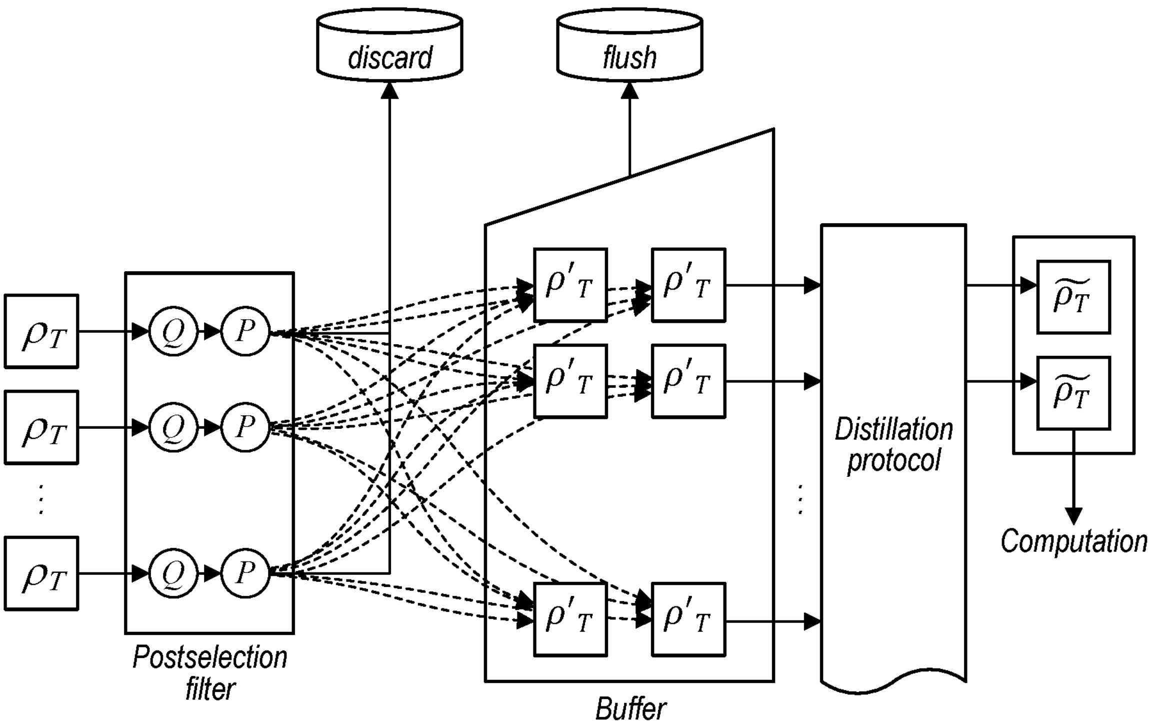
FIG. 17 is a system diagram illustrating a post-selection filter, buffer, distillation protocol, and quantum computation, according to some embodiments.
Figure 18A:
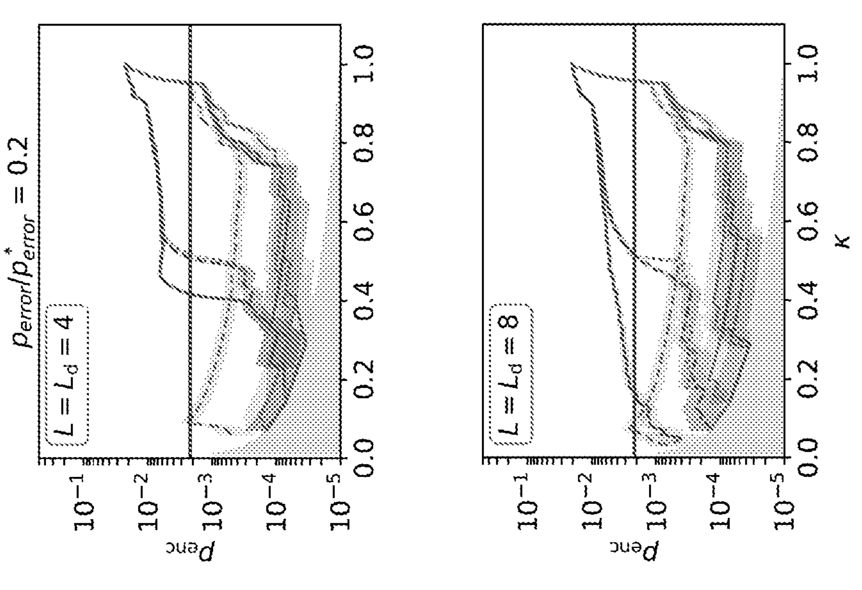
FIGS. 18A-E are plots of the EER for a cubic magic state preparation block over a range of Pauli error rates for different post-selection rules, according to various embodiments.
Figure 18B:
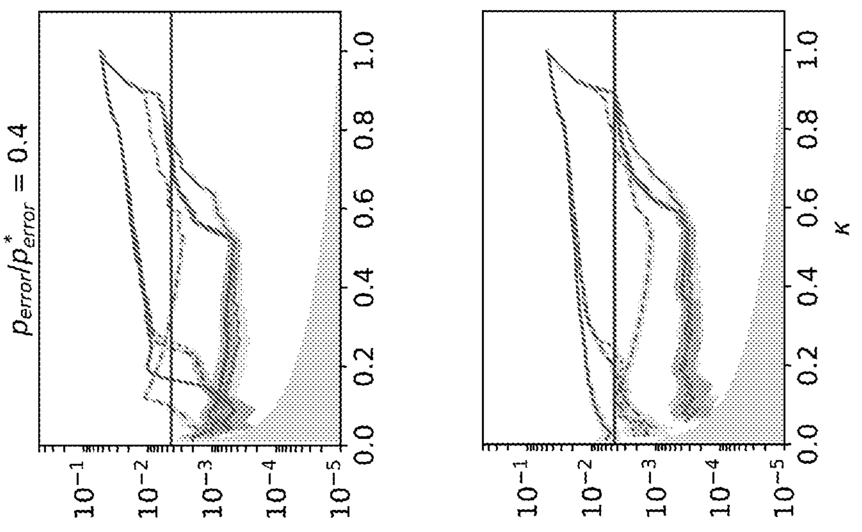
Figure 18C:
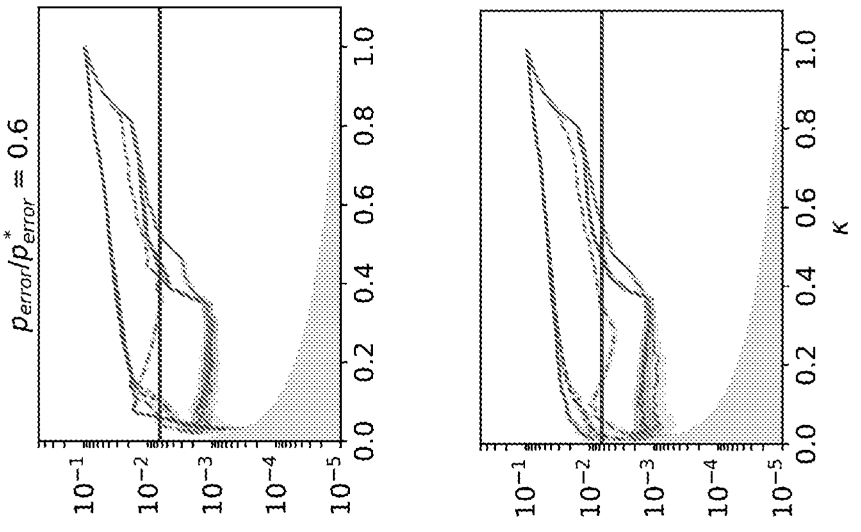
Figure 18E:
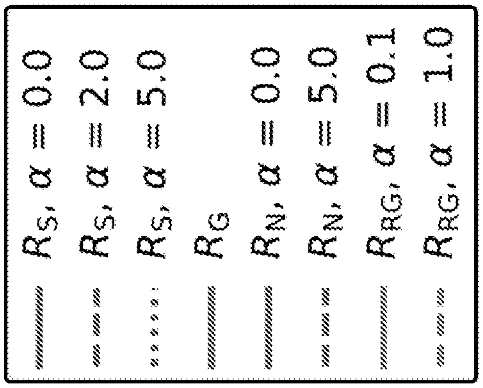
Figure 18E:
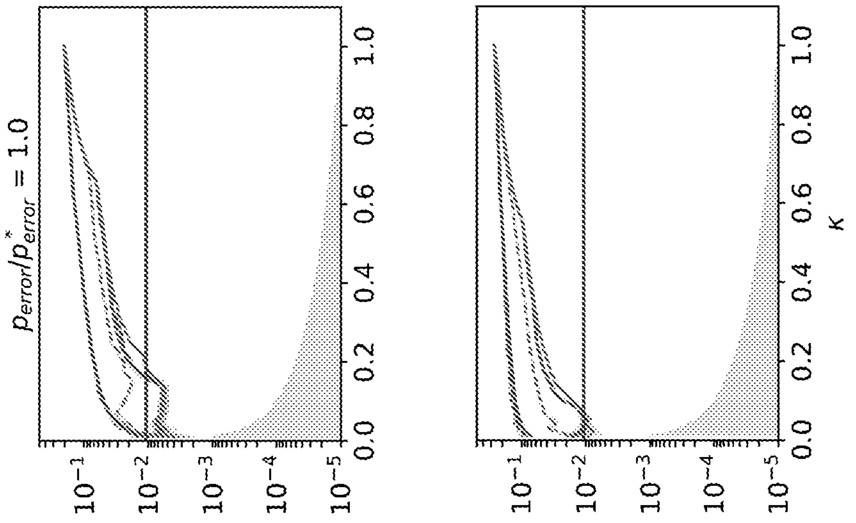
Figure 18D:
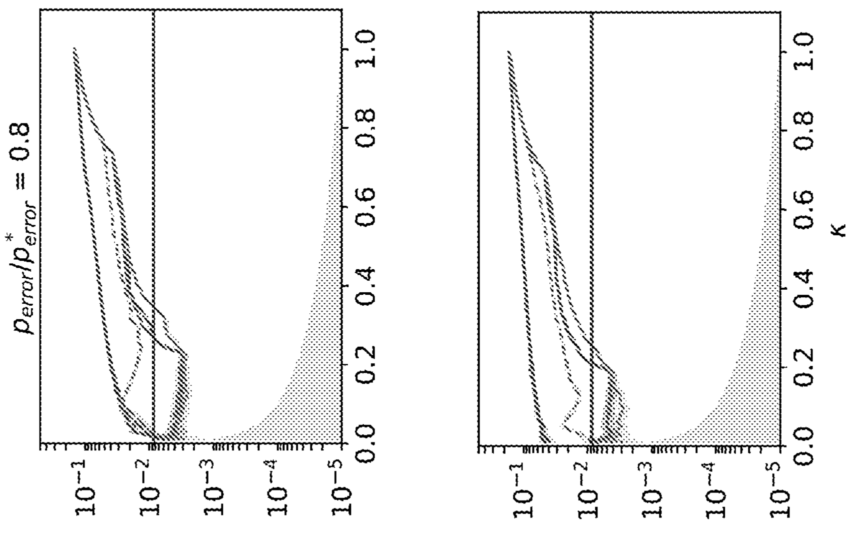

FIG. 17—Architectural Design

FIG. 17 illustrates in additional detail physical architectures configured to implement embodiments described herein. Magic states are prepared, post-selected, and then stored in a buffer for distillation. In FIG. 17, the initial logical magic states $\rho_T$ are prepared and post-selected upon using the information function Q and policy P. Magic states are either discarded (if rejected by the policy) or accepted, after which they are sent to the buffer. Accepted magic states are denoted $\rho_T'$ and have error rate $p_{prep}$ and are utilized in the distillation protocol. The output states of the distillation protocol are denoted $\tilde{\rho}_T$ and are used for fault-tolerant quantum computation.

In a physical implementation, the input magic state preparation blocks may be selected in real-time from a finite set. Further, several magic states may be utilized for each round of distillation, and so it may be desirable to determine how many parallel preparation sites—called preparation factories—should be utilized such that there is a sufficient rate of initial magic states reaching the first level of distillation. Some embodiments herein utilize a buffer-based architecture to obtain a more accurate estimate of the cost and performance of the described post-selection rules. This buffer architecture is particularly well-suited to photonic FBQC architectures, but is also more generally applicable to matter-based CBQC architectures, provided the routing costs are accounted for.

Consider $n_{fac}$ preparation factories, each of which synchronously generate a magic state block on a clock with time interval $t_{fac}$. Consider also a collective memory buffer that can store a number of magic state blocks for a time $t_{flush}=n_{cycles}t_{fac}$, measured in the number of factory clock cycles $n_{cycles}$, before the entire buffer, i.e. all of its magic states, is erased. For a distillation protocol that takes in $m_{in}$ blocks and outputs $m_{out}$ blocks, if the buffer is not filled with $m_{in}$ magic state blocks by $t_{flush}$, distillation may not proceed, leading to wasted resources when the buffer is flushed. It may be assumed that the temporal overhead for the classical computation utilized for post-selection is negligible in between the factories and the collective buffer (i.e., that routing magic states is effectively free), that there is all-to-all connectivity between factories and memory slots in the buffer as shown in FIG. 17, and that all magic state factories are uncorrelated in terms of quality of initial magic states.

For a given post-selection rule R, each keep ratio κ corresponds to a cutoff score(s) we more explicitly denote $s^*(\kappa; R)$ (for score $S_R(Q)$), determined by numerical simulation apriori. At each factory clock cycle, $n_{fac}$ magic state blocks are produced. A classical computational filter may then apply the rule's policy on each block, only accepting a block if $S_R(Q)\leq s^*(\kappa; R)$. The accepted blocks are moved into the buffer, and since the probability of accepting a single magic state block is by construction K, there are on average $\kappa n_{fac}$ blocks stored in the buffer after one clock cycle. Recalling that the magic states produced in each clock cycle are uncorrelated with those produced in previous cycles, the collection of accepted magic state blocks after $n_{cycles}$ may follow a binomial distribution with mean $\mu=n_{cycles}n_{fac}\kappa$ and variance $\sigma^2=n_{cycles}n_{fac}\kappa(1-\kappa)$. To ensure a filled buffer of size $m_{in}$ up to failure probability $p_{flush}$ for an acceptance probability κ, we solve $p_{flush}=F(m_{in}-1; n_{cycles}n_{fac}, \kappa)$ for $n_{cycles}n_{fac}$, where F(x; n, p) is the cumulative distribution function (cdf) for the binomial distribution of n trials and success probability p. Note that $p_{flush}$ rapidly decays in the regime of interest where $m_{in}-1<\mu$, and that the solution allows for a simple space-time tradeoff between $n_{cycles}$ and $n_{fac}$ (since the product remains fixed) which is useful for working around any physical resource constraints that might be present. Furthermore, $$\frac{\sigma}{\mu}\sim\frac{1}{\sqrt{n_{cycles}n_{fac}}}$$

means that the relative fluctuations of buffer filling vanish with larger magic state requirements, as would be the case for multiple rounds of distillation. Practical implementation of this collective buffer scheme with a common flush time, or a variation that allows for individual flush times rather than a collective flush time, both involve a detailed specification of a physical architecture and its description of errors that will inform, for example, constraints on total overhead and constraints on space-time geometries for routing magic state blocks.

A distillation protocol produces magic states with output error rate $$f(p_{prep}; c, k) = cp_{prep}^k \text{ (to first order),}$$

for some constants c, k, assuming the input magic state error rate $p_{prep}$ is sufficiently small. For example, the 15-to-1 distillation protocol outputs 1 magic state of quality arbitrarily close to $$35p_{prep}^3$$

using 15 input magic states of quality $p_{prep}$. This assumes the code distances for the input surface codes are large such that errors in the Clifford operations are negligible. For an algorithm of interest, with $n_T$ T-gates and $n_Q$ number of qubits, one may distill magic states of an error rate $$p_{alg} = O\left(\frac{1}{n_T n_Q}\right)$$

to run the entire computation with constant error rate. To achieve this, one may choose the distillation protocol such that $f(p_{prep}; c, k)<p_{alg}$. In some embodiments, it is desirable to choose the distillation protocol that achieves this output error rate with the fewest resource states possible. One may jointly optimize the distillation protocol (across the landscape of possible distillation protocols) and postselection protocols (i.e., the post-selection rule and how many preparation factories are utilized) to minimize overall resources. As has been shown above, the radial gap rule achieves an advantageously low error rate to prepare magic states for a given postselection overhead (i.e., fixed O).

As fault-tolerant demonstrations on current quantum technologies are becoming more prevalent, it is desirable to develop more accurate modelling and resource estimation tools to determine the parameters for large scale quantum computations. Embodiments herein establish a framework for fault-tolerant post-selection and apply it to magic states or other encoded logical states, a large source of overhead for fault-tolerant quantum computations. The presented numerical results demonstrate that the post-selection rules of the described embodiments rapidly suppress the encoding error rate of initial magic states in surface code blocks—under a range of error models consisting of i.i.d. Pauli errors and erasure errors, and over a wide range of error rates—to the level of the initial magic state error, all for low constant multiplicative overhead of ~1.5-5× the cost of a single magic state preparation block. In particular, the logical gap—a post-selection rule inspired by the statistical mechanics-to-quantum error correction correspondence—and its variants serve as powerful information metrics at the topological level. This information may inspire and serve as a foundation for post-selection rules and/or multiplexing strategies for other logical blocks as part of the error parameters in a larger quantum architectural stack.

Further reduction of space-time volume may be achieved by reducing the depth of the preparation block—for example, preparation factories producing (L,L_d)=(4,2) for post-selection might be sufficient for efficiently choosing quality blocks that can be routed into buffers, i.e. fused into large depth identity (memory) blocks.

FIG. 19A-D—Correction Syndromes

FIGS. 19A-D illustrate an example of a syndrome graph and syndrome graph data in accordance with one or more embodiments. In this example, a simplified 2D syndrome graph is used but one of ordinary skill will appreciate that any type of syndrome graph corresponding to any error correcting code may be used without departing from the scope of the present disclosure.

Figure 19A:
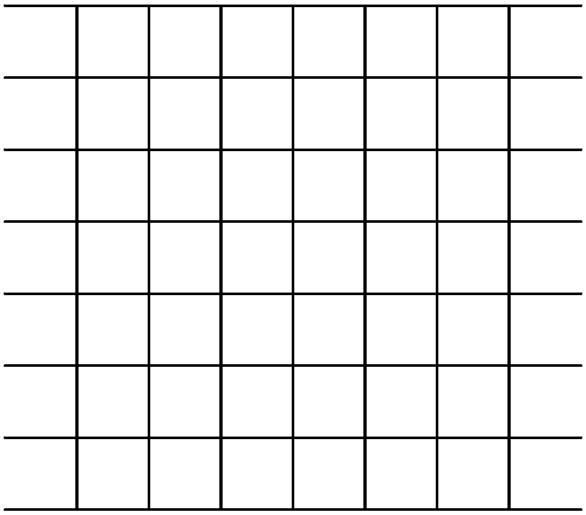
FIGS. 19A-D illustrate two alternate corrections of a 2-dimensional syndrome graph, according to some embodiments.

FIG. 19A illustrates the geometry of the syndrome graph, a square lattice in this example. Such a square lattice syndrome graph is associated with the primal or dual syndrome graphs of the surface code implementation discussed above in reference to FIGS. 1A-F.

Figure 19B:
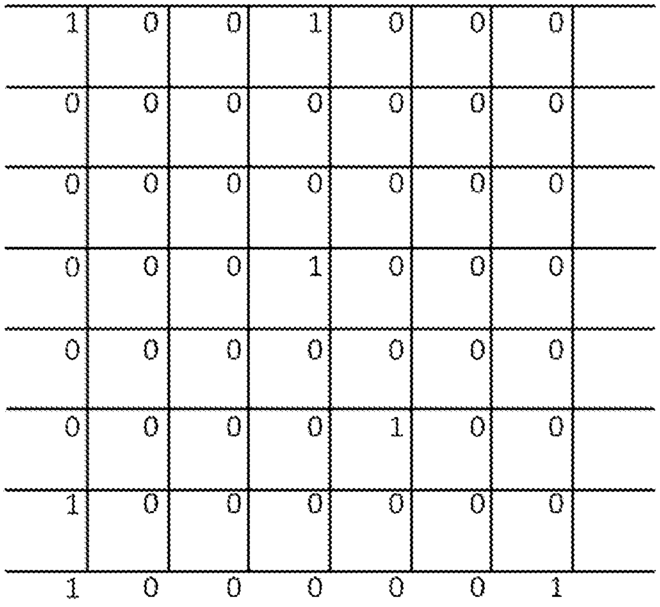
Figure 19C:
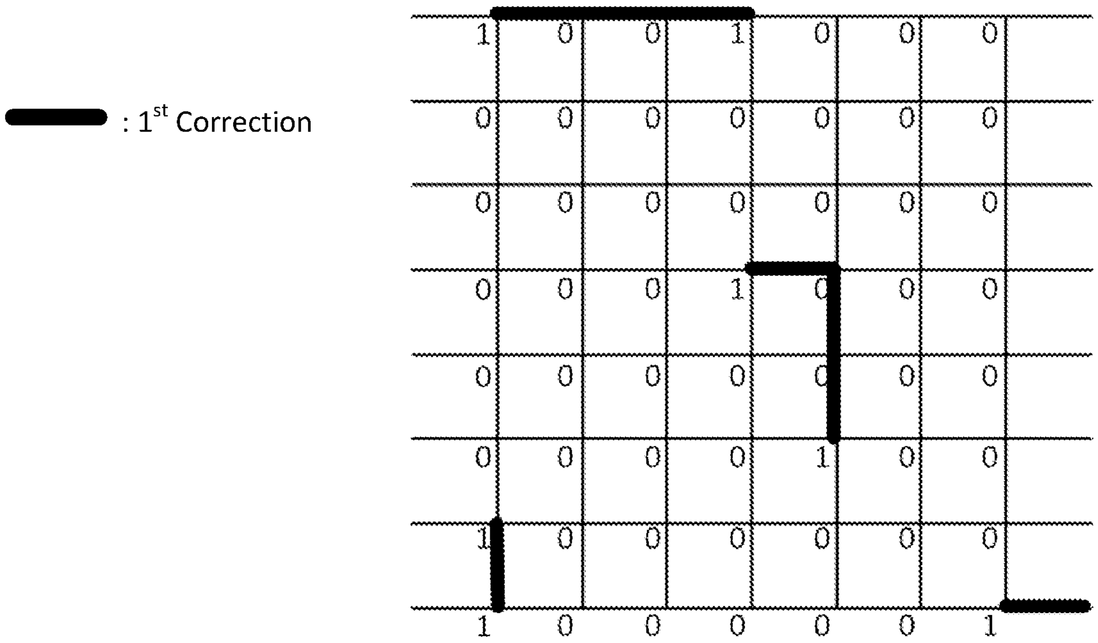
Figure 19D:
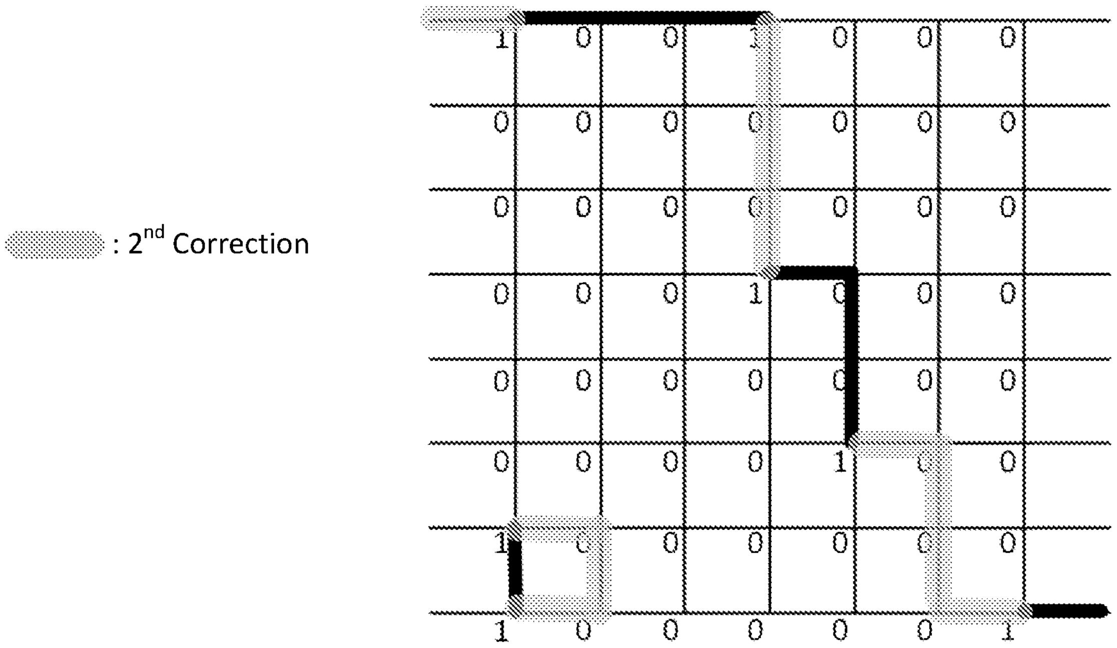

FIG. 19B shows an example of syndrome graph data that is superimposed on the syndrome graph, where vertices correspond to the set of measurement outcomes of the various parity checks. In the illustrated example, each vertex includes a 1 if the parity check measurement returned an odd parity measurement outcome (also referred to herein as a "syndrome") and a zero if the parity check returned an even parity, where the parity check measurements can be implemented as shown above in FIG. 1E-1F or 1G. Depending on the type of error correcting code being employed, one of ordinary skill will appreciate that the parity measurement outcomes may be computed by any known method. A useful way of understanding the syndrome graph data shown in FIG. 19B in the context of the surface code example of FIGS. 1E-1F is that any "syndromes" present in the syndrome graph data, are the result of one or more errors on the underlying data qubits, which can be thought of as positioned on the edges of the superimposed syndrome graph. Vertices having an odd number of data qubit errors incident thereon will result in a syndrome being present at the vertex (i.e., the vertex is labeled 1) while vertices having zero or an even number of data qubit errors incident thereon will result in no syndrome being present on the vertex (i.e., the vertex is labeled 0). The situation for an FBQC implementation of the surface code is slightly more complicated because, rather than being directly computed from the measurement of the measure qubit located at each vertex, the syndromes are computed from the surrounding two-qubit fusion measurement outcomes that can be visualized as located on each incident edge, but the process is analogous as described in further detail above in reference to FIGS. 1C and 13A.

FIG. 19C illustrates an example correction that a decoder would produce when provided the syndrome graph data of FIG. 19B. The correction can include the one or more Pauli operators representing the set of operations that could be applied (or alternatively, not applied, but instead tracked and accounted for in the system as the quantum computation progresses) on the underlying data qubits of the error correction code to correct errors on those qubits while still preserving the overall quantum state of the logical qubit. One of ordinary skill will appreciate that many different decoders are known and any could be deployed here without departing from the scope of the present disclosure. For example, a minimum-weight perfect matching decoder may be used to determine the one or more corrections to be used for fault-tolerant post selection processing. The correction shown in FIG. 19C is an example of a minimum-weight correction also referred to herein as the "first correction". Note that there can be many possible minimum weight corrections that could be computed by the decoder, and FIG. 19C only illustrates one particular example. The weight of this correction is 8, because it identifies 8 Pauli operators on the underlying physical data qubits (shown by the 8 edges are traversed by the thick black line). In some embodiments, to calculate a logical gap, a second correction can be computed with the constraint that the correction should flip the overall logical value of the logical qubit with the assumption that the first correction properly identifies the underlying errors on the data qubits, i.e., the second correction can be computed such that it that differs from the first correction by a logical operator (e.g., a chain of Pauli operations that spans from the left edge of the syndrome graph to the right edge of the syndrome graph (or from the top to the bottom).

FIG. 19D shows one example of a second correction represented as a light grey thick line. In this example, the second correction plus the first correction results in a logical error on the logical qubit because a chain of errors spans the lattice from left to right. Note, there are many possible candidate corrections for this second correction as well, as there was for the first correction. The weight of the second correction shown in FIG. 19D is 9. The magnitude of the logical gap may then be obtained by taking the difference of the weights of the corrections shown in FIGS. 19C and 19D, which results in a magnitude of the logical gap of $|9-8|=1$.

In the example above, the decoder receives syndrome graph data that indicates the location(s) of syndromes. More generally as described in more detail below, the decoder can receive a set of data representing the visible error which includes the location of both the syndromes and underlying erasure errors, if any. As used herein the term syndrome graph will be used synonymously with visible error and it is therefore understood that syndrome graph data includes both syndromes and erasures. In some examples, the syndrome graph data received by the decoder may take the form of a matrix of syndrome values, where each entry of the matrix is mapped to a vertex in the syndrome graph (e.g., the vertices shown in FIGS. 19A-C). In addition, the syndrome graph data may include a second related matrix that includes erasure errors, where, e.g., in the case of the surface code shown in in FIGS. 1E-1F, each entry of the matrix is mapped to an edge in the syndrome graph. For an FBQC implementation the situation is analogous.

It should be understood that all numerical values used herein are for purposes of illustration and may be varied. In some instances, ranges are specified to provide a sense of scale, but numerical values outside a disclosed range are not precluded.

It should also be understood that all diagrams herein are intended as schematic. Unless specifically indicated otherwise, the drawings are not intended to imply any particular physical arrangement of the elements shown therein, or that all elements shown are necessary. Those skilled in the art with access to this disclosure will understand that elements shown in drawings or otherwise described in this disclosure may be modified or omitted and that other elements not shown or described may be added.

This disclosure provides a description of the claimed invention with reference to specific embodiments. Those skilled in the art with access to this disclosure will appreciate that the embodiments are not exhaustive of the scope of the claimed invention, which extends to all variations, modifications, and equivalents.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

It will also be understood that, although the terms first, second, etc., are, in some instances, used herein to describe various elements, these elements should not be limited by these terms. These terms are only used to distinguish one element from another. For example, a first switch could be termed a second switch, and, similarly, a second switch could be termed a first switch, without departing from the scope of the various described embodiments. The first switch and the second switch are both switches, but they are not the same switch unless explicitly stated as such.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method, comprising:

by a quantum computing system:

receiving syndrome graph data of a logical qubit, wherein the logical qubit comprises a first resource state prepared in a first state and a plurality of second resource states encoded with the first resource state, wherein the first state comprises two or more entangled logical qubits prepared in a specified relative phase relationship;

determining at least one logical gap magnitude based at least in part on the syndrome graph data;

determining an error metric of the logical qubit based at least in part on the at least one logical gap magnitude;

determining whether the error metric satisfies a quality threshold;

based on the error metric satisfying the quality threshold, toggling a switch to input the logical qubit into a buffer for provision into a state distillation process;

producing a distilled first state using the state distillation process based at least in part on the logical qubit; and utilizing the distilled first state to perform a multi-qubit measurement.

2. The method of claim 1, wherein the logical gap magnitude comprises a magnitude of a difference in a first weight of a first correction of the syndrome graph data and a second weight of a second correction of the syndrome graph data.

3. The method of claim 2, wherein the first and second weights comprise log-likelihood weights.

4. The method of claim 2, wherein the first and second weights comprise a weighted summation over corrected edges of the first and second correction, respectively, and wherein the weighted summation is weighted based at least in part on respective graph distances of the corrected edges from the first resource state, wherein shorter graph distances are granted a larger weight than longer graph distances.

5. The method of claim 4, wherein the weighted summation is truncated for graph distances greater than a predetermined fraction of a total graph length of the logical qubit.

6. The method of claim 4, wherein the weighted summation is weighted with a factor comprising the respective graph distance raised to a power of a tunable parameter, a.

7. The method of claim 1, wherein the logical qubit is encoded using fusion-based quantum computing which performs a sequence of fusion measurements on the first resource state and the plurality of second resource states.

8. The method of claim 1, wherein the at least one logical gap magnitude comprises a respective logical gap magnitude for each logical error class of a set of distinct logical error classes of the syndrome graph data.

9. The method of claim 8, wherein the error metric comprises a summation over the set of distinct logical error classes of a decaying exponential function of the respective magnitudes of the respective logical gaps.

10. The method of claim 1, further comprising:

determining a second error metric based at least in part on a weighted summation over syndrome error densities that is weighted based on graph distances of respective syndrome errors from the first resource state;

determining whether the second error metric satisfies a second quality threshold; and based on a determination that the second error metric satisfies the second quality threshold, inputting the logical qubit into the state distillation process.

11. A non-transitory computer-readable memory medium storing program instructions which, when executed by a processor, cause a quantum computing system to:

determine an error metric from syndrome graph data of a logical block, wherein the logical block comprises a plurality of encoded physical qubits;

determine whether the error metric satisfies a quality threshold; and based on whether the error metric satisfies the quality threshold, toggle a switch to either discard the logical block or input the logical block into a buffer for use in a quantum computation.

12. The non-transitory computer-readable memory medium of claim 11, wherein the error metric is determined based at least in part on a logical gap magnitude of the syndrome graph data.

13. The non-transitory computer-readable memory medium of claim 12, wherein the logical gap comprises a difference in log-likelihood weights between a first and second correction of the syndrome graph data.

14. The non-transitory computer-readable memory medium of claim 11, wherein the plurality of encoded physical qubits comprises a plurality of resource states encoded using fusion-based quantum computing.

15. The non-transitory computer-readable memory medium of claim 11, wherein the syndrome graph data comprises information related to one or more syndromes and one or more erasures of a syndrome graph of the logical block, wherein the error metric is determined based at least in part on the one or more syndromes and the one or more erasures.

16. A controller, comprising:

a non-transitory computer-readable memory medium;

a switch coupled to a logical qubit generator; and one or more processors coupled to the memory medium, wherein the processor is configured to execute program instructions to:

receive syndrome graph data of a logical qubit, wherein the logical qubit comprises a first physical qubit prepared in a first state and a plurality of second physical qubits encoded with the first physical qubit, wherein the first state comprises two or more entangled logical qubits prepared in a specified relative phase relationship;

determine at least one logical gap magnitude based at least in part on the syndrome graph data;

determine an error metric of the logical qubit based at least in part on the at least one logical gap magnitude;

determine whether the error metric satisfies a quality threshold; and based on a determination that the error metric satisfies the quality threshold, toggle the switch to provide the logical qubit to a buffer for provision into a state distillation process.

17. The controller of claim 16, wherein the logical gap magnitude comprises a magnitude of a difference in a first weight of a first correction of the syndrome graph data and a second weight of a second correction of the syndrome graph data.

18. The controller of claim 17, wherein the first and second weights comprise a weighted summation over corrected edges of the first and second correction, respectively, and wherein the weighted summation is weighted based at least in part on respective graph distances of the corrected edges from the first resource state, wherein shorter graph distances are granted a larger weight than longer graph distances.

19. The controller of claim 16, wherein the program instructions are further executable by the processor to cause the controller to:

based on a determination that the error metric does not satisfy the quality threshold, toggle the switch to discard the logical qubit.

20. The controller of claim 16, further comprising:

a flush switch, wherein the program instructions are further executable by the processor to cause the controller to:

determine that a threshold number of logical qubits of a cycle have not satisfied the quality threshold; and based on the determination that the threshold number of logical qubits of the cycle have not satisfied the quality threshold, toggle the flush switch to discard all logical qubits of the cycle.

* * * * *